United States Patent [19]

Wells et al.

[11] 3,836,726

[45] Sept. 17, 1974

[54] DATA TRANSMISSION METHOD AND APPARATUS

[75] Inventors: Joel D. Wells; Albert S. Sabin, both of Orlando; William J. Kahn, Maitland; William K. Wigner, Kissimmee, all of Fla.

[73] Assignee: Martin Marietta Corporation, New York, N.Y.

[22] Filed: Oct. 25, 1971

[21] Appl. No.: 191,855

[52] U.S. Cl. .................... 179/41 A, 325/55, 325/64

[51] Int. Cl. .......................................... H04m 7/04

[58] Field of Search ......... 179/41 A, 15 BA, 15 AL; 325/4, 53, 54, 55, 64; 343/176, 204; 178/50, 69.5

[56] References Cited

UNITED STATES PATENTS

| | | | |
|---|---|---|---|
| 3,141,928 | 7/1964 | Davey et al. | 343/204 |
| 3,310,741 | 3/1967 | Uitermaricet et al. | 325/55 |
| 3,430,237 | 2/1969 | Allen | 325/4 |
| 3,458,664 | 7/1969 | Adlhoch et al. | 179/41 A |
| 3,542,968 | 11/1970 | Mercer | 179/41 R |
| 3,575,558 | 4/1971 | Leyburn et al. | 179/41 A |

*Primary Examiner*—Kathleen H. Claffy
*Assistant Examiner*—Thomas L. Kundert
*Attorney, Agent, or Firm*—Burns, Doane, Swecker & Mathis

[57] ABSTRACT

A plural transmitter, digital data transmission and remote control system in the environment of a paging system in which mutual interference by the transmitters is eliminated through the sequencing thereof. Embodiments compatible with existing tone systems are disclosed for both plural system-single area operation and for plural system-plural area operation. A novel receiver and method of receiver synchronization and time slot selection as a function of received signal characteristics are also disclosed, as is the novel evaluation of a digital data signal, power conservation, and fail safe operation with existing telephonic switching equipment.

75 Claims, 34 Drawing Figures

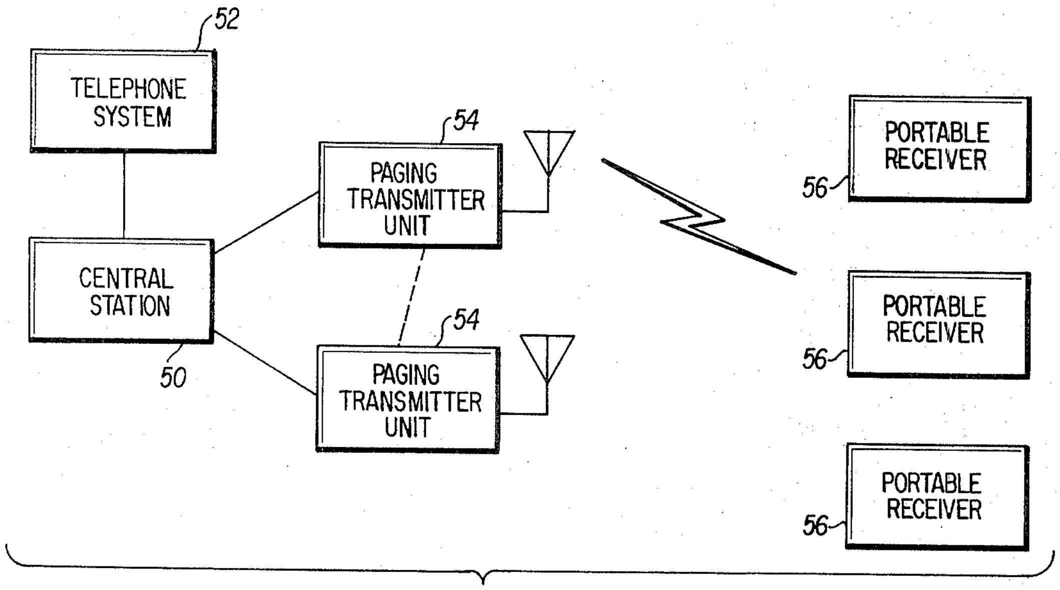
FIG. 1 SYSTEM
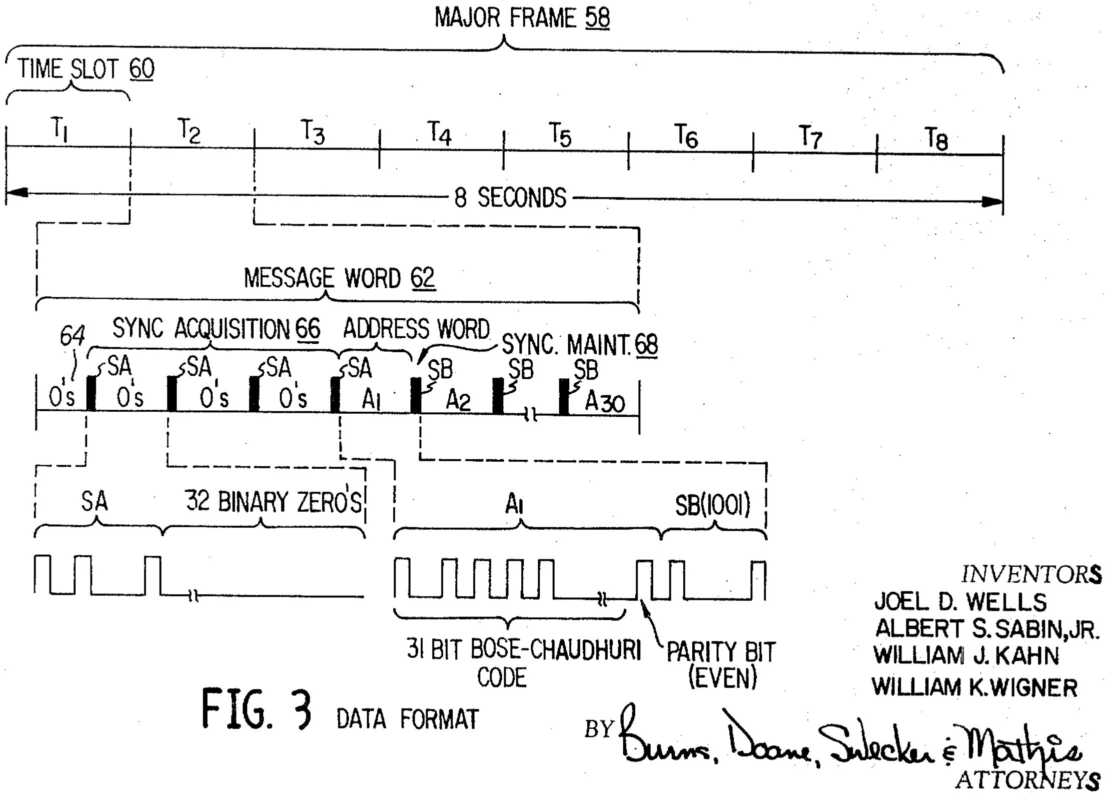
FIG. 3 DATA FORMAT
INVENTORS
JOEL D. WELLS
ALBERT S. SABIN, JR.
WILLIAM J. KAHN
WILLIAM K. WIGNER
BY Burns, Doane, Swecker & Mathis
ATTORNEYS

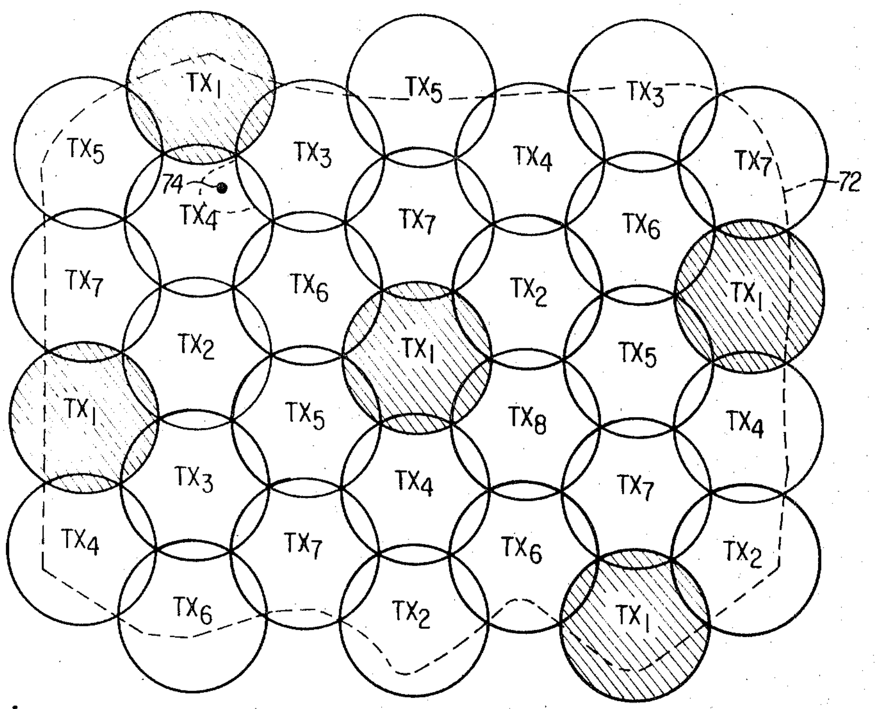
FIG. 4 TRANSMITTER SEQUENCING
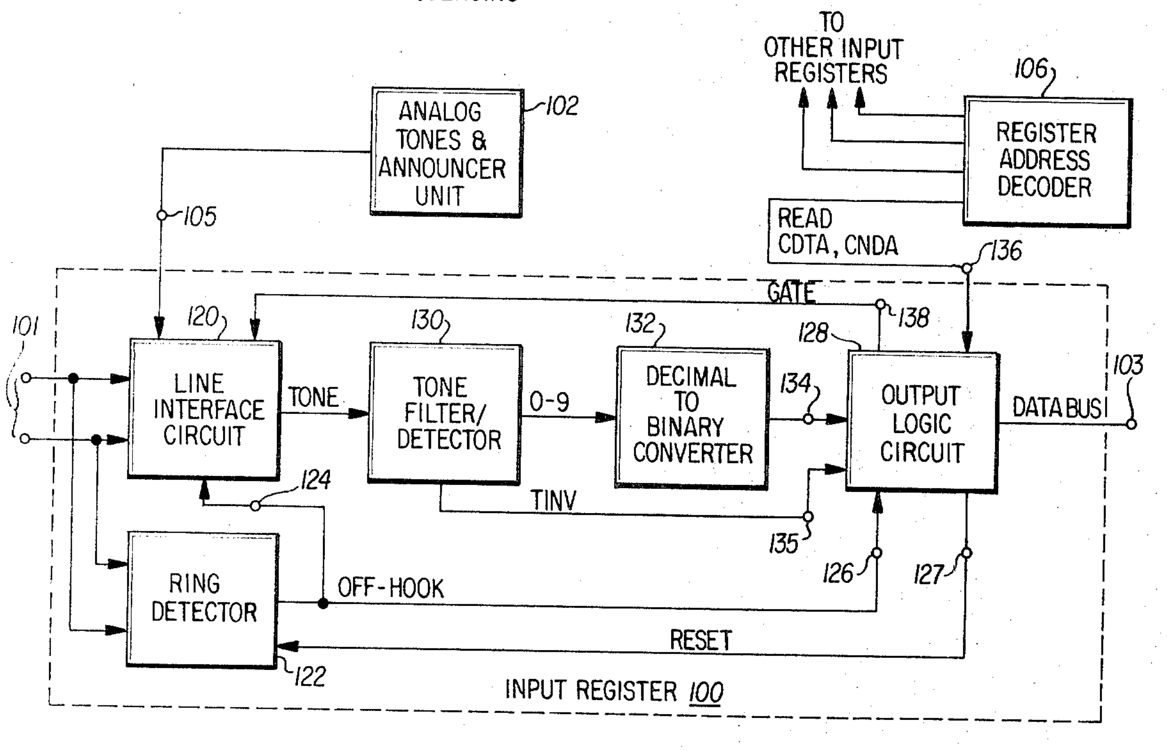
FIG. 6

FIG. 8 OUTPUT LOGIC CIRCUIT

FIG. 9 XMTR CONTROL UNIT

FIG. 10 DIAGNOSTIC UNIT, FIG. 32 SUBSCRIBER SERVICE NO. 1

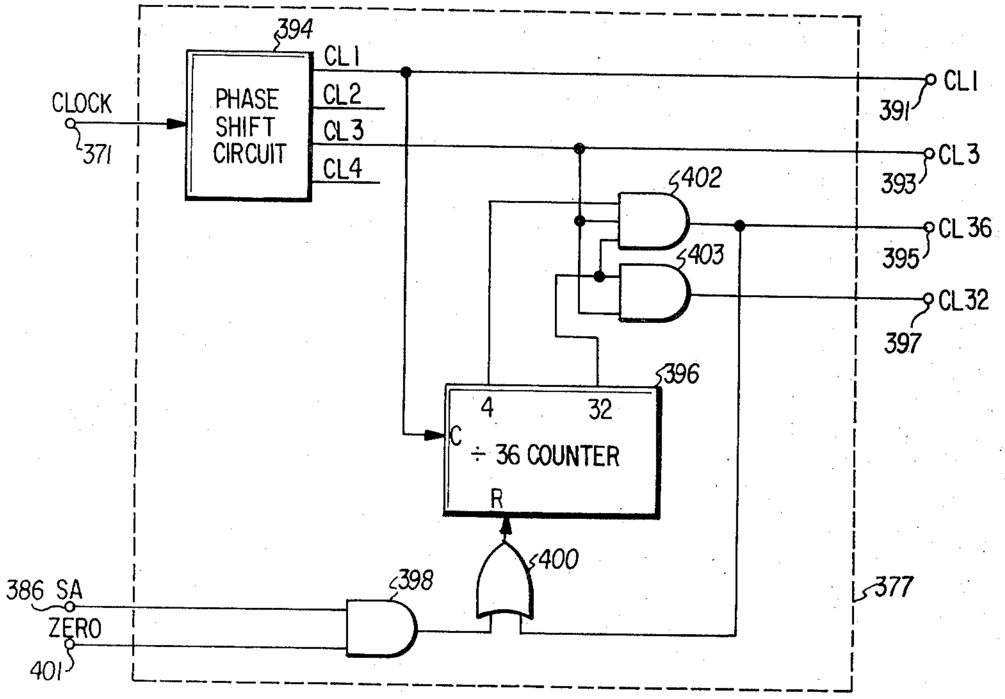
FIG. 14 TIMING CIRCUIT
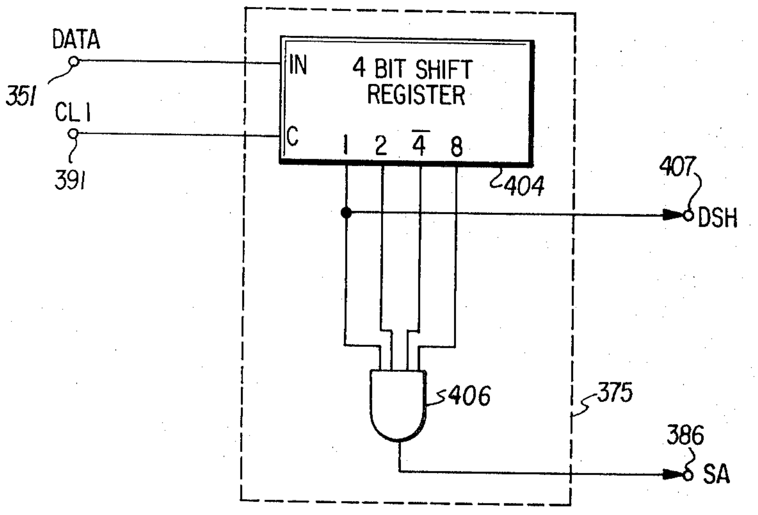
FIG. 15 SYNC PATTERN COMPARATOR

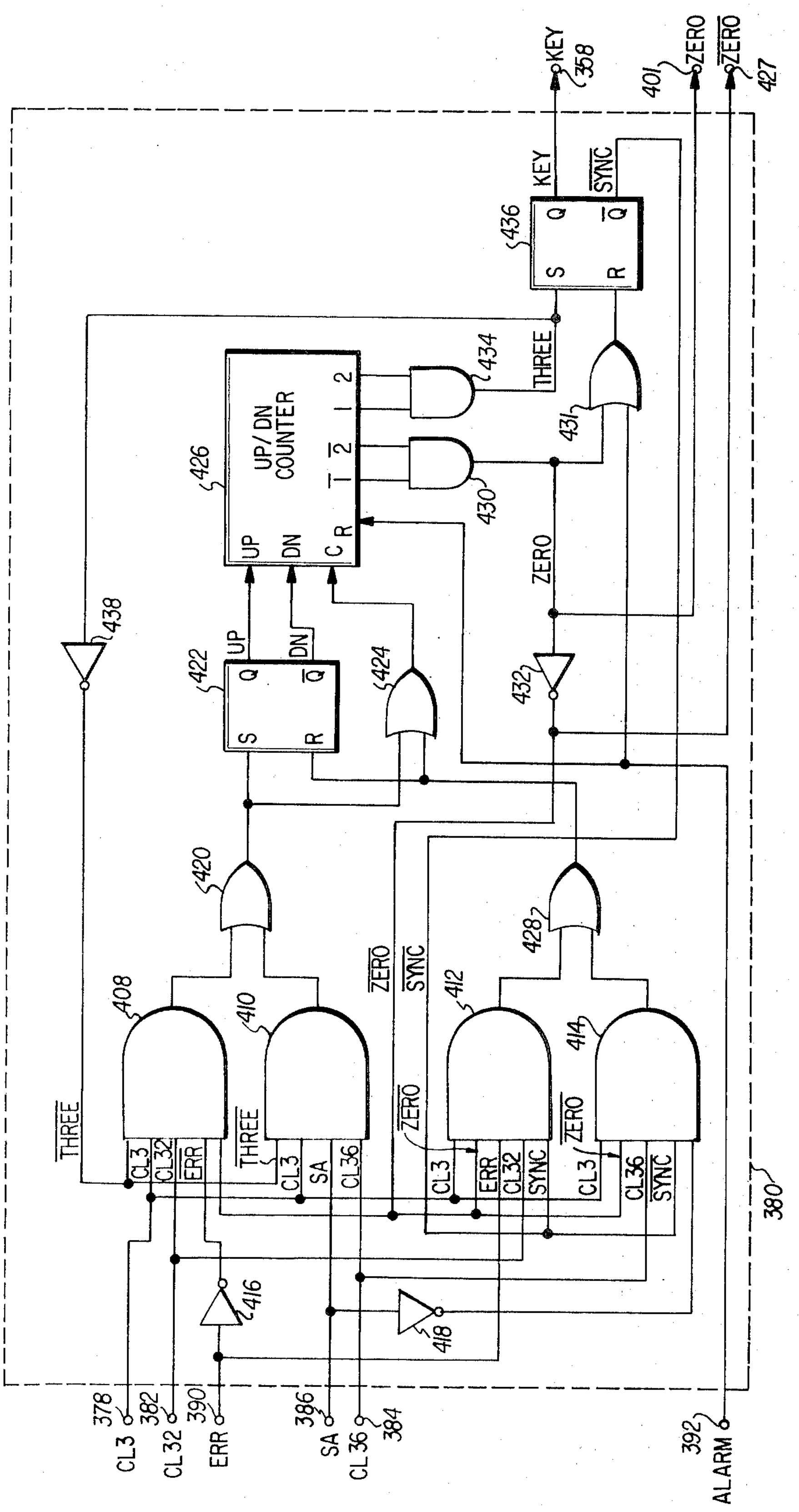
FIG. 16 UP/DN COUNTER CIRCUIT

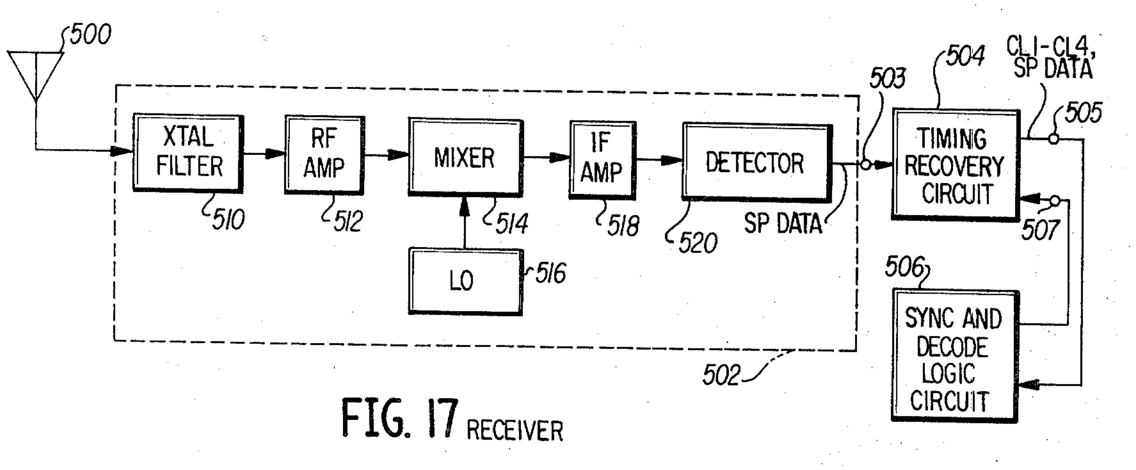
FIG. 17 RECEIVER
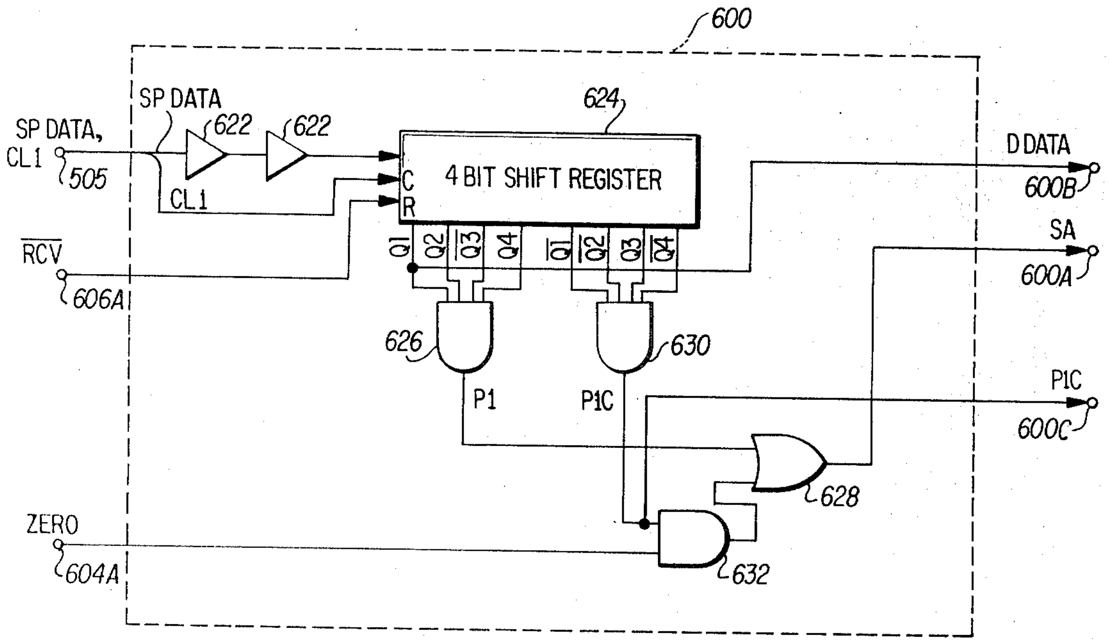
FIG. 20 SYNC PATTERN DETECTOR

TIMING RECOVERY CIRCUIT

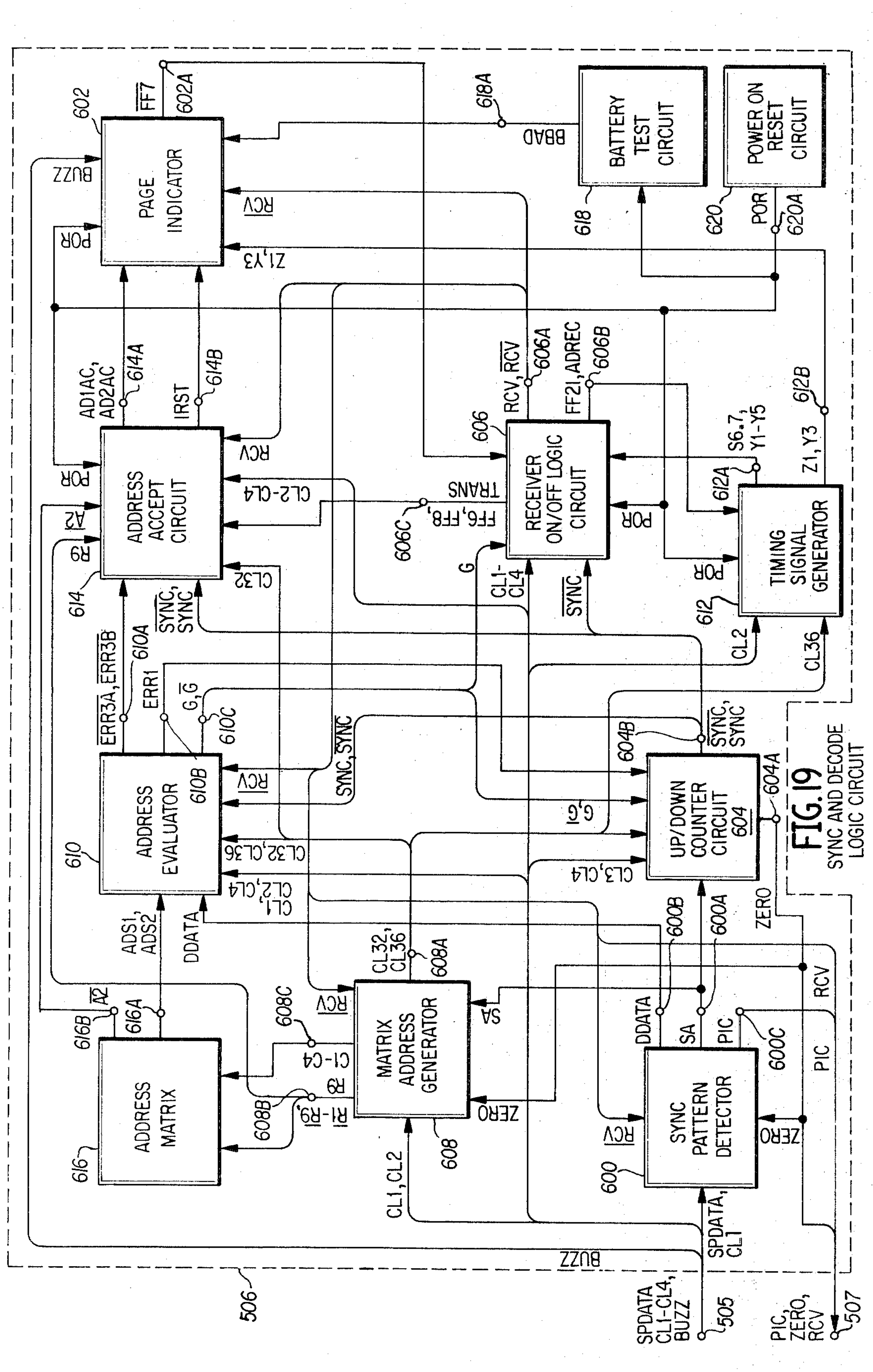
FIG. 19 SYNC AND DECODE LOGIC CIRCUIT

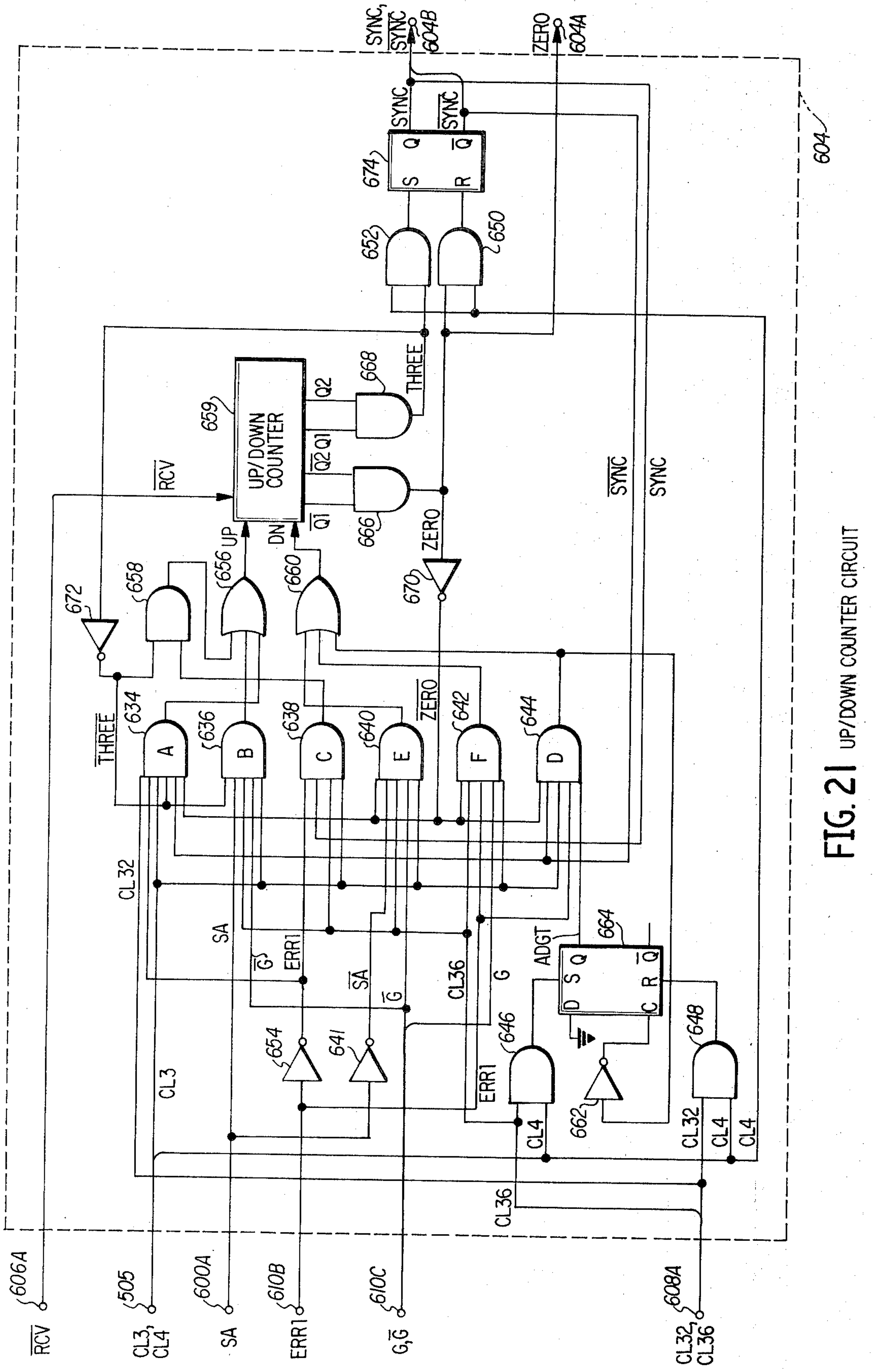
FIG. 21 UP/DOWN COUNTER CIRCUIT

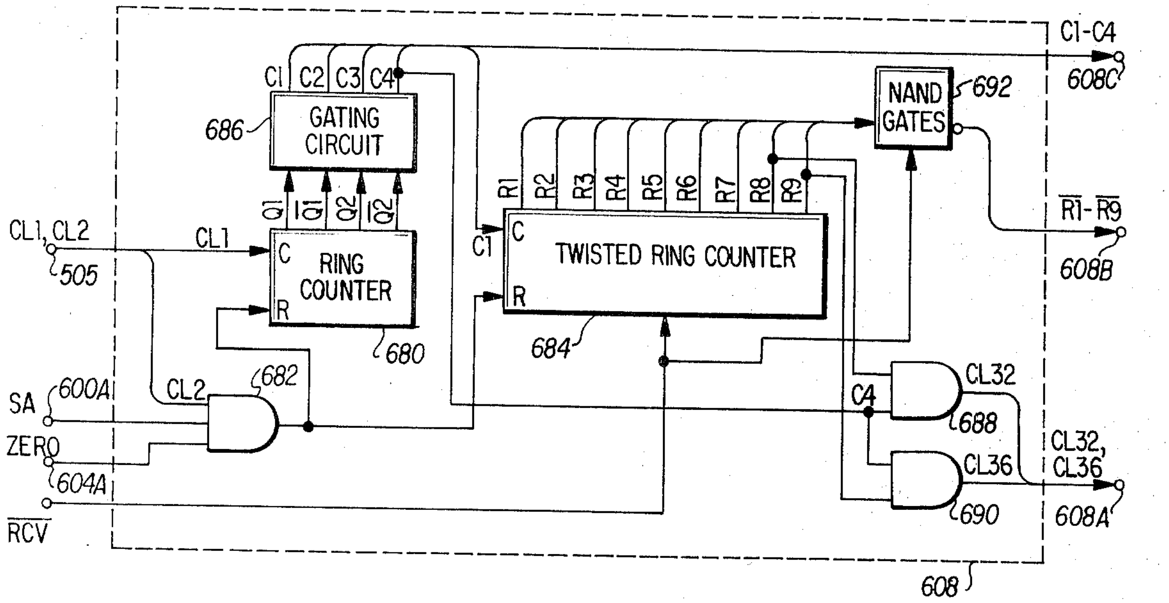
FIG. 22 MATRIX ADDRESS GENERATOR
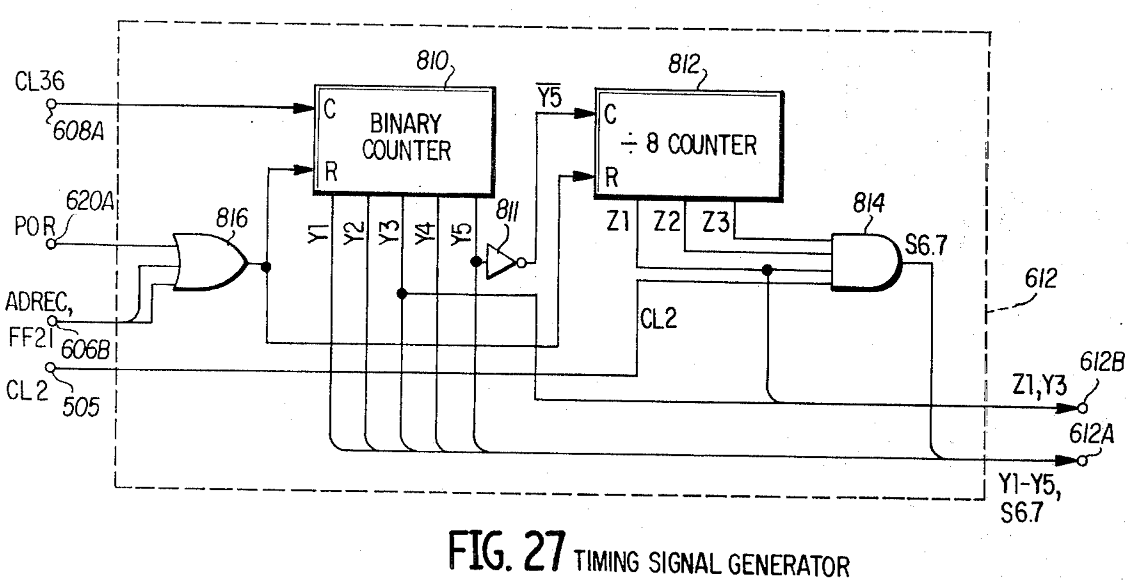
FIG. 27 TIMING SIGNAL GENERATOR

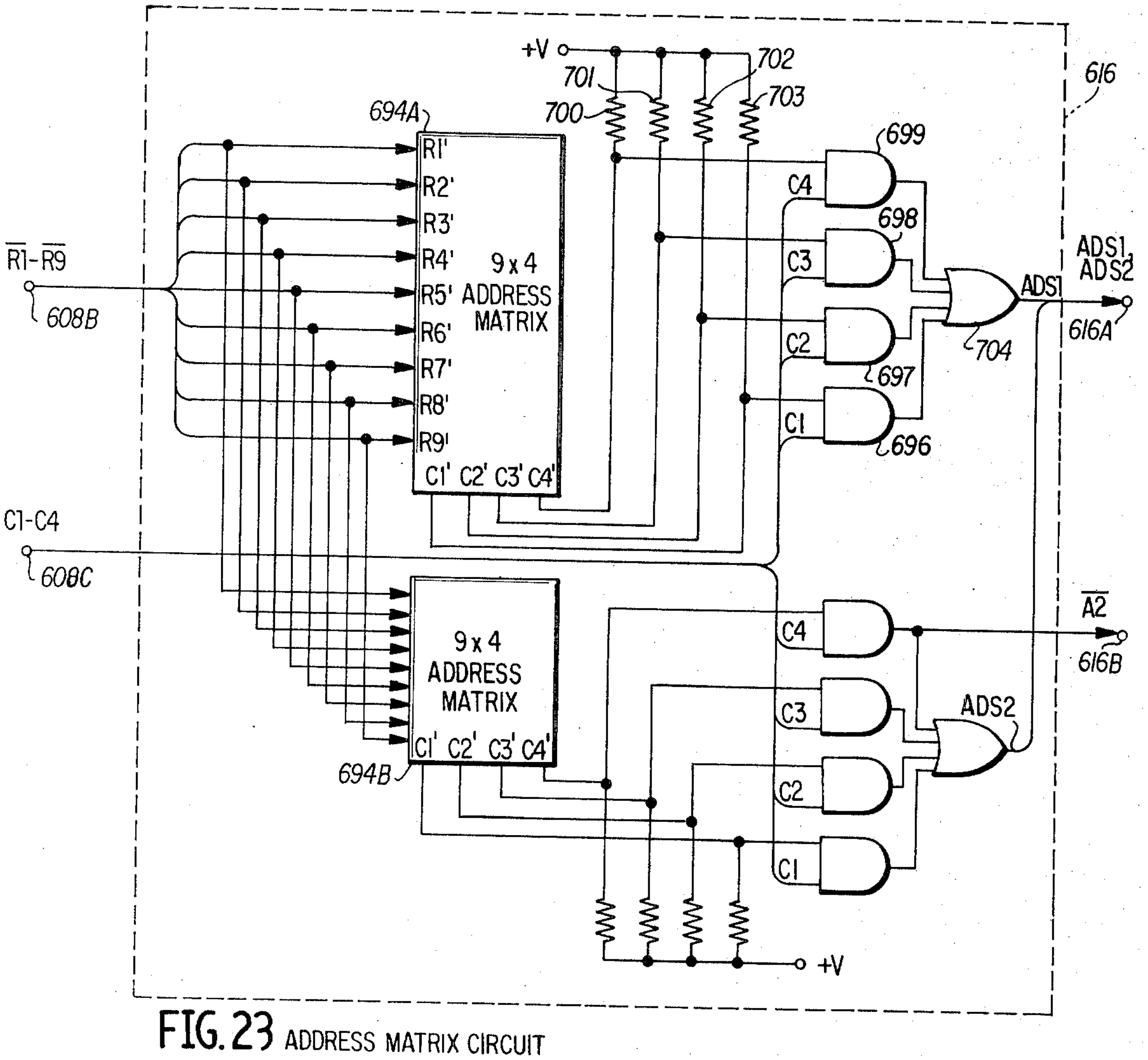
FIG. 23 ADDRESS MATRIX CIRCUIT
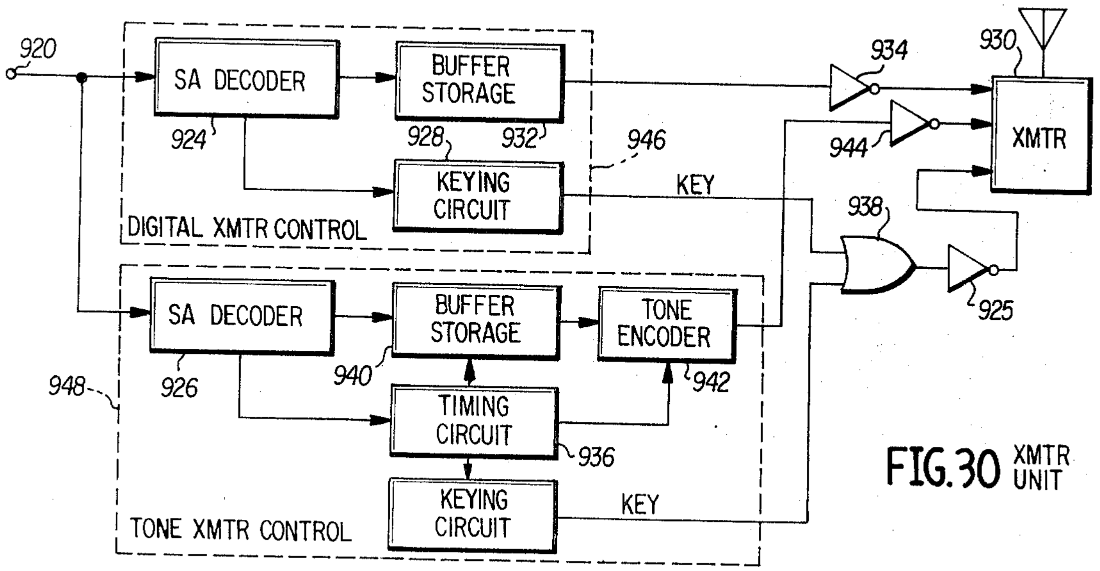
FIG. 30 XMTR UNIT

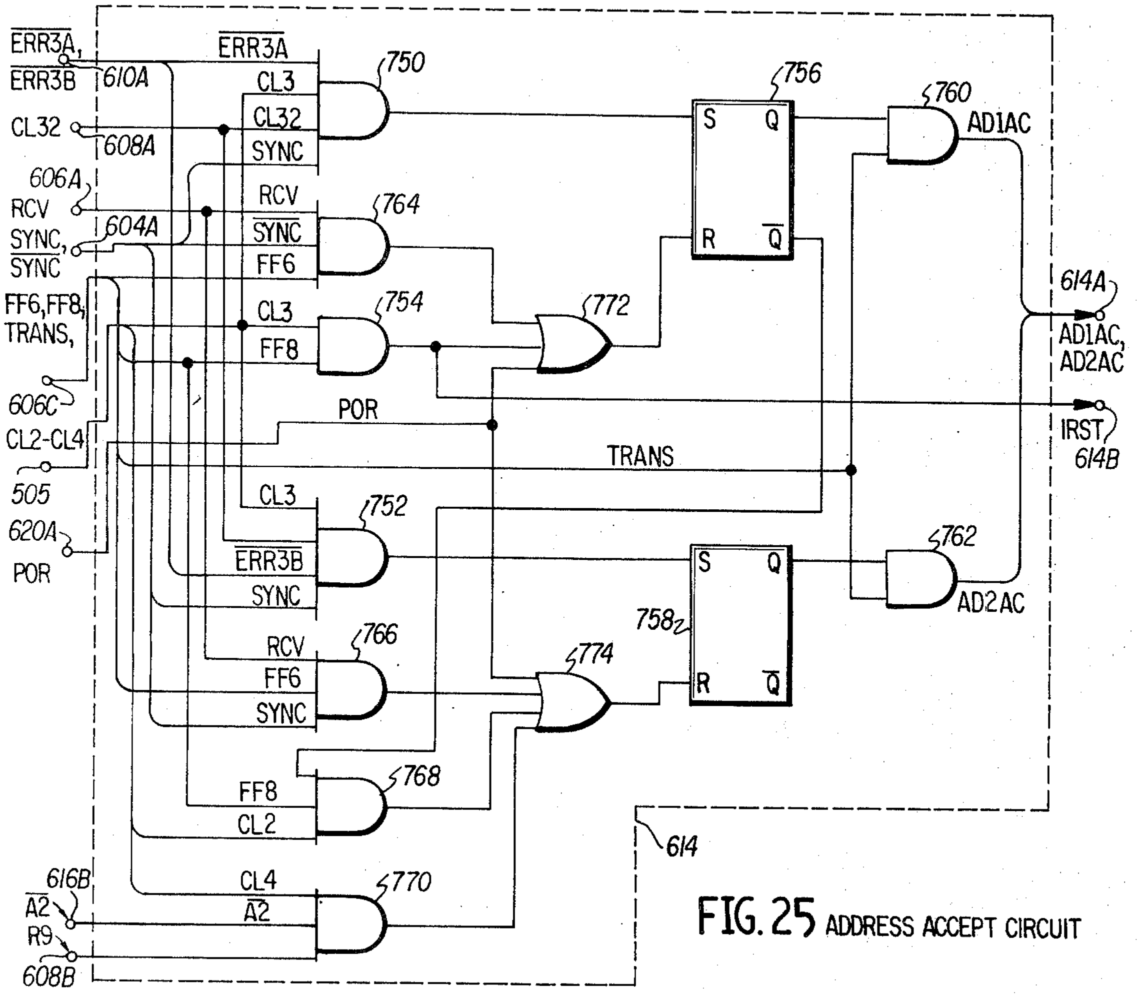
FIG. 25 ADDRESS ACCEPT CIRCUIT
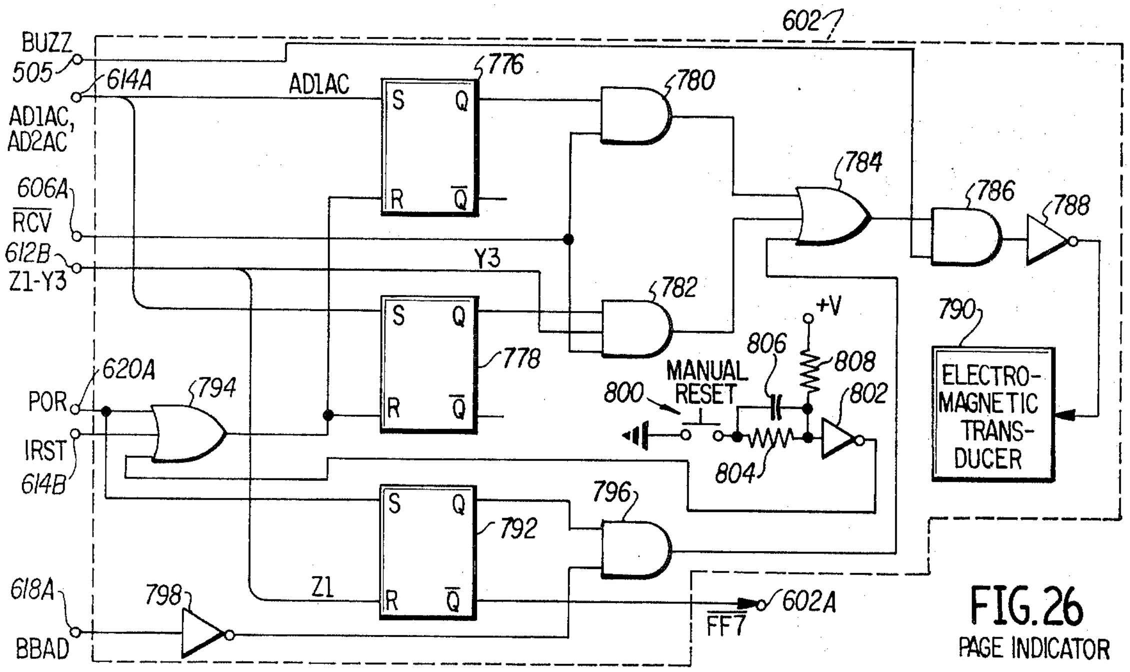
FIG. 26 PAGE INDICATOR

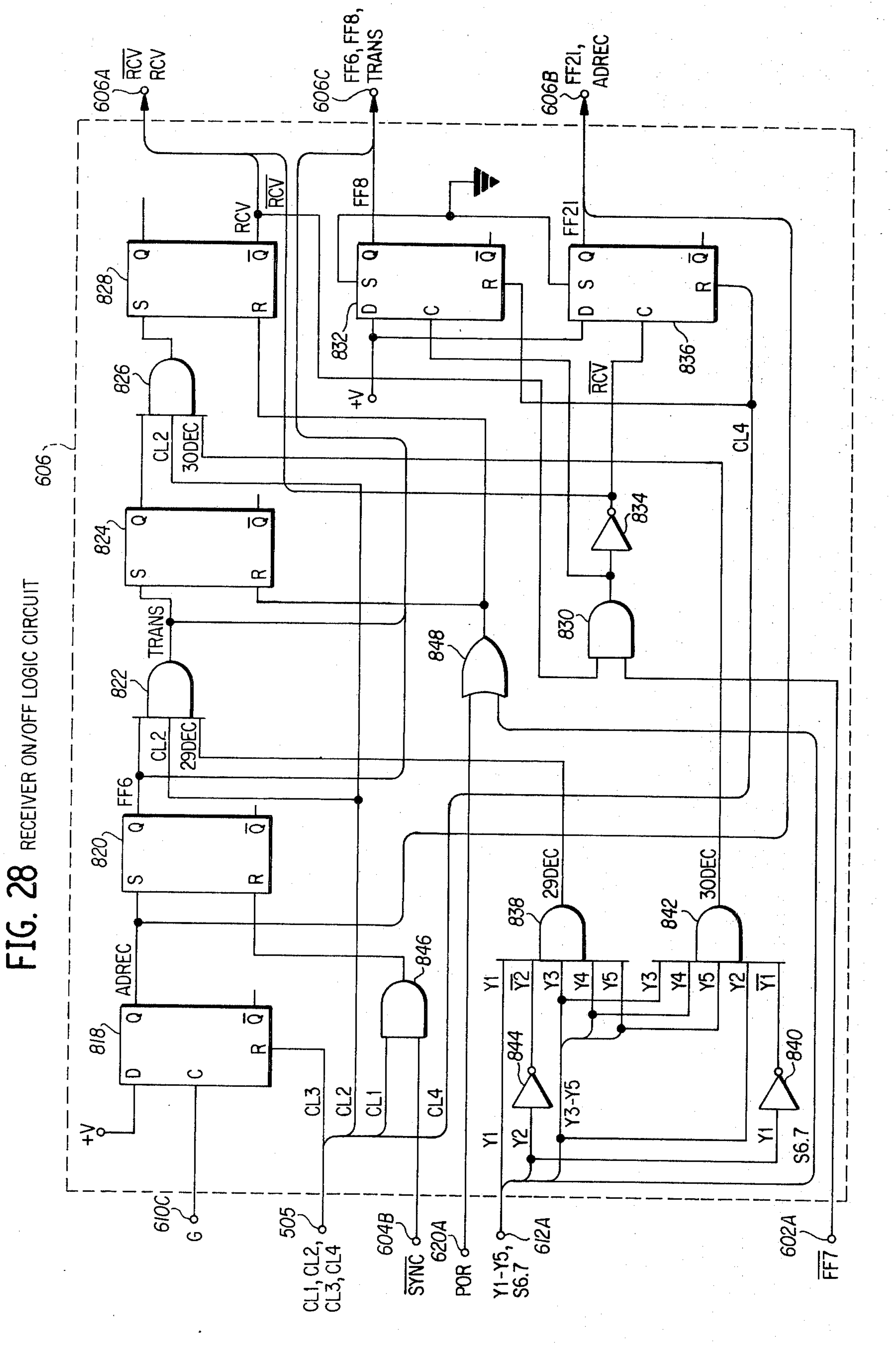
FIG. 28 RECEIVER ON/OFF LOGIC CIRCUIT

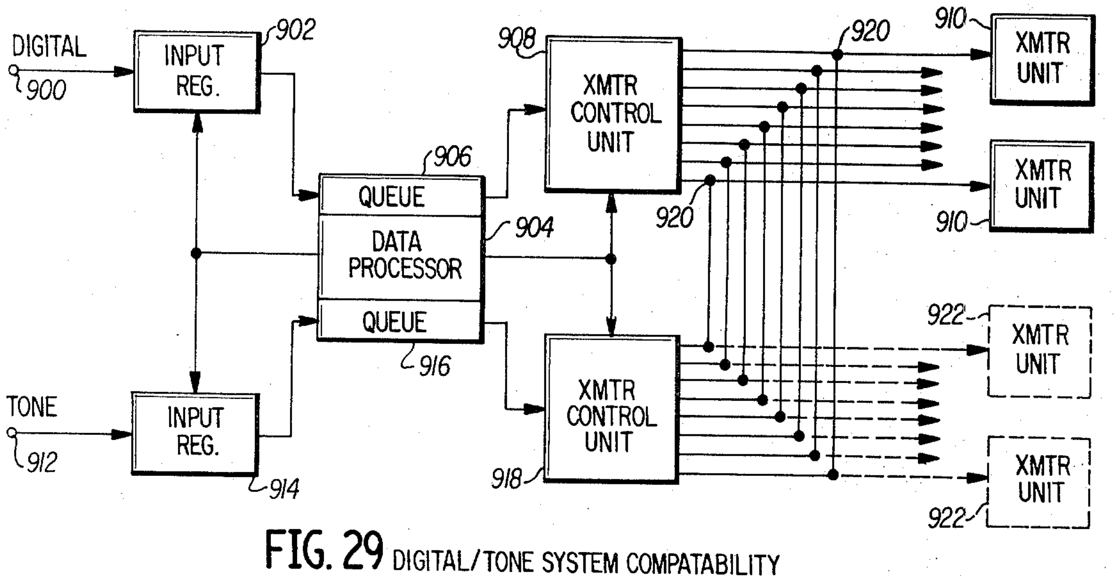
FIG. 29 DIGITAL/TONE SYSTEM COMPATABILITY
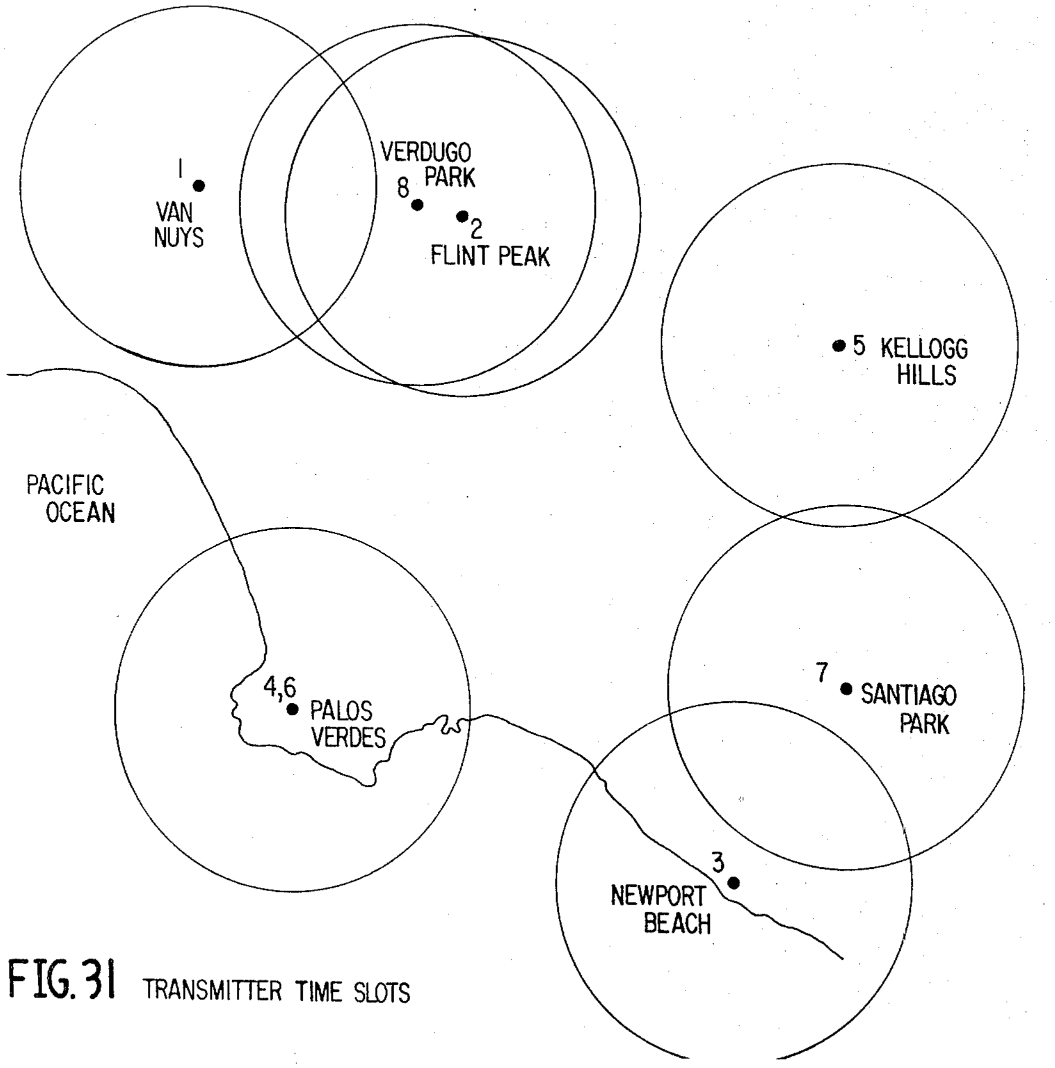
FIG. 31 TRANSMITTER TIME SLOTS

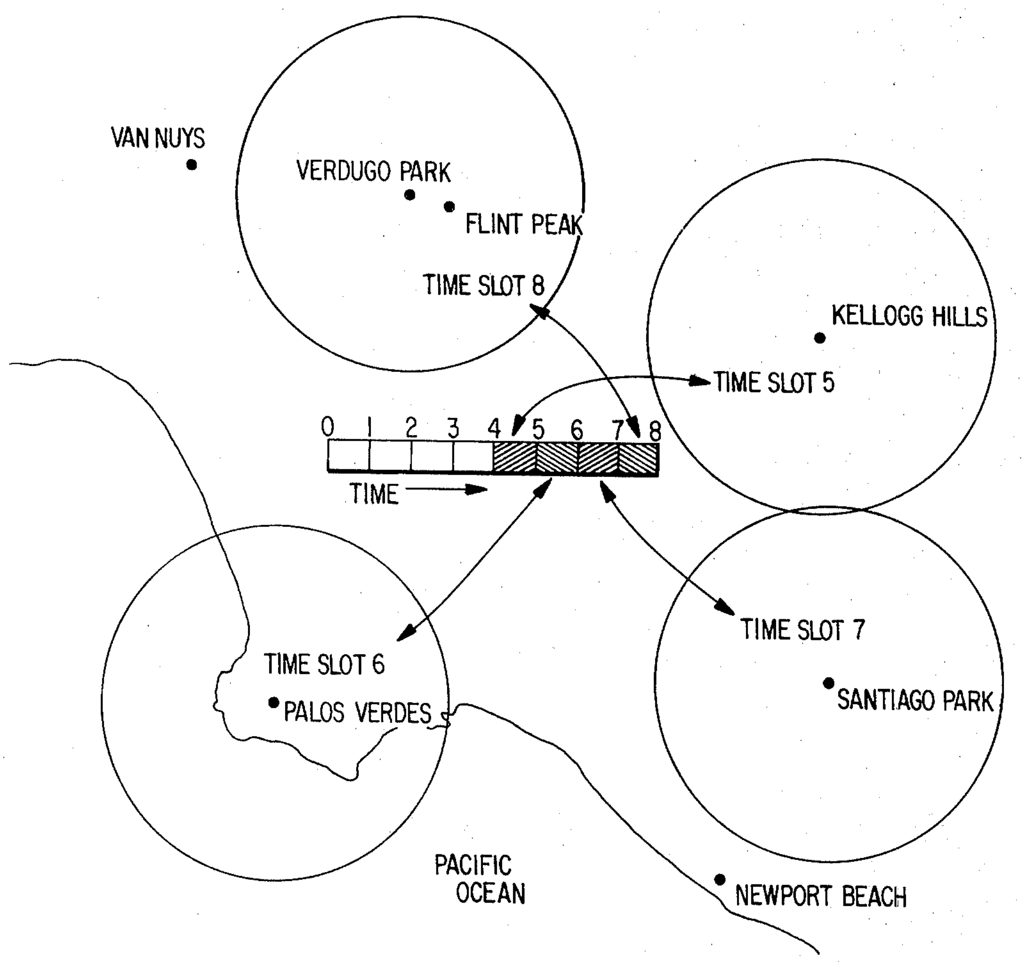
FIG. 33 SUBSCRIBER SERVICES NO. 2 AND NO. 3

DATA TRANSMISSION METHOD AND APPARATUS

BACKGROUND OF THE INVENTION

The present invention relates to a method and apparatus for data transmission and control. While the applications for the method and apparatus of the present invention are legion both for data transmission and for control, particular utility has been found in the environment of a subscriber paging service and the invention will hereinafter be described in that environment for illustrative purposes.

For example, known paging systems generally involve the selective transmission of subscriber identifying signals via electromagnetic wave energy at line-of-sight frequencies from a plurality of transmitters spaced throughout the paging area. Each of the subscribers is conveniently provided with a portable receiver which provides an audible indication upon the reception and decoding of the assigned subscriber identifying signal.

An interference problem is inherent in such known systems because the line-of-sight propagation characteristic of the electromagnetic radiation necessitates the employment of a plurality of transmitters spaced throughout the paging area to insure the complete coverage thereof, and because all of the portable receivers must be tuned to the same carrier frequency to insure reception throughout the paging area. These known paging systems have thus been faced with the undesirable alternatives of leaving areas between adjacent transmitters wherein a subscriber cannot be paged (blind spots) and of interference due to the overlapping of the propagation patterns of adjacent transmitters.

Since the existence of blind spots is unacceptable to the subscribers in a paging system, the known systems have attemped to synchronize the broadcasting of the paging signal from all of the transmitters. Theoretically at least, the signals from adjacent transmitters received by one of the portable receivers would thus be reinforcing rather than cancelling or interfering, at least when the portable receiver is equidistant from both transmitters. Synchronization, however, has remained a problem.

Attempts to synchronize the transmitters for simultaneous broadcasting have generally involved the use of various delay equalization circuits so that the signals transmitted from a central station over varying distances to the individual transmitters throughout the paging area are received by all of the transmitters at the same instant in time. In addition to the enormous technical difficulties in achieving such delay equalization, such phase sensitive systems have not proved entirely satisfactory in the urban environment in which paging systems are desirable due to the shielding and reflection of the transmitted signals by buildings and other structures.

It is accordingly an object of the present invention to obviate the deficiencies of known data transmission systems and to provide a novel method and apparatus for data transmission and control.

It is another object of the present invention to eliminate the delay equalization problems of the known multiple transmitter systems through the selective sequencing of the transmitters within a given transmission area.

It is still another object of the present invention to provide a novel method and apparatus for the elimination of radio frequency phase interference in plural transmitter systems.

In known multiple transmitter systems of the type described, an analog squelch is generally required. The utilization of an analog squelch is, however, difficult due to varying ambient noise conditions. Moreover, the utilization of an analog squelch requires considerable additional power at each of the receivers and the redundant monitoring of data where, for example, all transmitters are visible from a receiver.

In the furtherance of these objects, the present invention utilizes digital techniques by which the physical size and weight of the portable receivers may be reduced and the longevity of the receiver power supplies increased.

It is thus another object of the present invention to provide a novel method and apparatus for reducing power consumption and the physical size and weight of receiver power supplies.

Yet still another object of the present invention is to provide a novel method and apparatus for the transmission of digital data.

It is still another object of the present invention to provide a novel method and apparatus for selectively transmitting data.

The above objects are primarily accomplished in the present invention through transmitter sequencing and receiver synchronization. Since the receivers are not operative in the absence of data transmission, the probability of decoding noise is largely eliminated. Moreover, the selection by the receiver of the transmitter as a function of the characteristics of the received signal materially reduces thte probability of decoding noisy data from either a weak transmitter or a nearby transmitter which is providing noisy or otherwise undesirable signals.

It is thus another object of the present invention to reduce decoding errors and to provide a novel method and apparatus for receiving data signals only during time intervals selected as a function of the reception characteristics of the received signal.

Digital techniques for the transmission of data signals are particularly advantageous in that an extremely large amount of data may be transmitted from one location to another in short time intervals and with a minimum of complex equipment such as highly accurate frequency generators and mixers as well as highly accurate frequency decoders. For example, a digital word comprising ten binary bits can provide over 1000 different messages.

Of course, where digital techniques are used, the loss of binary bits in a particular signal may result in an erroneous evaluation of the signal. For example, in prior art digital data transmission systems where a plural bit address or data signal is transmitted and decoded by bit counting or bit comparison techniques as with an AND gate, the loss of a signal pulse due to interference or other transmission problems results in erroneous data at the receiving end of the system.

Since many data transmission and control systems have to coexist in the increasingly crowded spectrum of urban areas, a further object of the present invention is to provide a novel method and apparatus for the time sharing of all or a portion of a group of transmitters operating at or near the same frequency by a plurality of different systems within the same transmission area.

It is yet a further object of the present invention to provide a novel method and apparatus for combining digital and FSK data transmission systems within the same transmission area.

Still other problems are obviated by the present invention through the utilization of digital techniques in the evaluation of the data by the transmitters prior to the transmission thereof and by the receivers as mentioned above. It is thus a further object of the present invention to provide a novel method and apparatus for verifying the receipt of a data signal prior to the retransmission thereof.

Yet still a further object of the present invention is to provide a novel method and apparatus for the bit-by-bit evaluation of a data signal at a remote receiver.

Since the method and apparatus of the present invention has particular utility and will be hereinafter described in a subscriber paging system embodiment, it is an object of the present system to obviate the deficiencies of know paging systems and to provide a novel paging method and apparatus.

It is another object of the present invention to eliminate the delay equalization problems of known paging systems through the selective sequencing of transmitters within a given paging area.

It is still another object of the present invention to provide a novel digital paging method and paging system.

It is yet another object of the present invention to provide a novel method and paging system employing both digital and FSK paging data transmission within the same paging area.

It is still another object of the present invention to provide a novel method and paging system employing bit-by-bit evaluation of received subscriber addresses at the portable receiver.

A further object of the present invention is to provide a novel method and paging system in which receiver power is conserved through the selection of one of a plurality of time slots within a predetermined paging data frame for subscriber address evaluation.

Still a further object of the present invention is to provide a novel method and apparatus for the successive broadcast of a plurality of subscriber addresses from each of a plurality of transmitters within a given paging area.

Yet a further object of the present invention is to provide a novel method and apparatus for selectively energizing one or more groups of subscriber service area transmitters within a given paging area.

Yet still a further object of the present invention is to provide a novel method and apparatus for evaluating paging signal errors.

Yet another object of the present invention is to provide a novel method and apparatus for selectively determining the paging area as a function of the identification of the telephonic connection by which the paging signal is received at a central station.

Yet still another object of the present invention is to provide a novel method and apparatus for the time sharing of all or a portion of a single group of paging transmitters operating at or near the same frequency by a plurality of different paging systems within the same paging area.

Yet a further object of the present invention is to provide a novel method and apparatus for deriving timing signals at each of a plurality of receivers from the received paging signal.

These and many other objects and advantages of the present invention will be readily apparent to one skilled in the art to which the invention pertains from the claims and from a perusal of the following detailed description of an exemplary embodiment when read in conjunction with the appended drawings.

THE DRAWINGS

FIG. 1 is a general functional block diagram of a basic embodiment of the system of the present invention in use as a paging system;

FIGS. 2A and 2B together constitute a flow diagram illustrating the operation of the system of FIG. 1;

FIG. 3 is a timing diagram illustrating the coding format;

FIG. 4 is a diagram illustrating the transmitter spacing and sequencing within a paging area;

FIG. 6 is a functional block diagram of the input register of FIG. 5;

FIG. 14 is a more detailed functional block diagram of the timing circuit of FIG. 13;

FIG. 15 is a more detailed functional block diagram of the sync pattern comparator of FIG. 13;

FIG. 16 is a more detailed functional block diagram of the up/down counter circuit of FIG. 13;

FIG. 17 is a functional block diagram of one of the portable receivers of FIG. 1;

FIG. 19 is a more detailed functional block diagram of the sync and decode logic circuit of FIG. 17;

FIG. 20 is a more detailed functional block diagram of the sync pattern detector of FIG. 19; framing FIG. 21 is a more detailed functional block diagram of the up/down counter circuit of FIG. 19;

FIG. 22 is a more detailed functional block diagram of the matrix address generator of FIG. 19;

FIG. 23 is a more detailed functional block diagram of the address matrix circuit of FIG. 19;

FIG. 25 is a more detailed functional block diagram of the address accept circuit of FIG. 19;

FIG. 26 is a more detailed functional block diagram of the page indicator of FIG. 19;

FIG. 27 is a more detailed functional block diagram of the timing signal generator of FIG. 19;

FIG. 28 is a more detailed functional block diagram of the receiver on/off logic circuit of FIG. 19;

FIG. 29 is a functional block diagram illustrating the compatibility of the paging system of FIG. 1 with a tone system;

FIG. 30 is a functional block diagram of a preferred embodiment of one of the transmitter units of the system of FIG. 29;

FIG. 31 is a geographical representation of the Los Angeles, Calif. area with transmitter propagation patterns superimposed thereon;

FIG. 32 is a geographical representation of the area of FIG. 31 illustrating the relationship between time slots and transmitters in a single paging subscriber service system; and, FIG. 33 is a geographical representation of the area of FIG. 31 illustrating the relationship between time slots and transmitters in two additional systems.

DETAILED DESCRIPTION

Figure 2A:
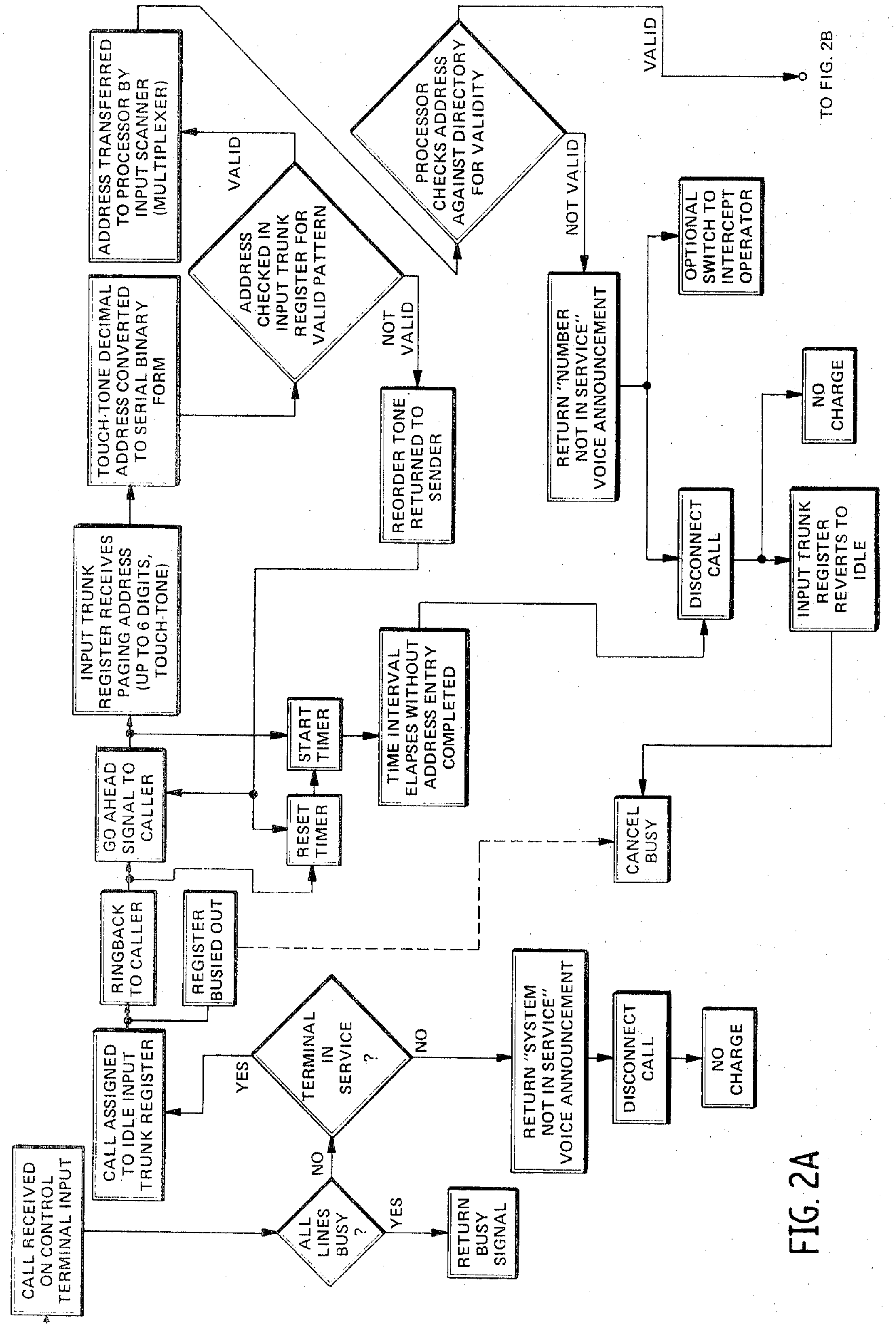

A preferred embodiment and several modifications of the method and apparatus of the present invention in the environment of a paging system are set out infra in accordance with the following Table of Contents:

TABLE OF CONTENTS

I. Basic System Description (FIGS. 1 and 2)
II. Data Format (FIG. 3)
III. Transmitter Sequencing (FIG. 4)
IV. Central Station (FIGS. 5–10)
  A. Input Register (FIGS. 6–8)
  B. Data Processor
  C. Transmitter Control Unit (FIG. 9)
  D. Diagnostic Unit (FIG. 10)
V. Transmitter Unit (FIG. 11)
VI. Alternative Transmitter Unit (FIG. 12)
  A. Sync Decoder (FIGS. 13–16)
    1. Timing Circuit (FIG. 14)
    2. Sync Pattern Comparator (FIG. 15)
    3. Up/Down Counter Circuit (FIG. 16)
  B. Error Control and Format Circuits
VII. Receiver (FIGS. 17–28)
  A. Timing Recovery Circuit (FIG. 18)
  B. Sync and Decode Logic Circuit (FIG. 19)
    1. Sync Pattern Detector (FIG. 20)
    2. Up/Down Counter Circuit (FIG. 21)
    3. Matrix Address Generator (FIG. 22)
    4. Address Matrix Circuit (FIG. 23)
    5. Address Evaluator (FIG. 24)
    6. Address Accept Circuit (FIG. 25)
    7. Page Indicator (FIG. 26)
    8. Timing Signal Generator (FIG. 27)
    9. Receiver On/Off Logic Circuit (FIG. 28)
VIII. Digital/Tone System Compatibility (FIGS. 29 and 30)
IX. Paging Service/Plural Single Paging Area Flexibility (FIGS. 31–33)

I. BASIC SYSTEM DESCRIPTION

With reference to FIG. 1 where a basic paging system embodiment of the present invention is illustrated, the central station 50 may, where the capacity of the system so dictates, include a suitable general purpose digital computer (not shown). The central station 50 may be accessed through any suitable switching system such as the illustrated commercially installed telephone system 52 to receive subscriber designating signals via the commercially installed telephone lines and exchanges of the system 52. In response to the received subscriber designating signals, the central station 50 may generate paging signals for transmission to one or more of a plurality of transmitter units 54 spaced throughout the paging area.

The paging signals transmitted from at least one of the transmitter units 54 are received by portable receivers 54 carried by the individual system subscribers. The receipt of the address signal assigned to a particular subscriber by his portable receiver 56 will provide the subscriber with an indication that a call has been received. The subscriber may thereafter determine the reason for the page by seeking a telephone and dialing a designated number to receive a message or by directly dialing the person who initiated the page if that information is known to the subscriber.

Figure 2B:
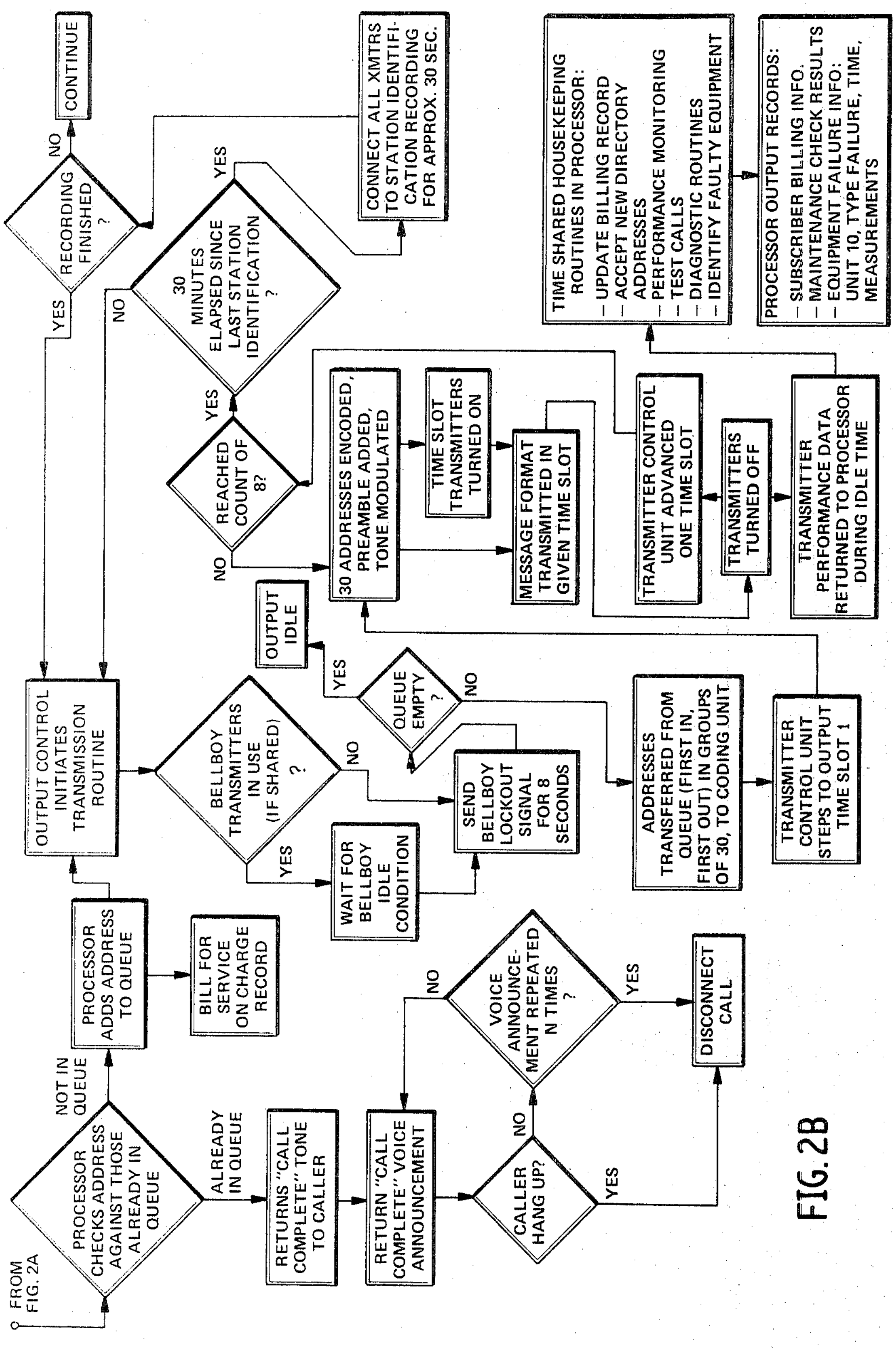

As is illustrated schematically in more detail in the flow diagram of FIG. 2, the party desiring to initiate a page to one of the subscribers may dial a telephone number assigned by the telephone system subscriber service to the central station. This paging system access number may, for example, include one or more conventional telephone numbers each of two or more digits. Where, for example, a seven digit number is used as the paging system access number. all seven digits may be dialed or transmitted as tones from a Touch Tone telephone. In response thereto, the telephone switching equipment will connect the dialing party's telephone to a central station trunk line and provide a "ringing" signal to indicate to the central station that it is being called.

With continued reference to the flow chart of FIG. 2, a "busy" or "hold" signal may be returned to the dialing party if all incoming lines are busy at the central station. If an incoming line is available and if the terminal is in service, the incoming call is assigned to an idle input trunk register and an audible indication, e.g., a "dial" tone and/or an audible voice announcement, may be returned to the dialing party. If, for some reason, the terminal is not in service, a "system not in service" voice announcement may be returned to the dialing party and the call may thereafter be disconnected with no charge to the dialing party.

As will be subsequently explained, the identification of the incoming line may have significance in plural system operation.

After the incoming call has been assigned to an idle input trunk register, the register is busied out by, for example, providing an "off-hook" indication through the closing of a relay. A "go-ahead" signal may then be returned to the paging party and a timer started. The dialing party may then dial the subscriber address number assigned to the particular subscriber to be paged. This type of operation is hereinafter referred to as "end-to-end" dialing, i.e., the digits introduced by the dialing party at one end are transmitted directly to the central station at the other end.

Where, however, end-to-end dialing is not utilized, i.e., a portion of the seven digit telephone number is sufficient to establish the telephonic connection, the subsequently dialed portion of the seven digit telephone number may be stored in the telephone system for retransmission to the central station. These retransmitted two to four digits may be decoded by the central station to provide the subscriber address.

With continued reference to FIG. 2, the subscriber identifying signal, e.g., four or five digits, may be received by the input trunk register as tones or a dial pulses if the switching equipment so provides. If received as two frequency tones, they may then be converted at the central station 50 to serial binary form and checked for frequency validity. If the frequencies of the tones are not valid, e.g., an improper combination, a "reorder" tone or announcement may be returned to the dialer and the timer reset. If the frequencies of the tones are valid, it may be transferred serially in binary form to the computer or other data processor at the central station and there checked against a directory of subscriber addresses for validity.

If the subscriber address is not in the directory stored in the computer or data processor, a voice announcement to that effect may be returned to the caller, the call may be disconnected without charge to the caller, and the input trunk register may be reset to its idle position. If the binary subscriber address represents a valid subscriber address, the serial binary signal may be compared with those subscriber addresses then awaiting transmission to the paging transmitter units 54 as paging signals. If not already in storage, the binary signal may be stored in a first-in, first-out waiting queue for subsequent transmission to the transmitter units 54. Alternatively, the subscriber address may be coded or include a priority indicating digit or portion permitting the priority ordering of the subscriber address in the waiting queue.

Since the answering of the call and receiving and storing of the subscriber addresses may be fully asyncronous to other functions performed by the central station 50, a large number of trunks, e.g., up to 120, may be serviced simultaneously in a suitable conventional manner such as by a time sharing digital computer technique.

The serial binary subscriber addresses stored in the waiting queue may then be sequentially scanned and encoded for transmission as a paging signal to the transmitter units 54 illustrated in FIG. 1. The computer at the central station 50 may sequentially read a predetermined number of subscriber addresses in the waiting queue, e.g., 30 addresses, and encode and combine the selected addresses with synchronizing signals to form a message word having a predetermined number of binary bits. A message word including both the address portions and the synchronizing portions may then be transmitted by the transmitter control units at the central station 50 to the remote transmitter units 54 of FIG. 1 at a predetermined bit rate during a plurality of separate time intervals or time slots, e.g., eight time slots, which together make up a major data frame as will hereinafter be explained.

With reference again to FIG. 1, the message word received by one of the transmitter units 54 during the assigned time slot is evaluated and, if the synchronizing portion of the message word is recognized as valid, the transmitter unit 54 receiving the message word may transmit the entire message word including the synchronizing portion. This evaluation of the message word at each of the transmitter units 54 prevents false keying of the transmitters in the transmitter units 54 by spurious signals while obviating the need d.c. transmitter control signals or transmitter address signals supplied by either an independent channel or via a time slot designated for transmitter control or address signals. Thus, there is no necessity in the present invention for limiting a time slot to use solely for transmitter control purposes.

At the end of one major frame, i.e., after all of the transmitters have transmitted the message word during the assigned time slots, a new message word assembled from the next thirty subscriber addresses in the waiting queue may be sequentially transmitted to the transmitter units 54.

Since the transmission of data to the transmitter units 54 is asynchronous to the placing of paging requests into the waiting queue for subsequent transmission, there may be times during which the predetermined number of subscriber addresses which make up one message word may not be available in the waiting queue. When this happens, the unused portion of the message word may be filled out with dummy subscriber addresses or "idle words" designated for that purpose. This ensures that the transmission of data is synchronous, i.e., the same number of binary bits is transmitted during each time slot, further ensuring that the receivers 56 do not experience an undesired loss of synchronization as will hereinafter be described.

The dummy subscriber addresses may also be utilized for system testing and for the evaluation of the transmission of the paging signals by the transmitter units 54 where a separate monitor receiver is provided for that purpose.

With reference again to FIG. 2, the computer at the central station 50 of FIG. 1 may additionally perform various automatic or operator initiated compiling and maintenance routines while the system is in operation. For example, the computer at the central station 50 may record all of the calls placed through the paging system for billing purposes and may perform a number of other tasks necessary for the updating of the system, e.g., accepting new directory addresses. The computer may also initiate test calls and other diagnostic and maintenance routines, and may indicate, for example, the occurrence of equipment failure.

In addition, the computer at the central station may be made compatible with other types of paging systems presently in use, e.g., a tone system, through the use of a time sharing technique. For example, at the end of each major data frame (every 8 seconds in the embodiment hereinafter described), the computer may interrogate the tone system to determine whether or not it has requested the use of the system transmitters. If the tone system has requested transmitters, the computer may send an acknowledgment command to the tone system and release the appropriate transmitters. When the request has been terminated, the computer may then control the transmitters in the manner previously described to transmit the encoded message words stored in the waiting queue.

As an alternative to the accessing of the paging system by a seven digit telephone subscriber number as described supra, the first three digits of the telephone number (the NNX Code) may effect the connection between the page initiating party's telephone and central station. In this event, the last four digits of the dialed seven digit number may identify the subscriber to be paged. However, the use of NNX Codes imposes numerical limitations on the system in that only 10,000 subscribers can be assigned four digit addresses beginning with a particular NNX Code. A new NNX Code is thus required for every 10,000 subscribers necessitating the use of five or six different NNX Codes for a system utilized by 50 to 60,000 subscribers. Since the number of possible three digit NNX Codes is also limited, a large number of NNX Codes are often difficult to obtain in a heavily populated area. It is thus generally more desirable to use all seven digits of the telephone number to gain access to the paging system and, after gaining access, to dial a number of subsequent digits designating the subscriber. An additional advantage is that a five or six digit subscriber identification may be utilized in lieu of the four digits otherwise generally available. A substantial increase in capacity may thus be realized.

The embodiment of the central station described supra utilizes the two frequency tones of the Touch Tone system for subscriber identification, i.e., the subscriber designating signals are combinations of high and low frequency tones. To use such an embodiment with the conventional dial telephone, it may be necessary for the daling party to utilize a suitable conventional tone generator to provide the tones for introduction into the established telephone telephonic connections.

Alternatively and as earlier explained, the central station may be configured to receive the subscriber designation signal in digital form in which event the frequency combination validity evaluation earlier described may be eliminated.

Irrespective of the form of the subscriber designation signals and the use or non-use of an NNX Code, the timer initiated upon the generation of "go-ahead" signal will disconnect the call and place the input trunk register in its idle condition if the subscriber identification signals are not received within a predetermined time, e.g., 20 seconds.

The transmission link between the central station 50 and the transmitter units 54 of FIG. 1 may take any convenient form, such as commercially installed or private telephone lines or radiant energy (e.g., lasers, microwave radio, or the like). For example, a separate telephone line may be utilized to connect the central station 50 with each of the transmitter units 54 and each of the transmitters of the transmitter units 54 may transmit the message word during one or more of the time slots through the selective application of the message word to the different telephone lines during a specific time slot.

If voice quality telephone lines are utilized to connect the central station 50 with each of the transmitter units 54, the paging signal, i.e., the message word, may be converted to FSK form for transmission to the remote transmitters. The message word may then be sequentially transmitted to the remote transmitters via the voice quality telephone lines in accordance with any predetermined transmission pattern.

II. DATA FORMAT

The data format utilized with the preferred embodiment of the paging system is illustrated in FIG. 3. As was previously described in connection with FIG. 1, the dialing party initiates subscriber designation signals for transmission to the central station 50 through the telephone system 52. These subscriber designation signals are converted to binary form and stored in a waiting queue at the central station 50 for subsequent encoding and combination with synchronizing signals to form a paging signal which may, for example, comprise a 30 subscriber address message word for repetitive transmission in a predetermined number of time slots during one major data frame. Repetition of the same message word is, of course, not required in a single transmitter system but can be effected if desired.

In the example shown in FIG. 3, each major frame 58 may comprise eight 1 second time slots 60 designated $T_1$ through $T_8$. The identical message word 62 may be transmitted during each of the eight time slots of a particular major frame from a different transmitter or group of transmitters as will hereinafter be described in greater detail. Thus, the number of transmitter units 54 of FIG. 1 may be at least equal to the number of time slots utilized in a major frame and a particular transmitter of one of the transmitter units 54 may transmit a message word 62 during one or several of the time slots 60 in a major frame 58. The number of time slots 60 may, of course, exceed the number of transmitters in the system where expansion of the paging area is contemplated.

With continued reference to FIG. 3, each message word 62 is a serial pulse train preferably commencing with a group of 12 binary bits, e.g., 12 binary ZERO bits as indicated at 64, followed by a synchronization (sync) acquisition signal 66, and in turn, followed by 30 different addresses or address words A1–A30 which may be separated from each other by identical sync maintenance signals 68 of four binary bits each. The sync acquisition signal 66 preferably includes four identical 4 bit patterns each separated by a 32 binary bit signal, e.g., 32 binary ZEROS in the signal illustrated in FIG. 3. The four identical 4 bit sync patterns (designated SA) are coded in accordance with a predetermined binary code, e.g., 1101 as illustrated. Thus, the sync acquisition signal may be indicated as SA, 0's, SA, 0's, SA, 0's, SA where SA designates the selected 4 bit code and 0's designates the 32 binary ZERO's.

Each address word A1–A30 preferably includes a 31 bit Bose-Chaudhuri coded address designation and one parity bit. Adjacent of the 30 address words A1–A30 are separated by the sync maintenance signal 68 (designated SB) which is preferably a four bit serially coded signal which differs from the sync acquisition code SA. Thus, each message word 62 transmitted during one of the time slots $T_1$–$T_8$ comprises 1,200 binary bits.

The initial 12 binary ZERO bits indicated at 64 in FIG. 3 are not required but may be utilized to assist in bit synchronization of the receivers as will hereinafter be described. In addition, these 12 binary ZERO bits provide some time spacing between the turn on of a transmitter and the transmission of the sync acquisition signal 66, which time spacing may be desirable. The initial 12 binary bits need not, of course, be all binary ZERO's but may be any predetermined code. Simplification of the logic is, however, possible by the use of ZERO's in the described embodiment and the use thereof may be desirable where, for example, the communications link between the central station 50 and transmitter units 54 of FIG. 1 is omnidirectional transmission of electromagnetic energy at radio frequencies.

When transmitted by the transmitter units 54 of FIG. 1, the synchronization acquisition signals illustrated in FIG. 3 may be utilized by the individual paging receivers 56 to determine the bit error rate of the paging signal prior to decoding the subsequent address words as will subsequently be described in greater detail. The four bits sync maintenance signal SB may be unique to the paging system operating in a particular paging area and may be utilized both to assist in determining the bit error rate and to ensure proper framing of each of the address signals. Moreover, if signals are received by a portable receiver assigned to one paging area from a paging system in an adjacent paging area, the sync maintenance signal SB assigned to the system of the adjacent area will be rejected by the receiver. The likelihood of false synchronization and possible erroneous paging of receivers by signals from the wrong system is thus significantly reduced.

As previously discussed, each of the address words A1–A30 comprises 32 bit positions. The first 31 bit positions may identify the subscriber being paged and the last bit may be inserted as a parity bit. All 32 bits may, however, be used as the subscriber address. The preferred code is a highly redundant Bose-Chaudhuri 31–16–3 code, i.e., 31 total bits are utilized to code a 16 bit message with a 7 bit (2 time 3 + 1) difference between each message. The use of this code with an even parity bit increases the bit difference between codes to a minimum of 8 bits between adjacent unique addresses while allowing the system to service over 65,500 subscribers.

In addition to the extremely high subscriber address capacity provided by the Bose-Chaudhuri 31–16–3 code, the use of this code makes the probability of accepting the correct address very high, while at the same time severely limiting the probability of accepting an address intended for another subscriber, even in very high error environmens. For example, if two bit errors are tolerated in decoding an address for a particular subscriber, the probability of a receiver accepting that address is over 99.99 percent. Moreover, since only two bit errors are tolerated in this example in decoding an address, there are still at least six bit differences between the subscriber's address and any other transmitted address.

If the extremely high subscriber capacity achieved with the above-described code is not required, a Bose-Chaudhuri 31–11–5 code may be utilized. The use of this code limits the number of allowable users to 2,047 but increases the number of differences between any two coded address signals to at least 12 bits, significantly reducing still further the probability of false calls. On the other hand, if still higher capacity is required, a Bose-Chaudhuri 31–21–2 code may be utilized. This code provides subscriber capacity of over 2 million with the difference between any two addresses being reduced to a minimum of 6 bits. This lower minimum bit difference of 6 tends to slightly increase the probability of a false call, but the increase is very slight when compared to the vast increase in system capacity.

Irrespective of which of the above codes is utilized, the system data format as illustrated in FIG. 3 may remain the same. Moreover, the central station does not require 31 bit capacity for storing incoming addresses and directory addresses since the highly redundant Bose-Chaudhuri encoded addresses may be readily generated from address signals having fewer than 31 bits, e.g., from a 16 bit address signal when utilizing the preferred Bose-Chaudhuri 31–16–3 code.

III. TRANSMITTER SEQUENCING

Referring now to FIG. 4, the locations of the transmitter units 54 of FIG. 1 are illustrated as a plurality of circles which approximate the propagation pattern of the transmitter associated with the respective transmitter units 54. Each transmitter in FIG. 4 is designated TX1–TX8 corresponding to the time slot T–T8 of FIG. 3 in which that transmitter is operative. All of the transmitters designated TX1 in FIG. 4 may, for example, transmit the message word 62 of FIG. 3 during the time interval T1.

With continued reference to FIG. 4, the transmitters TX1–TX8 are desirably arranged so that the combined propagation pattern of all of the transmitters provides full coverage of a paging area 72 outlined in phantom. In addition, the propagation patterns of adjacent transmitters, e.g., TX1 and TX3, TX1 and TX4, and TX1 and TX5, may be made to overlap somewhat in the utilization of the present invention without the interference problems associated with simultaneous transmission.

With the utilization of eight time intervals T1–T8 during each major frame 58 as shown in FIG. 3, eight transmitters TX1–TX8 may be provided throughout the paging area 72. If, however, the paging area 72 is extremely large, a plurality of transmitters sufficiently separated to prevent interference therebetween, i.e., to prevent simultaneous reception by a receiver from both transmitters, may be utilized to transmit the message word during a particular time slot. Thus, for example, during the time slot T1, the five transmitters labelled TX1 in FIG. 4 may transmit the identical message word 62. During the next time slot T2, the five transmitters labelled TX2 may transmit the same message word. In this manner, a message word may be transmitted throughout the paging area 72 during one major frame comprising time slots T1–T8 irrespective of the size of the area without the RF phase interference problems of known simultaneous transmission systems.

A message word 62 may be successively transmitted to each transmitter or group of transmitters, e.g., TX1, TX2, TX3, . . . TX8, during one major frame. When, for example, the message word is transmitted to the transmitters TX1, the transmitters TX1 decode the sync acquisition signal SA. If the sync acquisition signal is decoded properly, the transmitter is keyed or turned on. A buffer circuit stores the message word so that none of the data is lost during the decoding operation, and thus, the entire message word beginning at the first bit of the 12 bit 0's pattern 64 or at any other desired point in the message word, e.g., at the first bit of the sync acquisition signal, may be forwarded to the transmitter modulator at the time the transmitter is turned on. The transmitter may then transmit during the assigned time slot and turn off after counting the 1.200 pulses which occur in the 1 second time slot in the embodiment described.

Since each transmitter is assigned to transmit during one minor frame or time slot, and since during a given major frame each transmitter transmits the same message word as is transmitted by the other seven transmitters, a receiver in the paging area 72 would have eight chances to read the message word if the signal transmitted by all of the transmitters could be received by the receiver. In a large metropolitan paging area with many obstructions such as tall buildings, a particular receiver will not generally be able to receive the message word transmitted from all eight of the transmitters. However, the receiver should receive at least one transmitted message word and may, in fact, normally receive the same message word transmitted from two or more different transmitters during different time slots in a major frame. In actual operation, as will hereinafter be explained in greater detail, the receiver may select one time slot for message word evaluation on the basis of the reception characteristics of the received signal. The receiver may thus be prevented from evaluating the addresses in the message word in more than the one selected time slot in a major frame thereby conserving power.

For example as illustrated in FIG. 4, a receiver 74 may be located in the area covered by the primary propagation pattern of one of the transmitters designated TX4. During the time slots T1, T2 and T3, the receiver 74 may receive a faint signal from each of the transmitters TX1–TX3, which may or may not be sufficiently error free to permit proper decoding of the message word transmitted during these time slots.

Should the receiver 74 receive signals from more than one transmitter in the same time slot in ratios which produce an unacceptable error condition, the receiver 74 will abandon that time slot and select another time slot where the error rate is acceptable even though the signal strength is reduced. In a tall building, for example, a given receiver might receive the message word from all or at least a majority of the transmitters within the system and would have great flexibility in selecting a time slot with adequate bit error conditions.

As will subsequently be described in greater detail, the receiver 74 decodes the sync acquisition signal including the four bit SA patterns and the 32 0's patterns transmitted during the inital portion of each time slot and, if the sync acquisition signal is received substantially error free, the receiver decodes the subsequently received address words. At the end of a time slot, the receiver 74 is deenergized for slightly less than 7 seconds if substantially error free sync acquisition and sync maintenance signals are detected properly throughout the time slot.

Assuming, for example, that the receiver 74 does not acquire sync during the time slots T1 and T2 due to obstructions between the transmitters TX1 and TX2 and the receiver 74, the receiver 74 will remain energized until sync is acquired at which time the addresses immediately following the sync acquisition signal in that message word will be evaluated. The receiver 74 may, for example, receive a substantially error free message word from the transmitter TX3 during the time slot T3 if, as illustrated in phantom, the propagation pattern of the transmitter TX3 extends into the area in which the receiver 74 is located. The receiver 74 would thus successfully synchronize during the time slot T3 and, after having decoded the 30 address words transmitted during that time slot, would shut down for approximately 7 seconds to be automatically reenergized in time to once again receive a message word during the time slot T3 in the next major frame.

The successful evaluation of an address by a receiver may result in the generation of an audible tone or ennunciated message so that the subscriber is informed of the page. The receiver may be provided with two or more address evaluators and respond with different audible tones to indicate to the subscriber the origin of the page, e.g., home or office, or the degree of urgency of the page. The two different audible signals may be a steady and an interrupted tone and any suitable visual indicators may be utilized in addition to, or in lieu of, the audible signals.

IV. CENTRAL STATION

Figure 5:
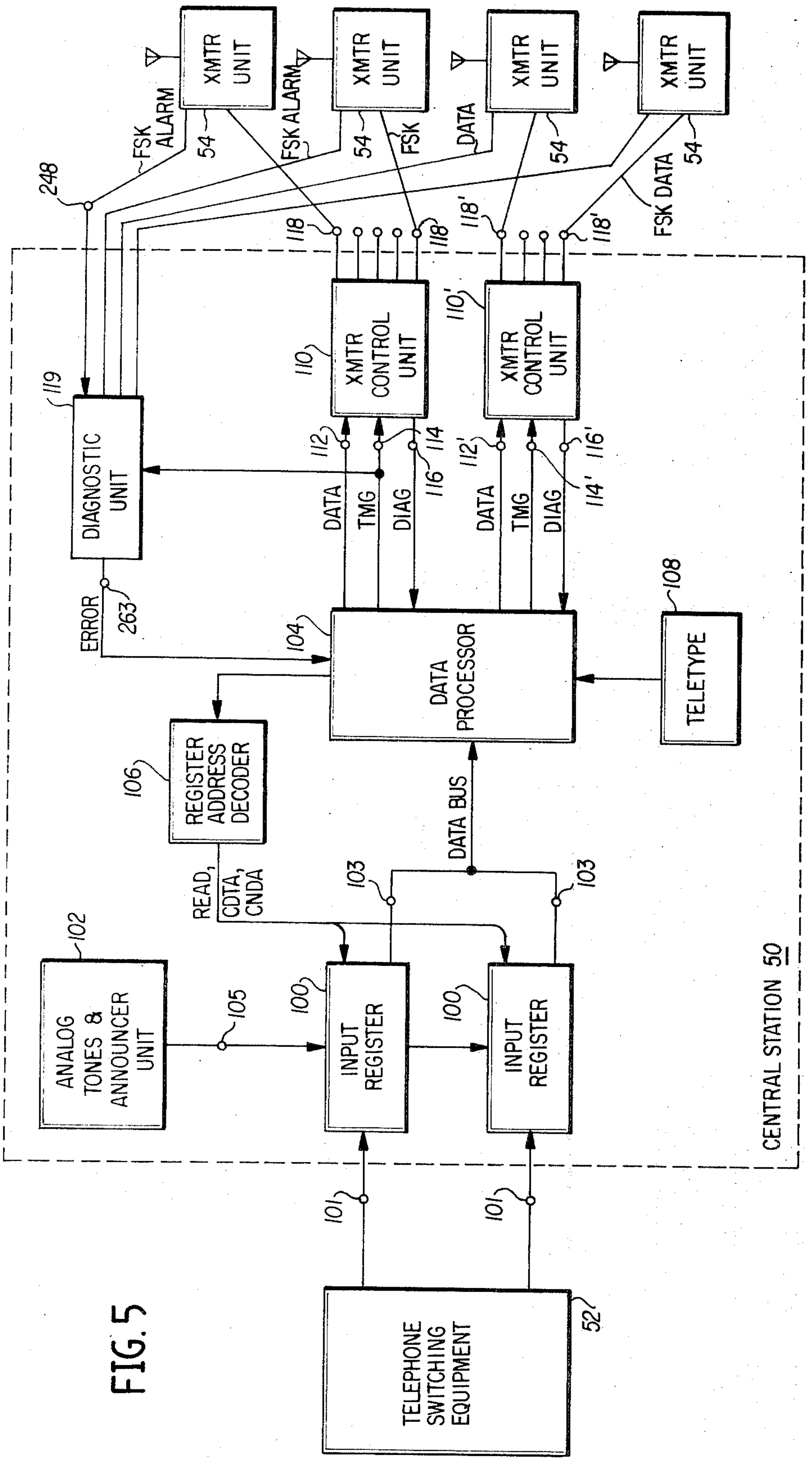
FIG. 5 is a more detailed functional block diagram of the central station of FIG. 1.

The central station 50 of FIG. 1 is illustrated in greater detail in FIG. 5. Referring now to FIG. 5, the central station 50 may be interfaced with a commercial telephone system 52 of FIG. 1 through an input interface unit which may include a plurality of input registers 100 and an analog tones and announcer unit 102.

As earlier explained in connection with FIGS. 1 and 2, the dialing party may be connected to the central station 50 of FIG. 1 by initiating dialing pulses or multifrequency or other tone signals. At the central station 50, the dialing party is automatically connected to the input registers 100. In an end-to-end dialing embodiment, all seven digits of the telephone number may be used to effect this connection and the paging address may be sent all the way to the central station 50 by subsequent tone signals initiated by the dialing party, i.e., the subscriber designation signals are sent from one end of the system to the other end thereof.

A ring detector in an idle one of the input registers 100 may detect the "ringing" signal supplied from the telephone equipment and the input register 100 readied for receipt of a paging address by, for example, completing the d.c. telephone loop, i.e., providing an "off-hook" indication. When the d.c. loop is closed, appropriate tones or announcements generated by the analog tones and announcer unit 102 may be applied to the input registers 100 via the terminal 105 to indicate to the dialing party that he may proceed with the dialing of a paging address.

With continued reference to FIG. 5, the page initiating party may then dial a four or five digit paging number utilizing any suitable conventional Touch Tone telephone or tone generator. This two frequency tone signal may then be converted into a digital signal by the input register 100 and thereafter applied to a data processor 104 via an output terminal 103 when the input registers 100 are scanned by the data processor through register resiter address decoder 106. For example, the data processor 104 may sequentially apply address signals assigned to the various registers 100 and command and control signals to the register address decoder 106 to gate to the register 100 being addressed the various command and control signals such as READ, CDTA and CNDA subsequently discussed in connection with FIGS. 6 and 7. In addition, "readback" signals indicative of control or diagnostic operations ordered by the data processor 104 may be applied from the input registers 100 to the data processor 104 (directly or through a suitable analog to digital converter, where needed) to provide diagnostic information as to the operation of the input registers 100.

As has been previously discussed in connection with FIG. 2, the data processor 104 of FIG. 5 may perform various validity checks, encoding functions, timing and sequencing functions and numerous accounting functions for billing and other purposes. For example, the data processor 104 may read the address stored in the input register 100 and compare it to the addresses stored in the directory to ensure its validity. If the address is valid, the data processor 104 may again address the input register 100 through the decoder 106 and provide, for example, a READ4 or "send valid address" signal to the input register 100 indicating that the call is complete. The input register 100 may then gate a suitable indication or announcement from the analog tones and announcer unit 102 onto the telephone line 101 to indicate to the dialing party that the call has been accepted.

Since the input registers 100 are selectively addressed by the data processors 104, the data processor 104 knows which register is being read at any particular time. Various groups of input registers may therefore be assigned to answer calls on particular trunk lines providing additional information from which the identity of the paging addresses can be determined. For example, the dialing of one telephone number such as NNX-1,000 may connect the caller to one group of input registers 100 and the dialing of another telephone number such as NNX-2,000 may connect the caller to a different group of input registers.

The data processor 104 may automatically add a predetermined digit to the subscriber designating signals received by the first group of input registers and a different predetermined digit to the subscriber designating signals received by the second group of input registers. In this manner, fewer digits may be required to designate a subscriber to be paged. Likewise, as will be explained infra, the information as to the particular register or group of input registers which receive the subscriber designating signals may be utilized by the data processor 104 to designate the area in which the subscriber is to be paged.

A suitable conventional teletype unit 108 may provide input/output capabilities which may be desired for initiation of diagnostic checks, for making directory changes and for program and other software changes where the data processor 104 is a general purpose digital computer.

The encoded digital paging signal DATA including digital address words and synchronizing signals may be applied from the data processor 104 to one or more transmitter control units 110 via an input terminal 112. For example, the transmitter control unit 110 may control the transmission of paging signals in one paging area, e.g., Washingtion, and the control unit 110' may control transmission in another paging area, e.g., Baltimore. The data processor may apply the DATA signal to either or both control units for transmission of paging signals depending, for example, upon the previously designated paging area or areas in which the subscriber is to be paged.

Timing or gating signals TMG may be supplied from the data processor 104 to the transmitter control unit 110 via a plurality of output lines connected to single collective terminal 114. In addition, a DIAG signal providing transmitter status and diagnostic information may be applied from the transmitter control unit 110 to the data processor 104 via terminal 116.

The output signals from the transmitter control units 110 and 110' may then be sequentially transmitted to a plurality of transmitter units 54 via the respective output terminals 118 and 118'. For example, a particular paging area may have eight transmitter units 54 controlled by the transmitter control unit 110. Assuming that each transmitter unit 54 represents a different time slot, the transmitter control unit 110 may transmit a digital message word comprising address words and synchronizing signals to each of the transmitter units 54 during one or more time slots assigned to each transmitter.

Alternatively, the data processor 104 may apply data and timing signals to the transmitter control unit 110' for transmission of paging signals to a plurality of transmitter units 54 located in a different paging area and controlled by the transmitter control unit 110' may be very small area and require only one or perhaps two transmitter units 54 to cover the entire area. Thus, the transmitter control unit 110' may transmit paging signals to only one or two transmitter units 54 via the output terminals 118'. Moreover, where the two different paging areas are close together or even overlap, the data processor 104 may be programmed to transmit the DATA signals to the transmitter units 54 in the different paging areas in a sequence which prevents, or at least minimizes, radio frequency phase interference between the transmitters in the two areas.

The paging signals actually transmitted by the transmitter units 54 and FSK ALARM signals indicating transmitter malfunctions may be fed back to a diagnostic unit 119 to which the timing signals TMG from the data processor 104 are also applied. As will be subsequently explained in connection with FIG. 10, the diagnostic unit 119 may provide an ERROR signal to the data processor 104 for evaluation and/or display.

A. Input Register

Figure 7:
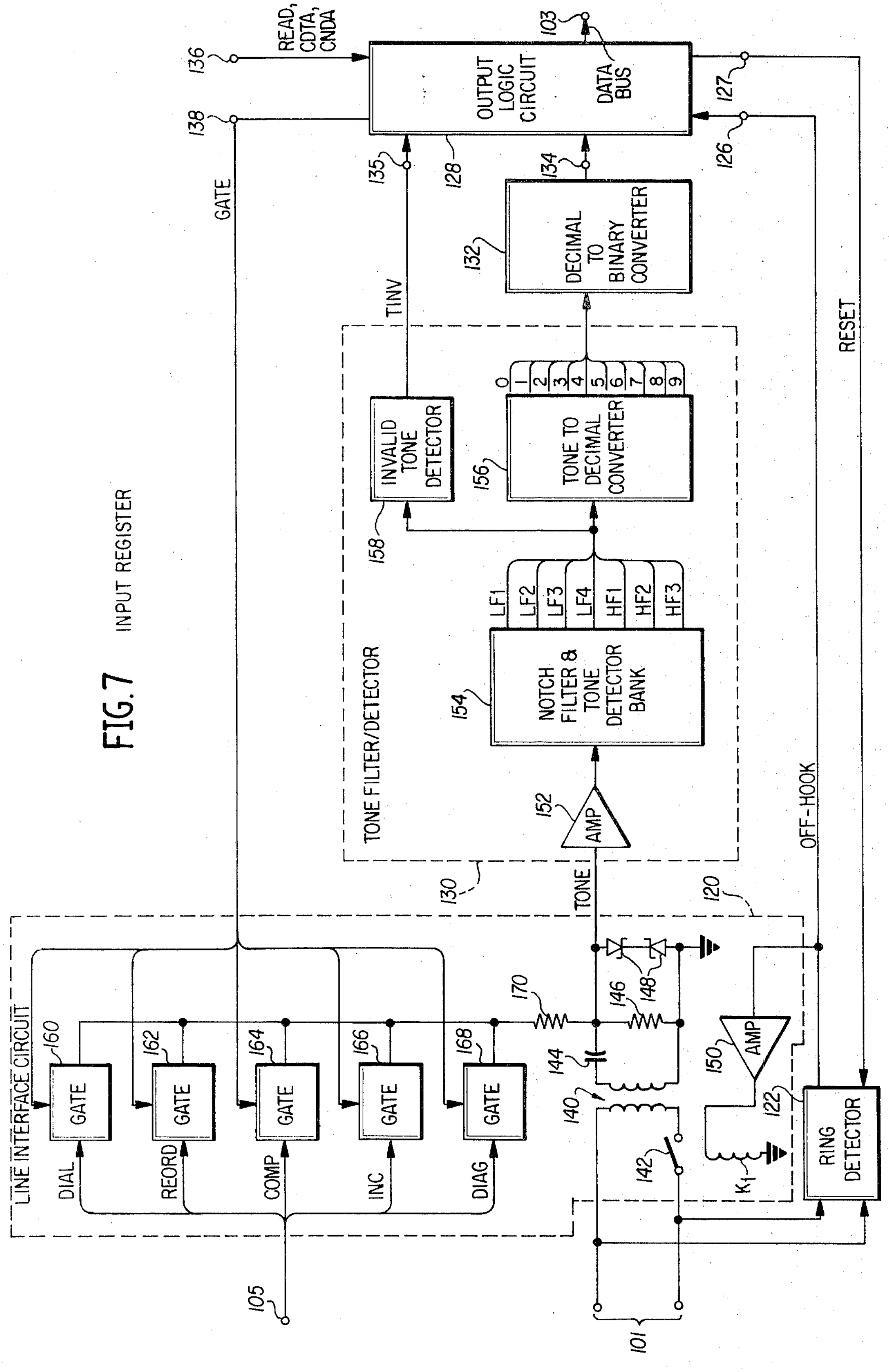
FIG. 7 is a more detailed functional block diagram of the input register of FIG. 6.
Figure 8:
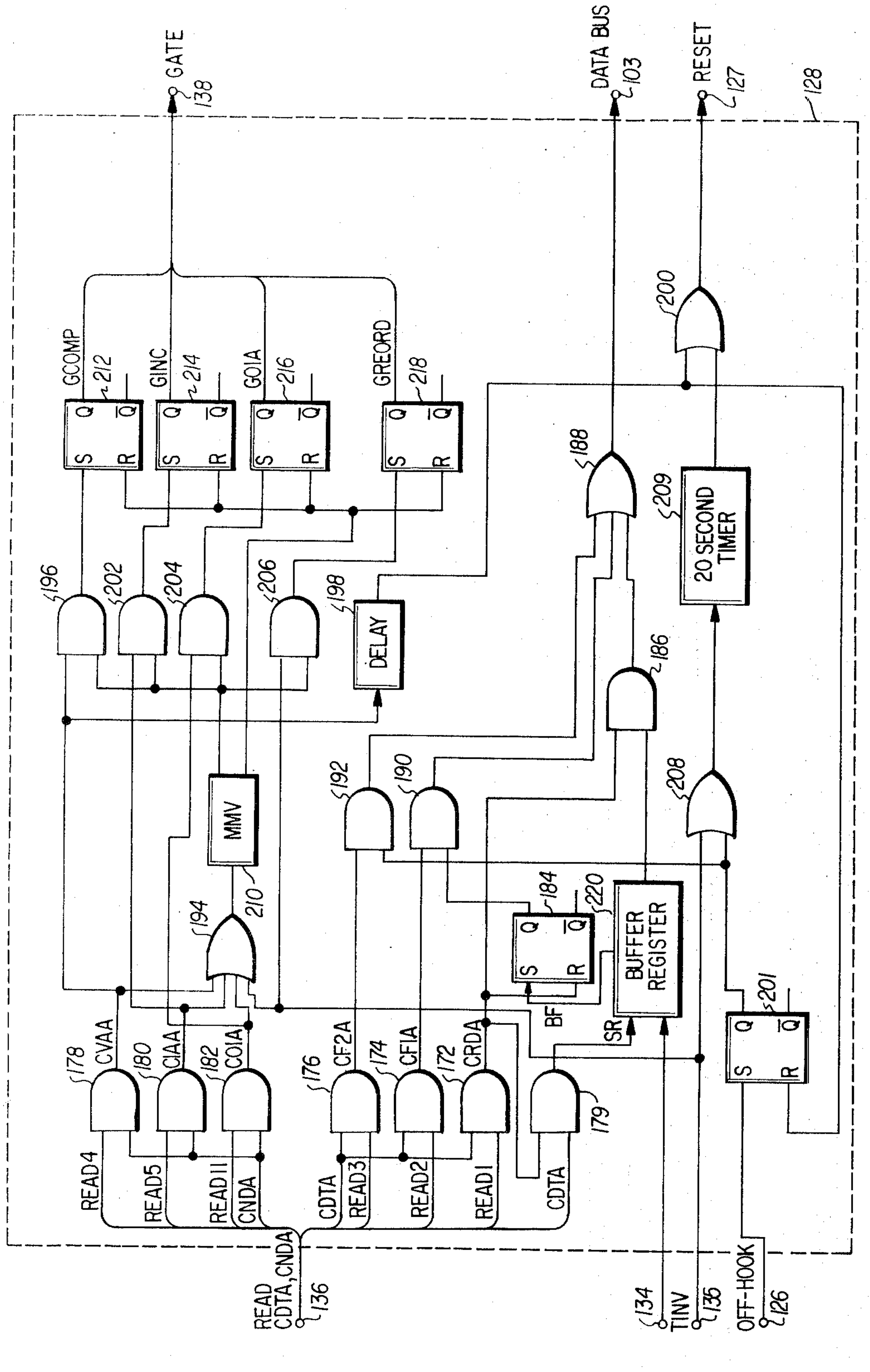
FIG. 8 is a more detailed functional block diagram of the output logic circuit of FIG. 7.

One of the input registers 100 of FIG. 5 is illustrated in greater detail in FIGS. 6–8. Referring now to FIG. 6, the commercial telephone lines 101 of the illustrated embodiment may be connected to a line interface circuit 120 and to a conventional ring detector circuit 122. Upon receipt of the ringing signal, the ring detector 122 generates on OFF-HOOK signal which is applied to an input terminal 124 of the line interface circuit 120 and to an input terminal 126 of an output logic circuit 128.

The subscriber designation signals thereafter received are applied as a TONE signal from the line interface circuit 120 to a suitable tone filter/detector circuit 130 where they are converted to digital form. The digital TONE or output signals 0–9 from the tone filter/detector circuit 130 may be applied to a decimal-to-binary converter 132, if the TONE signal is valid. If the TONE signal is invalid, a tone invalid or TINV output signal may be applied to an input terminal 135 of the output logic circuit 128.

The binary output signal from the decimal-to-binary converter 132 may be applied to an input terminal 134 of the output logic circuit 128 and a DATA BUS output generated responsively thereto applied to the output terminal 103 of the input register 100.

The READ, CDTA, CNDA control or command signals, the functions of which are later to be explained, as well as other desired control or command signals provided by the data processor 104 of FIG. 5, may be applied from the register address decoder 106 of FIGS. 5 and 6 to an input terminal 136 of the output logic circuit 128. With continued reference to FIG. 6, a plurality of gating signals collectively designated the GATE signal may be applied from an output terminal 138 of the output logic circuit 128 to the line interface circuit 120 to gate various tones and/or announcements from the analog tones and announcer unit 102 onto the telephone lines 101. In addition, a RESET signal may be applied to the ring detector 122 via an output terminal 127 of the output logic circuit 128.

In operation and with continued reference to FIG. 6, a continuous dial tone may be sent out over the telephone lines 101 when the input register 100 is idle in trunk line or end-to-end dialing operation, i.e., when all seven digits of the telephone number are used to effect a connection to the central station. In the direct dial or non-end-to-end dialing mode where an NNX code is utilized, the line interface circuit 120 may provide an "on-hook" indication to the commercial telephone system via the telephone lines 101 when the input register 100 is idle.

The ringing signals supplied by the telephone system are applied to the ring detector 122 and the OFF-HOOK signal assumes a high signal level when the ringing signals are detected. The OFF-HOOK signal causes a relay to close in the line interface circuit 120 providing an "off-hook" indication to the telephone system and also causes the output logic circuit to generate an appropriate GATE signal to thereby initiate the transmission of a "go-ahead" signal to the dialing party to indicate that the input register 100 is ready to receive a paging address.

The subscriber designation signal may then be received in the form of tones and applied through the line interface circuit 120 to the tone filter/detector 130. The tones are there detected and converted to decimal digits for subsequent conversion to binary form and transmission to the data processor 104 of FIG. 5 via the output terminal 103 in response to an appropriate READ signal from the register address decoder 106. The ring detector 122 may thereafter be reset by the RESET signal disconnecting the call and causing the input register 100 to revert to its idle condition.

Referring now to FIG. 7 where the line interface circuit 120 and the tone filter/detector 130 of FIG. 6 are shown in greater detail, one of the telephone lines 101 may be connected to one side of the primary winding of an impedance matching transformer 140 and the other telephone line 101 may be connected through a normally open contact 142 of a relay K1 to the other side of the primary winding of the transformer 140. One end of the secondary winding of the transformer 140 may be connected directly to ground or signal return and the other end of the transformer 140 may be connected through a capacitor 144 and a resistor 146 to ground. The capacitor 144-resistor 146 junction may be grounded through two oppositely poled Zener diodes 148 and the signal developed at this junction thus applied to the tone filter/detector 130 as the TONE signal.

The ringing signal from the telephone lines 101 may be applied to the ring detector 122 and the OFF-HOOK signal from the ring detector 122 applied through a conventional amplifier 150 to the operating coil of the relay K1.

The TONE signal from the capacitor 144-resistor 146 junction may be applied through a conventional amplifier 152 to a suitable conventional notch filter and tone detector bank 154 where the frequency of the applied TONE signal is detected. The output signals LF1–LF4 and HF1–HF3 from the notch filter and tone detector bank 154 are applied to a suitable conventional tone-to-decimal converter 156 and to a suitable conventional invalid tone detector 158.

The decimal output signals 0–9 from the tone to decimal converter 156 may be applied to the conventional decimal-to-binary converter 132 and the output signal from the decimal-to-binary converter 132 may be applied to the output logic circuit 128 via the input terminal 134. The "tone invalid" or TINV output signal from the invalid tone detector 158 may be applied to the output logic circuit 128 by way of the input terminal 135.

The GATE signal from the collective output terminal 138 of the output logic circuit 128 is generated as subsequently explained in connection with FIG. 8 and may be applied to the gate or trigger input terminal of each of a plurality of suitable conventional analog gates 160–168 in the line interface circuit 120. The various tones and voice announcements generated by the analog tones and announcer unit 102 of FIG. 6 may be applied to the data input terminals of each of the gates 160–168 and the output signals from the gates 160–168 may be applied through a resistor 170 to the capacitor 144-resistor 146 junction.

In operation and with continued reference to FIG. 7, the ring detector 122 detects the ringing signals supplied from the telephone equipment via the telephone lines 101. Responsively, the OFF-HOOK signal assumes a high signal level and remains at this signal level until reset by the RESET signal from the output logic circuit 128. When the OFF-HOOK signal assumes a high signal level, the relay K1 is energized and the contact 142 thereof is closed to complete the d.c. telephone loop.

A predetermined one of the GATE signals from the output logic circuit 128 assumes a high signal level in response to the high signal level OFF-HOOK signal and gates a predetermined "go-ahead" tone or voice announcement through one of the gates 160–168, e.g., the DIAL signal through the gate 160. This DIAL signal is applied through the transformer 140 to the telephone lines 101 for transmission back to the dialing party.

The dialing party may then transmit a plurality of tone signals designating the particular subscriber desired to be paged. This subscriber designation signal in the form of TONE signals is applied through the transformer 140 and the amplifier 152 to the notch filter and tone detector bank 154. In a dual tone system where, for example, a high frequency and a low frequency tone are transmitted simultaneously to designate each decimal digit, the notch filter and tone detector bank 154 separates the two frequencies and generates one of the low frequency signals LF1–LF4 and one of the high frequency signals HF1–HF3. These signals are applied to a plurality of AND gates in the tone to decimal converter 156 and the output signals 0 through 9 are provided in response to predetermined combinations of these high and low frequency signals LF1–LF4 and HF1–HF3. In addition, the detected high and low frequency tone signals are applied to a plurality of AND gates in the invalid tone detector 158 and invalid combinations of these detected signals cause the tone invalid or TINV signal to assume a high signal level.

The digital 0–9 output signals from the tone to decimal converter 156 may be converted to serial binary form by the decimal-to-binary converter 132 and stored in the output logic circuit 128. If the TINV signal assumes a high signal level before all of the digits of the paging address are stored by the output logic circuit 128, another one of the GATE signals is generated by the output logic circuit 128 to gate a recorder signal REORD through the gate 162 into the telephone lines 101. However, if all of the digits of the paging address are successfully decoded, stored and verified against the directory in the data processor, the appropriate GATE signal is applied to the line interface circuit 120 to gate a "call complete" or COMP signal through the gate 164 onto the telephone lines 101.

In a like manner, a "call incomplete" or INC tone or announcement may be gated through the gate 166 and transmitted to the dialing party. Moreover, one or more diagnostic tones DIAG may be gated through the gate 168 by an appropriate GATE signal when the data processor 104 places the input register in the diagnostic mode as is subsequently described in more detail.

While the conversion of the TONE input signals to binary form is accomplished in FIG. 7 in two steps, i.e., by the tone to digital converter 156 and the decimal to binary converter 132, this conversion may be accomplished by a single suitable conventional tone to binary coded decimal (BCD) converter if desired.

With reference now to FIG. 8 where the output logic circuit 128 of FIGS. 6 and 7 is illustrated in greater detail, the READ, CDTA and CNDA command signals from the data processor 104 of FIG. 5 are applied to the collective input terminal 136 of the output logic circuit 128. The CDTA signal indicating that the data processor 104 is ready to accept data may be applied to one input terminal of each of a plurality of two input terminal AND gates 172–176 and 179. The "command execute" or CNDA signal may be applied to one input terminal of each of a plurality of AND gates 178–182.

While only six AND gates 172–182 are shown in FIG. 8, it should be understood that any number of AND gates corresponding in number to the number of READ command signals desired, may be utilized. For examples, where 12 READ functions are desired, 12 AND gates may be provided.

The READ1–READ3 signals from the collective input terminal 136 may be applied to the other input terminal of the AND gates 172–176 respectively, and the READ4, READ5 and READ 11 command signals may be applied to the other input terminal of each of the AND gates 178–182 respectively. The output signal CRDA from the AND gate 172 may be applied to the other input terminal of the AND gate 179, to the reset input terminal R of a conventional bistable multivibrator or flip-flop 184 and to one input terminal of a two input terminal AND gate 186. The output signal from the AND gate 186 may be applied to one input terminal of a three input terminal OR gate 188 and the output signal from the OR gate 188 may be applied to the data processor 104 of FIG. 5 via the output terminal 103 as the DATA BUS signal.

A "read flag 1" or "buffer full" CF1A signal from the AND gate 174 may be applied to one input terminal of a two input terminal AND gate 190 and the output signal from the AND gate 190 may be applied to another input terminal of the OR gate 188. A "read flag 2" or "receive mode" output signal CF2A from the AND gate 176 may be applied to one input terminal of a two input terminal AND gate 192 and the output signal from the AND gate 192 applied to a third input terminal of the OR gate 188.

A "send valid address" or "call complete" output signal CVAA from the AND gate 178 may be applied to one input terminal of a four input terminal OR gate 194, to one input terminal of a two input terminal AND gate 196 and through a suitable conventional delay circuit 198 both to one input terminal of a two terminal OR gate 200 and to the reset input terminal R of a conventional bistable multivibrator or flip-flop 201. A "send invalid address" or "call incomplete" output signal CIAA from the AND gate 180 may be applied to another input terminal of the OR gate 194 and to one input terminal of a two input terminal AND gate 202. A "set operator intercept" or "assist mode" output signal COIA from the AND gate 182 may be applied to another input terminal of the OR gate 194 and to one input terminal of a two input terminal AND gate 204. The TINV signal from the invalid tone detector 158 of FIG. 7 may be applied via the input terminal 135 of the output logic circuit to the fourth input terminal of the OR gate 194, to one input terminal of a two input terminal AND gate 206 and to one input terminal of a two input terminal OR gate 208.

The output signal from the OR gate 194 may be applied to a trigger input terminal of a suitable conventional monostable multivibrator 210. The output signal from the true output terminal of the multivibrator 210 may be applied to one input terminal of each of the AND gates 196, 202, 204 and 206, and the output signal from the false output terminal of the multivibrator 210 may be applied to the reset input terminal R of each of the bistable multivibrators or flip-flops 212–218. The output signals from the AND gates 196, 202, 204 and 206 may be applied respectively to the set input terminals S of the flip-flops 212–218. The output signals from the true output terminals Q of each of the flip-flops 212–218 may be applied to the output terminal 138 of the output logic circuit 128 as the GATE signals earlier described.

With continued reference to FIG. 8, the output signal from the decimal-to-binary converter 132 of FIG. 7 may be applied via the input terminal 134 to the data input terminal of a suitable conventional buffer or shift register 220 and a "shift right" or SR signal from the AND gate 179 may be applied to the strobe or shift input terminal of the register 220. The data output signal from the buffer register 220 may be applied to the other input terminal of the AND gate 186 and a "buffer full" signal BF indicating that the buffer register 220 is full may be applied to the set input terminal S of the flip-flip 184. The output signal from the true output terminal of the flip-flop 184 may be applied to the other input terminal of the AND gate 190.

The OFF-HOOK signal from the ring detector 122 of FIG. 7 may be applied via the input terminal 126 of the output logic circuit 128 to the set input terminal S of the flip-flop 201 and the output signal from the true output terminal of the flip-flop 201 may be applied to the other input terminals of the OR gate 208 and the AND gate 192. The output signal from the OR gate 208 may be applied to the set input terminal S of a suitable conventional twenty second timer 209. An output signal from the timer 209 may be applied to the other input terminal of the OR gate 200 and the RESET output signal from the OR gate 200 may be applied to the output terminal 127 of the output logic circuit 128.

In operation and with continued reference to FIG. 8, the READ, CDTA, CNDA command signals are gated out of the register address decoder 106 of FIG. 6 to the input terminal 136 of the output logic circuit 128 associated with the input register being addressed by the data processor 104. The CDTA signal enables all of the AND gates 172–176 permitting any READ signals present at the other input terminals of these AND gates to be gated therethrough. Assuming, for example, that the READ2 signal is at a high signal level when the AND gates 172–176 are enabled by the CDTA signal, the CF1A output signal from the AND gate 174 assumes a high signal level to sample the buffer full flag signal BF provided by the buffer full flip-flop 184 by enabling the AND gate 190. The sampled signal BF is applied through the OR gate 188 to the data processor 104 of FIG. 5 via the output terminal 103 of the input register as the DATA BUS signal. If the flip-flop 184 is set indicating that the buffer register 220 is full, the data processor 104 is apprised of this fact and thereafter transmits an appropriate READ command to the input register 100 to read the contents of the buffer register 220.

For example, a READ1 signal may thereafter be transmitted to the output logic circuit 128 of FIG. 8 and gated through the AND gate 172 as the "read address" or CRDA signal. The CRDA signal may be utilized to enable the AND gate 186 to permit the output signal from the buffer register 220 to be applied through the OR gate 188 to the output terminal 103 of the output logic circuit 128. In addition, the CRDA signal and the CDTA signal are utilized to generate the "shift right" or SR signal to serially shift the contents of the buffer register 220 through the AND gate 186 and the OR gate 188 to the data processor 104 of FIG. 5.

After the data processor 104 has checked the paging address against the directory of valid paging addresses, either a READ 4 or a READ 5 signal may be sent to the output logic circuit 128 of FIG. 8 depending upon the results of the validity check. For example, if the address is found to be valid, the READ 4 signal may be gated through the AND gate 178 by the CNDA signal to trigger the timing multivibrator 210 which enables all of the AND gates 196, 202, 204 and 206 for a predetermined time interval, e.g., 6 seconds. When the AND gate 196 is enabled, the CVAA signal from the AND gate 178 is gated therethrough and sets the flip-flop 212 to generate the "call complete" gating signal GCOMP which may then be applied via the output terminal 138 of the output logic circuit 128 of FIG. 8 to the gate 164 in the line interface circuit 120 of FIG. 7.

With continued reference to FIG. 8, the CVAA signal may, in addition, be delayed and utilized to reset the off-hook flip-flop 201. The CVAA signal is also gated through the OR gate 200 to the ring detector 122 of FIG. 7 by way of the output terminal 127 as the RESET signal to reset the ring detector and allow the input register to revert to its idle or "on-hook" condition.

When the ring detector 122 of FIGS. 6 and 7 detects a ringing signal and generates the OFF-HOOK signal applied to the input terminal 126 of the output logic circuit 128, the flip-flop 201 is set starting the 20 second timer 209. If the call is not completed before the 20 second timer 209 times out, the timer 209 provides a signal which is passed through the OR gate 209 as the RESET signal to the ring detector 122 to disconnect the call.

Although not specifically discussed above, a variety of other functions previously discussed may be performed by the input registers in response to the READ command signals in a manner similar to those discussed above. Table I which follows provides an indication of the exemplary READ commands which may perform the functions listed in the table although it is to be understood that the table is not intended to be limiting.

TABLE I

| Command | Signal | Function |
|---|---|---|
| READ 1 | CRDA | READ ADRESS |
| READ 2 | CF1A | READ FLAG 1 (BUFFER FULL) |
| READ 3 | CF2A | READ FLAG 2 (RECEIVE MODE) |
| READ 4 | CF3A | READ FLAG 3 (LOCKOUT) |
| READ 5 | CF4A | READ FLAG 4 (DIAGNOSTIC MODE) |
| READ 6 | CVAA | SENT VALID ADDRESS (CALL COMPLETE) |
| READ 7 | CIAA | SEND INVALID ADDRESS (CALL INCOMPLETE) |
| READ 8 | CSDA | SET DIAGNOSTIC MODE |
| READ 9 | CCDA | CLEAR DIAGNOSTIC MODE |
| READ 10 | CCTA | RESET TONE TIMER |
| READ 11 | COIA | SET OPERATOR INTERCEPT ASSIST MODE |
| READ 12 | CBOA | BUSY OUT REGISTER |

B. Data Processor

Where high subscriber capacity is desired, the data processor 104 of FIG. 5 may be any suitable conventional general purpose digital computer programmed to accomplish the scanning of the input registers, the performance of various diagnostic functions, the encoding of the address signals and other functions previously described in connection with the previously and subsequently to be described drawings. A computer program implemented by one skilled in the art having the detailed description herein and suitable for performing the functions of the data processor 104 may be utilized.

A Model PDP—11/15 general purpose digital computer available from Digital Equipment Corp. may, for example, be employed as the data processor 104 at the central station. Any suitable conventional input/output unit such as the teletype unit 108 of FIG. 5 may be used for programming and operator control of the processor.

Where a low capacity unit is required as in low population paging areas, a hard wired processor may be utilized to perform the previously described functions. The hard wired processor may include suitable memory banks and control units as will hereinafter be described in greater detail.

C. Transmitter Control Unit

Figure 9:
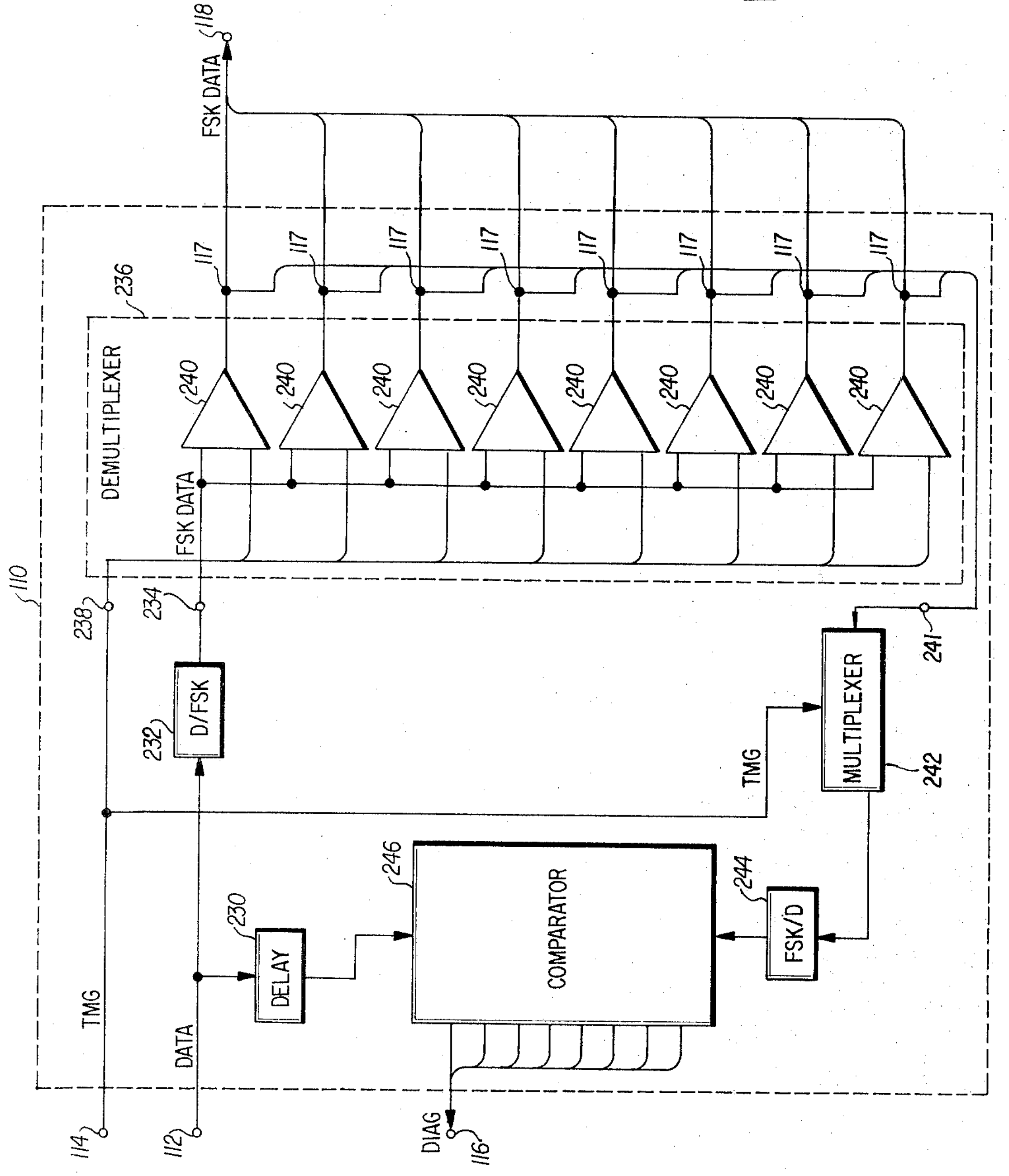
FIG. 9 is a functional block diagram of the transmitter control unit of FIG. 5.

An embodiment of the transmitter control unit 110 of FIG. 5 is illustrated in greater detail in FIG. 9. Referring now to FIG. 9, the DATA output signal from the data processor 104 of FIG. 5 is applied via the input terminal 112 of the transmitter control unit 110 to a suitable conventional delay or buffer circuit 230 and to a suitable conventional digital to frequency shift keyed (D/FSK) converter 232. The output signal FSK DATA from the D/FSK converter 232 may be applied to the data input terminal 234 of a suitable conventional demultiplexer 236 and the timing or TMG signals from the terminal 114 may be applied to a collective input terminal 238 of the demultiplexer 236.

The demultiplexer 236 may, for example, include a plurality of gated amplifiers 240 and the FSK DATA signal may be applied to one input terminal of each of these amplifiers 240. The timing or gating signals TMG from the data processor 104 may be applied to the other input terminal of each of the gated amplifiers 240 to sequentially gate the FSK DATA signal through the amplifiers 240 to the output terminals 117 thereof. For example, where eight transmitters or eight groups of transmitters are selectively controlled by the transmitter control unit 110, eight sequential timing signals such as pulses each having a duration of one time slot may be applied separately to the amplifiers 240 as the TMG signal.

In addition to the application of the output signals from the respective terminals 117 to the transmitter units 54 of FIG. 1 by way of the collective output terminal 118, the output signals from each of the amplifiers 240 may be applied to a conventional multiplexer 242 within the transmitter control unit 110. The demultiplexed FSK DATA signals from the amplifiers 240 are received in parallel at the collectively illustrated input terminal 241 and converts these FSK DATA signals to a time multiplexed serial DATA signal in response to the TMG signal applied thereto. The serial DATA signal from the multiplexer 242 may then be applied to a suitable conventional FSK to digital (FSK/D) converter 244 and the digital DATA output signal from the FSK/D converter 244 may be applied to one input terminal of a suitable conventional digital comparator 246.

The DATA signal from the output terminal 112 of the data processor 104 may be delayed in the delay circuit 230 and applied to a second input terminal of the comparator 246. The output signals DIAG from the comparator 246 may then be applied by the collectively illustrated output terminal 116 of the transmitter control unit 110 to the data processor 104 of FIG. 5 for the diagnostic purposes earlier discussed.

In operation and with continued reference to FIG. 9, the digital DATA signal from the data processor 104, including address and synchronizing signals, is converted to an FSK DATA signal by the D/FSK converter 232 and thereafter applied to the demultiplexer 236. The timing signals TMG from the data processor 104 of FIG. 5 are also applied to the demultiplexer 236 and the serial FSK DATA output signal therefrom is demultiplexed and applied sequentially to the collective output terminal 118. For example, the gated amplifiers 240 of the demultiplexer 236 may be sequentially gated on by the timing signal TMG during eight succesive 1 second intervals each defining one of the 1 second time slots previously described. In this manner, the DATA input signal may be transmitted in FSK form to the transmitter units 54 of FIG. 5 sequentially in accordance with, for example, the data format and transmitter sequencing previously described in connection with FIGS. 3 and 4.

In addition, the digital DATA input signal may be delayed in the delay circuit 230 and applied to the comparator 246. The delay introduced is sufficient to permit simultaneous comparison of the delayed DATA signal from the data processor 104 with the transmitted FSK DATA signal sampled at the output terminals 117 of the amplifiers 240 and reconverted to multiplexed, digital form in the multiplexer 242 and the FSK/D converter 244. In this manner, the transmitter control unit 110 may be checked to ensure proper transmission of data to the remote transmitters 54.

The FSK/D converter 244 and the D/FSK converter 232 earlier described may be any suitable conventional separate converters capable of operating at 1,200 bits per second. Alternatively, a single duplex converter, e.g., a WECO 202 type FSK modem available from the Western Electric Company, may perform both the D/FSK and FSK/D conversions. The telephone lines through which the FSK DATA signal is transmitted to the transmitter units 54 may be suitable conventional lines available from the local telephone company. For example, standard AT&T Type A(C—1) of WU Type E lines may be utilized to provide duplex transmission at a data error rate of about $1 \times 10^{-5}$.

D. Diagnostic Unit

Figure 10:
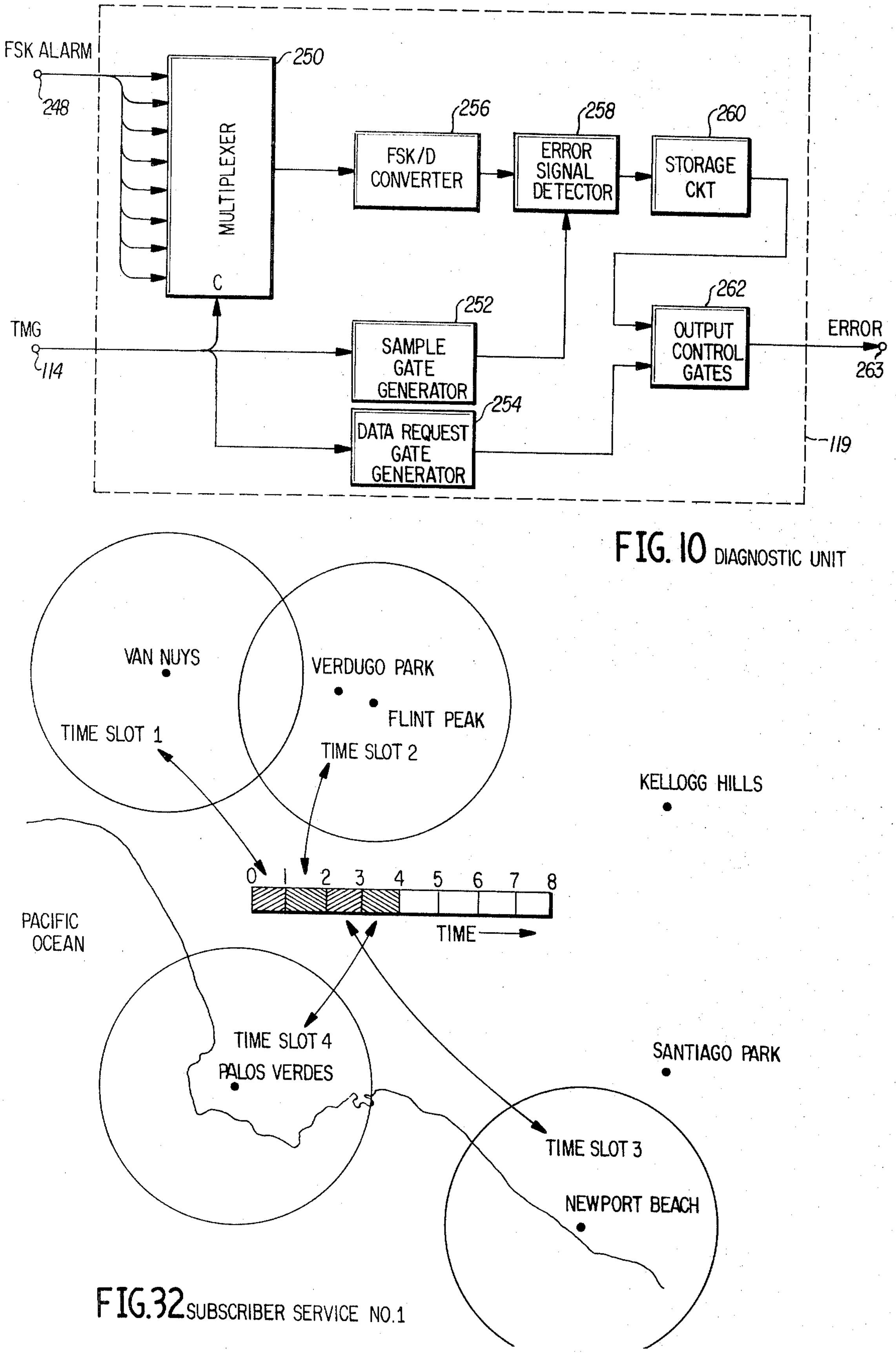
FIG. 10 is a functional block diagram of the diagnostic unit of FIG. 5.

The diagnostic unit 119 of FIG. 5 is illustrated in greater detail in the functional block diagram of FIG. 10. Referring to FIG. 10, the FSK ALARM signal from the transmitter units 54 of FIG. 5 may be applied to corresponding input terminals of a suitable conventional multiplexer 250 via an input terminal of the diagnostic unit 119 of FIG. 5 illustrated collectively at 248. The timing or TMG signal from the data processor 104 of FIG. 5 may be applied to a clock input terminal C of the multiplexer 250, to a suitable conventional sample gate generator 252 and a suitable conventional data request generator 254.

The output signal from the multiplexer 250 may be applied to a suitable conventional FSK/D converter 256 and the digital output signal from the FSK/D converter 256 may be gated through a suitable conventional error signal detector 258 to a conventional storage circuit 260 by the output signal from the sample gate generator 252. The output signal from the storage circuit 260 may be applied to a data input terminal of a plurality of output control gates 262 and the output signal from the data request generator 254 may be applied to the enable input terminals of the output control gates 262. The ERROR output signals from the output control gates 262 may be provided at an output terminal 263 of the diagnostic unit 119 for application to the data processor 104 of FIG. 5.

In operation, the FSK ALARM signals from the remote transmitters 54 are individually applied to the multiplexer 250 via the telephone lines and are multiplexed to provide a serial FSK signal. The serial FSK signal is converted to a serial digital signal by the FSK/D convertor 256 and the digital signal from the convertor 256 is gated through the error signal detector 258 by sample gate signals generated by the sample gate generator 252.

The gated error signals from the error signal detector 258 are stored in the storage circuit 260 and are selectively gated through the output control gates 262 to the data processor 104 of FIG. 5 in response to the decoding of the TMG or timing signal from the data processor 104 by the data request gate generator 254. In this manner, the data processor 104 of FIG. 5 can selectively scan the diagnostic unit 119 of FIG. 10 at an appropriate time to determine whether or not any transmitter errors exist.

V. TRANSMITTER UNIT

Figure 11:
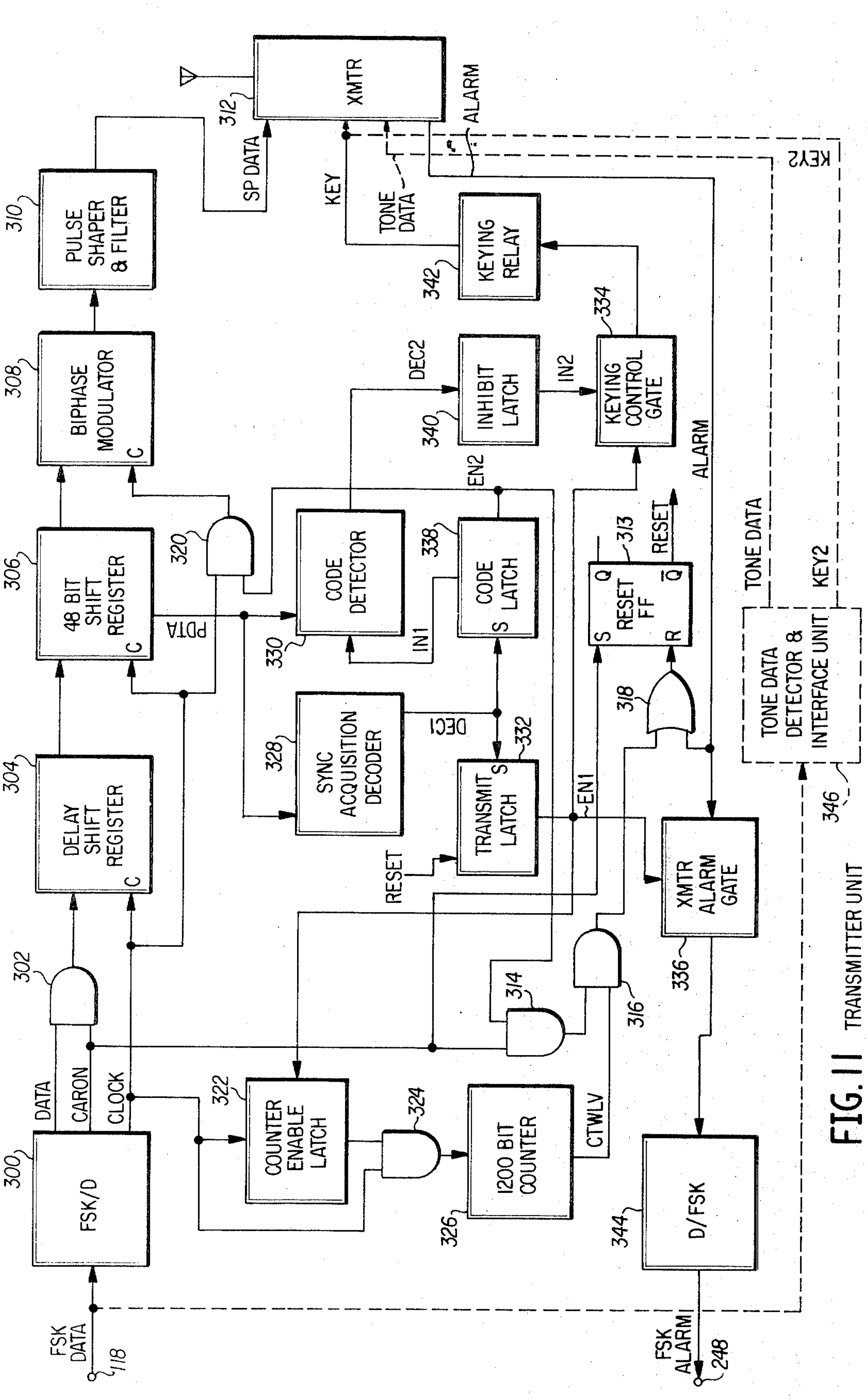
FIG. 11 is a functional block diagram of the transmitter unit of FIG. 5.

One embodiment of one of the transmitter units 54 of FIG. 5 is illustrated in detail in the functional block diagram of FIG. 11. Referring to FIG. 11, the FSK DATA signal from the collective output terminal 118 of the transmitter control unit 110 of FIG. 9 may be applied through a suitable conventional FSK/D converter 300 for conversion into the digital DATA signal. In addition, the FSK carrier is detected to generate a "carrier on" or CARON signal. A CLOCK signal synchronized in phase and bit rate with the incoming FSK DATA signal is also generated by the FSK/D converter 300.

The digital DATA signal from the FSK/D convrter 300 may be applied to one input terminal of a two input terminal AND gate 302 and the output signal from the AND gate 302 may be applied to the data input terminal of a suitable conventional delay shift register 304. The output signal from the delay shift register 304 may be applied to the data input terminal of a suitable conventional 48 bit shift register 306 and a serial output signal from the shift register 306 may be applied to the data input terminal of a suitable conventional biphase modulator 308.

The output signal from the biphase modulator 308 may be applied to a suitable conventional pulse shaper and filter circuit 310 for amplification and shaping. The shaped and filtered output signal from the pulse shaper and filter 310 may then be applied to the pulse modulation input terminal of a suitable conventional FM transmitter 312 as the split phase or SPDATA signal.

The "carrier on" or CARON output signal from the FSK/D converter 300 may be applied to the other input terminal of the AND gate 302, to one input terminal of a two input terminal AND gate 314 and to the set input terminal S of a conventional bistable multivibrator or flip-flop 313. The output signal from the ANd gate 314 may be applied to one input terminal of a two input terminal AND gate 316 and the output signal from the AND gate 316 may be applied to one input terminal of a two input terminal OR gate 318.

The output signal from the OR gate 318 may be applied to the reset input terminals R of the flip-flop 313 and the output signal from the false or $\overline{Q}$ output terminal of the flip-flop 313 may be applied to all of the registers and other resetable circuits in the transmitter unit to reset these circuits after the desired data has been transmitted by the transmitter 312, as will hereinafter be described.

The CLOCK signal from the FSK/D converter 300 may be applied to the clock input terminal C of the delay shift register 304, to the clock input terminal C of the 48 bit shift register 306, to one input terminal of a two input terminal AND gate 320, to a counter enable latch 322 and to one input terminal of a two input terminal AND gate 324. The output signal from the counter enable latch 322 is applied to the other input terminal of the AND gate 324 and the output signal from the AND gate 324 may be applied to the input terminal of a suitable conventional 1,200 bit counter 326.

The 1,200 bit counter 326 generates a CTWLV signal when the count in the counter 326 reaches 1200. The CTWLV signal may be applied to the other input terminal of the AND gate 316, to be gated therethrough to the flip-flop 313 when the data in one minor frame or time slot has been transmitted, as will hereinafter be described in greater detail.

The output signals from all 48 stages of the shift register 306 may be applied in parallel as the PDTA signal to the input terminals of two conventional digital decoders or detectors 328 and 330. The decoder 328 may, for example, comprise a plurality of AND gates which provide a high signal level decode or DEC1 signal when the sync acquisition portion of the DATA signal is successfully decoded. This DEC1 signal may be applied to the set input terminals S of a suitable conventional transmit latch 332, such as a flip-flop, and to a code latch 338.

A transmitter enable signal EN1 from the transmit latch 332 may be applied to the set or enable input terminal of the counter enable latch 322, to the enable input terminal of a keying control gate 334 and to the enable input terminal of a transmitter alarm gate 336. An enable or EN2 signal from code latch 338 may be applied to the other input terminal of the AND gate 314 and to the other input terminal of the AND gate 320, and the output signal from the AND gate 320 may be applied to the clock input terminal C of the biphase modulator 308. An inhibit or IN1 signal from code latch 338 may be applied to the inhibit terminal of the code detector or decoder 330 and the decode or DEC2 signal from the code detector 330 may be applied to the enable input terminal of an inhibit latch 340.

An inhibit output signal IN2 from the inhibit latch 340 may be applied to the inhibit input terminal of the keying control gate 334. The output signal from the keying control gate 334 may be applied to a keying relay 342. A KEY output signal from the keying relay 342 may then be applied to the keying input terminal of the transmitter 312 to control the energization of the transmitter.

A transmitter alarm signal ALARM may be provided by the transmitter 312 in response to the detection of abnormal transmitter conditions. The ALARM signal may be applied to the other input terminal of the OR gate 318 and to the transmitter alarm gate 336. The ALARM signal gated through the transmitter alarm gate 336 may be applied to a suitable conventional digital D/FSK converter 344 and the FSK signal from the D/FSK converter 344 may be provided at the output terminal 248 as the FSK ALARM signal for transmission to the diagnostic unit 119 at the central station 50 of FIG. 5.

The transmitter 312 may be any suitable FM transmitter such as the Farinon model PVM—150 pulse/-voice modulated transmitter available from Farinon Electric Company of Canada Ltd. of Montreal, Can.

In operation and with continued reference to FIG. 11, the FSK DATA signal is received via the terminal 118 at a 1,200 bit per second rate. The FSK DATA signal may, for example, be formated on a 1,700 Hertz carrier where a frequency shift down to 1,200 Hertz represents a logic ONE and a frequency shift up to 2,200 Hertz represents a logic ZERO.

The FSK/D converter 300 of FIG. 11 detects the 1,700 Hertz carrier signal conveniently turned on at the transmitter control unit 110 of FIG. 9 approximately 50 milliseconds prior to the transmission of the FSK DATA signal. The CARON signal assumes, in response to this detection, a high signal level enabling the AND gates 302 and 314 and setting the reset flip-flop 313. The FSK/D converter 300 also generates a CLOCK signal which is synchronized in phase and bit rate with the incoming FSK DATA signal. When the FSK DATA signal arrives and is converted into a digital DATA signal, the DATA signal is gated through the enabled AND gate 302, delayed by a predetermined amount by the delay shift register 304 and shifted into the 48 bit shift register 306.

The contents of the shift register 306 are then decoded by the decoders 328–330 after the first 48 bits of the DATA signal have been shifted therein. If these first 48 bits conform to the first 48 bits of the DATA signal previously described in connection with FIG. 3 (i.e., 12 zeros, the four bit SA pattern, and 32 zeros), the DEC1 signal from the sync acquisition decoder 328 assumes a high signal level, setting the transmit latch 332 and thereby enabling the counter enable latch 322, the transmitter alarm gate 336, and the keying control gate 334.

When the counter enable latch 322 is set, the CLOCK signal is gated through the AND gate 324 to the 1,200 bit counter 326. The next 1,200 bits of the CLOCK signal shift the DATA signal through the register 304, the register 306 and the biphase modulator 308 to the modulation input terminal of the transmitter 312, and, since the keying control gate 334 is enabled thereby energizing the keying relay 342, these 1,200 bits of split phase modulated data are transmitted by the transmitter 312.

When the 1,200 bit counter reaches a count of 1,200, the CTWLV signal assumes a high signal level and resets the flip-flop 313 through the enabled AND gate 316 and the OR gate 318. When the flip-flop 313 is reset, the RESET signal assumes a high signal level resetting all of the registers and latches in the transmitter unit (see the transmit latch 332, for example) and thereby deenergizing the transmitter 312.

If, during the transmission of the SPDATA signal by the transmitter 312, a transmitter malfunction is detected, the ALARM signal assumes a high signal level which resets the flip-flop 313 and prevents the further transmission of data. In addition, the ALARM signal may be gated through the enabled transmitter alarm gate 336 to the D/FSK converter 344 for transmission back to the central station 50 of FIG. 5 as an FSK ALARM signal.

The code detector 330 may be provided where it is desired to key the transmitter 312 and modulate the output signal from the transmitter 312 in response to a code other than the sync acquisition pattern. For example, when the transmitters 312 of the digital paging system are shared with a tone system, the first 48 bits of the signal transmitted to the transmitter unit may be in some other predetermined code.

For example, when the sync acquisition pattern is detected, the DEC1 signal sets the code latch 338 thereby inhibiting the code detector 330 and enabling the AND gate 320. However, when the code assigned to the tone system is transmitted to the transmitter unit, the DEC1 signal from the sync acquisition decoder 328 remains at a low signal level and the DEC2 signal from the code detector 330 assumes a high signal level upon detection of the code. The DEC2 signal may thereafter set the inhibit latch 340 to inhibit the keying control gate 334 and prevent the transmitter 312 from being keyed in response to the sync acquisition pattern.

In this "tone" mode, the code assigned to the tone system may cause the subsequently received tone signals to be applied to the tone or voice modulation input terminal of the transmitter 312 as the TONE DATA signal, as illustrated in phantom, and the recognition of the code assigned to the tone system may also cause the keying of the transmitter 312 at the appropriate time by the KEY 2 signal, as is also illustrated in phantom. To accomplish this purpose, the FSK DATA may be applied to a suitable tone data detector and interface unit, indicated in phantom at 346. The tone data detector and interface unit 346 may operate similarly to the circuit described above to decode the incoming FSK DATA signal and enable the appropriate keying control gates and latches to provide the appropriate modulation and keying signals.

VI. ALTERNATIVE TRANSMITTER UNIT

Figure 12:
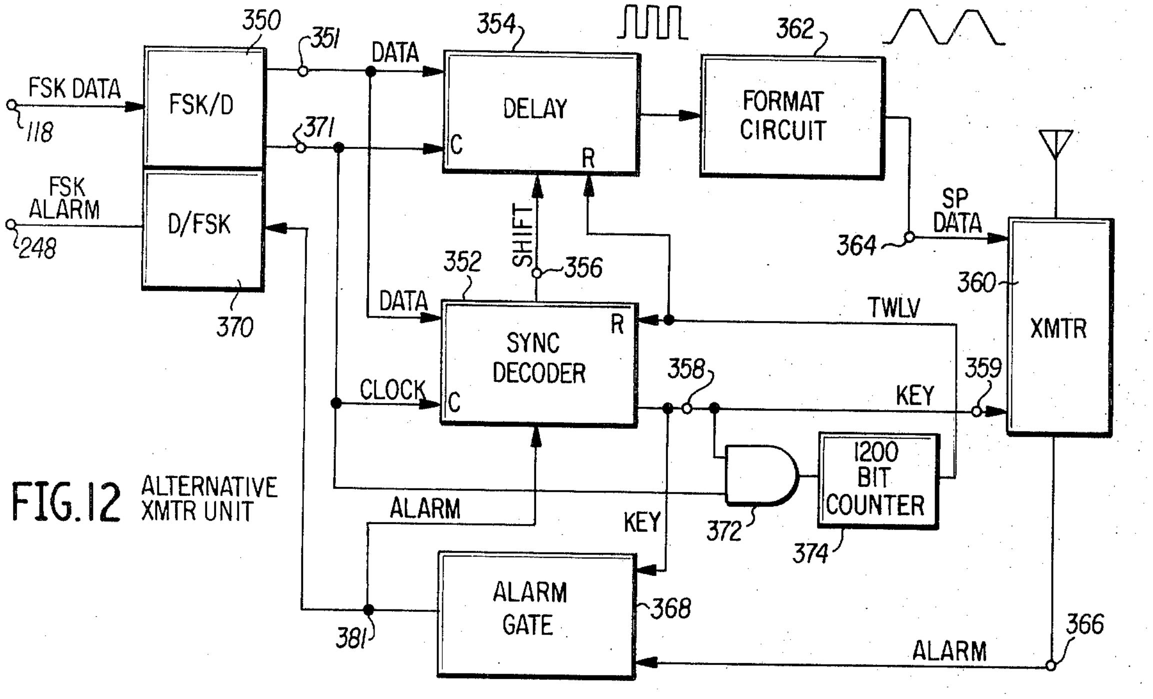
FIG. 12 is a functional block diagram of an alternative transmitter unit.

An alternative embodiment of the transmitter unit 54 illustrated in FIG. 11 is illustrated in FIG. 12. The FIG. 12 embodiment may have particular usefulness in paging applications where telephone lines are not used between the central station and the transmitter units or in other radio control applications. With reference now to FIG. 12, the FSK DATA signal received by the transmitter units 54 via the telephone lines from the transmitter control unit 110 of FIG. 5 may be applied from the input terminal 118 to a conventional FSK/D converter 350 in the transmitter units 54 for conversion to a digital DATA signal.

The digital DATA output signal from the FSK/D converter 350 may be applied via a terminal 351 to a sync decoder circuit 352 and to the data input terminal of a suitable conventional delay or buffer circuit such as a shift register 354. A SHIFT output signal from an output terminal 356 of the sync decoder may be applied to the delay circuit 354. A KEY output signal from an output terminal 358 of the sync decoder may be applied to the pulse keying input terminal 359 of a suitable conventional transmitter 360 and to one input terminal of a two input terminal AND gate 372.

The output signal from the delay circuit 354 may be applied through a format circuit 362 and to the pulse or digital data input terminal 364 of the transmitter 360. A transmitter monitoring or ALARM signal from a monitor or alarm output terminal 366 of the transmitter 360 may be applied to an alarm gate circuit 368. The ALARM output signal may be gated through the alarm gate circuit 368 by the KEY signal from the sync decoder 352 and may be applied to the sync decoder 352 via a terminal 381. The ALARM signal gated through the gate 368 may also be applied to a conventional D/FSK converter 370 for transmission back to the central station for diagnostic purposes as the FSK ALARM signal.

A CLOCK signal synchronized in phase and repetition rate with the incoming FSK DATA signal may be generated by the FSK/D converter 350 and applied via a terminal 371 to the sync decoder 352, to the clock or strobe input terminal C of the delay or buffer circuit 354 and to the other input terminal of the AND gate 372. The output signal from the AND gate 372 may be applied to the clock input terminal C of a conventional 1,200 bit counter 374 and the TWLV output signal from the counter 374 may be applied to the rest input terminals R of the delay circuit 354 and the sync decoder 352.

In operation, the FSK DATA input signal may be converted to a digital DATA signal by the FSK/D converter 350 and applied to the sync decoder 352. The sync decoder decodes the sync acquisition portion of the DATA signal to determine if the received digital signal is a properly encoded message word which should be transmitted by the transmitter 360 to the plurality of portable paging receivers. Moreover, the sync maintenance portion of the DATA signal may be decoded to provide different types of transmitter modulation, e.g., digital and tone, in response to different sync maintenance patterns as will hereafter be described.

The sync decoder 352 clocks the DATA signal through the delay circuit 354 by the SHIFT signal if the sync portion of the DATA signal is properly decoded. This DATA signal is filtered by the format circuit 362 to provide a trapeziodal output signal to insure that the transmission frequency is within the required frequency band limits. To accomplish this purpose, the format circuit 362 may be any suitable conventional filter circuit capable of lengthening the rise and fall times of each pulse of the DATA signal from the delay circuit 352.

Upon recognition of the sync portion of the DATA signal, the sync decoder 352 also generates the keying signal KEY which keys the transmitter 360 immediately before the SPDATA is applied to the pulse modulation input terminal 364 thereof through the delay and format circuits 354 and 362. Thus, the transmitter 360 is keyed and the entire SPDATA signal transmitted when the sync portion of the DATA signal is successfully recognized. The need for separate transmitter control signals is thus eliminated.

Transmitter power and modulation limits as well as other transmitter conditions may be monitored and applied in the form of digital signals to the alarm gate circuit 368. If, for any reason, these signals indicate that the transmission is defective, an alarm signal ALARM is applied to the sync decoder 352 to prevent decoding of the sync portion of the signal and thus transmission of the SPDATA signal. In addition, the alarm gate circuit 368 provides an output signal to the D/FSK converter 370 for transmission back to the central station via terminal 248 to indicate to the central station the transmitter 360 status and modulation and power level conditions for diagnostic purposes.

A. Sync Decoder

Figure 13:
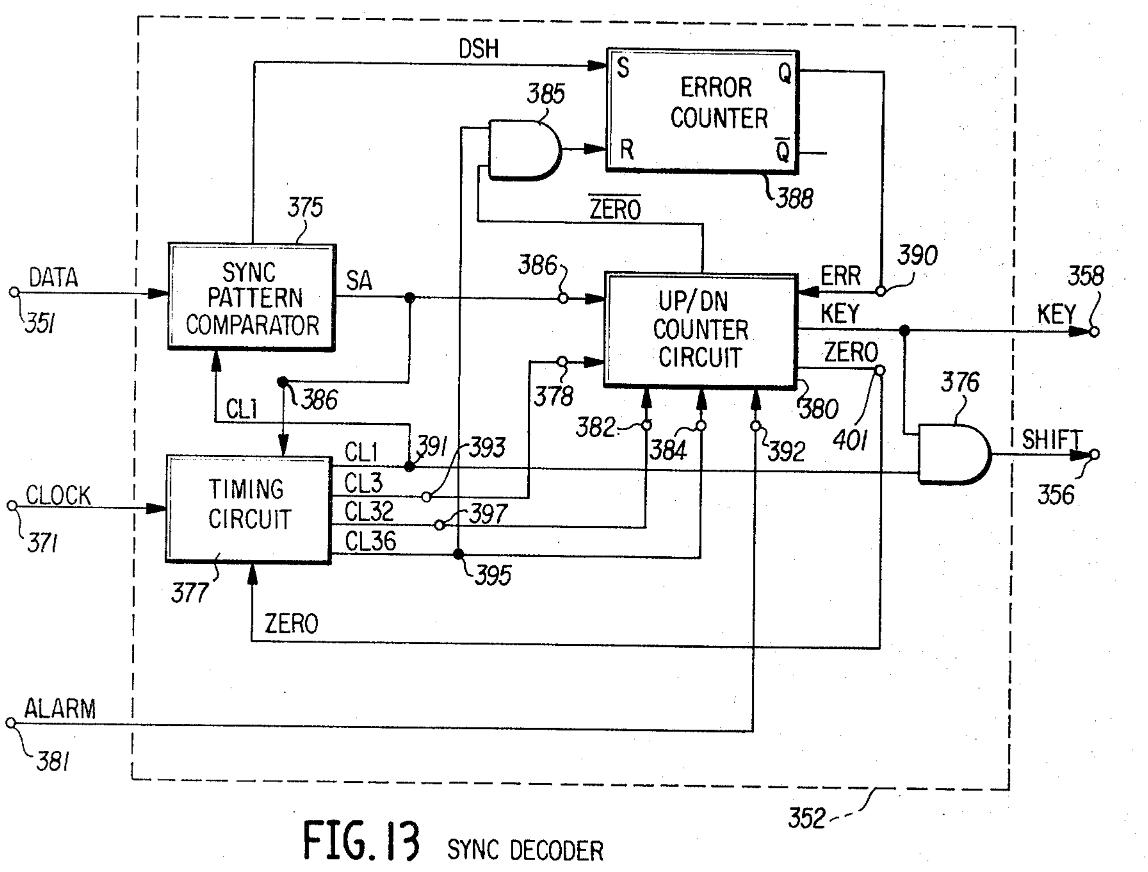
FIG. 13 is a more detailed functional block diagram of the sync decoder circuit of FIG. 12.

The sync decoder 352 of the alternative transmitter unit of FIG. 12 is shown in greater detail in FIGS. 13–16. Referring now to FIG. 13, the CLOCK signal from the output terminal 371 of the FSK/D converter 350 of FIG. 12 may be applied to a timing circuit 377 to generate various clock and framing signals CL1, CL3, CL32 and CL36 for decoding the sync acquisition portion of the DATA signal.

The DATA signal from the FSK/D converter 350 may be applied to a sync pattern comparator 375 via the input terminal 351. The CL1 clock signal from the timing circuit 377 may also be applied to the sync pattern comparator 375 and to one input terminal of a two input terminal AND gate 376. The CL3 clock signal from the timing circuit 377 may be applied to an input terminal 378 of an up/down counter 380 and the CL32 and CL36 framing signals from the timing circuit 377 may be applied, respectively, to the input terminal 382 and 384 of the up/down counter circuit 380. The CL36 signal may additionally be applied to one input terminal of a two input terminal AND gate 385.

The DATA signal from the FSK/D converter 350 of FIG. 12 may also be applied to the sync pattern comparator 375 of FIG. 13. The "sync acquired" or SA signal from the sync pattern comparator 375 may be applied to an input terminal 386 of the up/down counter circuit 380 and to the timing circuit 377. The DATA signal may be shifted out of the sync pattern comparator 375 as the DSH signal and applied to the clock input terminal C of an error counter 388, the ERR output signal from which may be applied to an input terminal 390 of the up/down counter circuit 380.

The error counter 388 may be, for example, a single bistable multivibrator of flip-flop since it need only indicate when more than one binary ONE bit is present in the DATA signal between successive ones of the sync acquisition patterns SA. The DSH signal may thus be applied to the set input terminal S of the counter 388 and the signal from the AND gate 385 may be applied to the reset input terminal R thereof. The ERR signal may be taken at the true or Q output terminal of the flip-flop 388.

A $\overline{\text{ZERO}}$ signal from the up/down counter circuit 380 may be applied to the other input terminal of the AND gate 385 and the output signal therefrom applied to the reset input terminal R of the error counter 388. A KEY signal from the up/down counter circuit 380 may be applied to the output terminal 358 of the sync decoder 352 and to the other input terminal of the AND gate 376. The ZERO output signal from the up/down counter circuit 380 may also be applied to the timing circuit 377 and the SHIFT output signal from the AND gate 376 may be applied to the output terminal 356 of the sync decoder 352. In addition, the ALARM signal from the output terminal 381 of the alarm gate circuit 368 of FIG. 12 may be applied to an input terminal 392 of the up/down counter circuit 380 to inhibit the generation of the KEY signal when the detected condition of transmitter 360 of FIG. 12 so dictates.

In operation and with continued reference to FIG. 13, the DATA signal applied to the remote transmitter unit 54 is decoded by the sync pattern comparator 375 in response to the 1,200 bit/sec. CL1 clock signal which is synchronized to the DATA signal. When the sync acquisition pattern (a 1101 pattern in the example previously described in connection with FIG. 3) is successfully decoded, the SA signal applied to the up/down counter circuit 380 increments the up/down counter circuit 380 to a count of 1 and the SA and ZERO signal synchronize the CL32 and CL36 framing signals with the incoming DATA signal. The error counter 388 is enabled by the ZERO signal after the first four bits of the DATA signal are successfully decoded and the number of ONE's in the next 32 bits of the DATA signal are counted. If no binary ONE's are found among these next 32 bits, the ERR signal increments up/down counter circuit to a count of 2. However, if one or more binary ONE's are counted in these 32 bits, the ERR signal decrements the up/down counter circuit 380 by one count.

At the end of the 36th bit of the DATA signal, the sync pattern comparator 375 again checks for the sync acquisition pattern SA in the DATA signal message word responsively to the CL36 signal and either increments or decrements the up/down counter circuit 380 depending upon the success or failure of the decoding operation. This process continues until the up/down counter circuit 380 reaches a count of 3 indicating that the sync acquisition portion (SA and 32 0's) of the DATA signal message word as described in connection with FIG. 3 has been successfully decoded.

When the up/down counter circuit reaches a count of 3, the KEY signal from the up/down counter circuit 380 assumes a high signal level and the transmitter 360 of FIG. 12 is turned on. In addition, the AND gate 376 is enabled and the CL1 clock signal is provided at the output terminal 356 as a SHIFT input signal for shifting the DATA signal through the delay or buffer circuit 354 of FIG. 12 to the pulse modulation input terminal of transmitter 360 of FIG. 12 for subsequent transmission to the paging receivers 56 of FIG. 1.

If a defective condition is detected at any time during the transmission of data from the transmitter 360, the ALARM signal from the alarm gate circuit 368 of FIG. 12 disables the sync decoder 352 by, for example, resetting the up/down counter circuit 380 and holding this circuit disabled until the defective condition is remedied.

1. Timing Circuit

The timing circuit 377 of the sync decoder 352 of FIG. 13 is illustrated in greater detail in FIG. 14. Referring now to FIG. 14, the CLOCK signal from the FSK/D converter 350 of FIG. 12 may be applied by way of the input terminal 371 to a suitable conventional phase shift circuit 394 for providing a plurality of clock output signals each shifted in phase by a predetermined amount from each other and from the CLOCK signal. The output signals CL1–CL4 from the phase shift or delay network 394 may be, for example, delayed in time from each other in accordance with the numerical order thereof.

The CL1 and the CL3 clock signals from the phase shift circuit 394 are provided at output terminals 391 and 393 of the timing circuit 377 for application respectively to the sync pattern comparator 375 and the up/down counter circuit 380 of FIG. 13. With continued reference to FIG. 14, the CL1 clock signal is also applied to the clock input terminal C of a divide-by-36 counter 396. The SA signal from the sync pattern comparator 375 of FIG. 13 may be applied via the input terminal 386 to one input terminal of a two input terminal AND gate 398. The ZERO signal from the terminal 401 of the up/down counter circuit 380 of FIG. 13 may be applied to the other input terminal of the AND gate 398. The output signal from the AND gate 398 may be applied to the reset input terminal R of the divide-by-36 counter 396 through a two input terminal OR gate 400.

The binary 32 output signal from the sixth stage of the divide-by-36 counter 396 may be clocked through a two input terminal AND gate 403 by the CL3 signal and provided at an output terminal 395 of the timing circuit 377 as the CL32 framing signal. In addition, the binary 32 signal from the counter 396 maay be applied to one input terminal of a three input terminal AND gate 402 and the binary 4 output signal from the third stage of the counter 396 applied to the other input terminal of the AND gate 402. The CL3 clock signal may be applied to the third input terminal of the AND gate 402 and the output signal from the AND gate 402 provided at an output terminal 397 of the timing circuit 377 as the CL36 framing signal. The CL36 framing signal may also be applied to the reset terminal R of the counter 396 through the OR gate 400 to reset the counter at a count of 36.

In operation, and with continued reference to FIG. 14, the CLOCK signal derived from the FSK/D converter 350 of FIG. 12 is applied to the phase shift circuit 394 and any desired number of clock signals each shifted in phase relative to each other, e.g., CL1–CL4, may be provided. The CL1 signal which is in phase with the CLOCK signal is applied to the divide-by-36 counter 396 causing the counter 396 to count at the bit rate of the CL1 signal, e.g., 1,200 bits per second.

When the ZERO signal from the up/down counter 380 of FIG. 13 assumes a high signal level indicating that all of the stages of the up/down counter circuit 380 are reset, i.e., the total count of the up/down counter is zero, and when the sync acquisition pattern SA is first recognized by the sync pattern comparator 375 of FIG. 13 providing a high signal level SA signal, the divide-by-36 counter 396 is reset to zero to provide a starting point relative to the initial sync acquisition pattern SA from which to generate the framing signals CL32 and CL36.

Each time the counter 396 counts to 32, the CL32 signal assumes a high signal level for the duration of one CL3 clock pulse. When the counter 396 reaches a count of 36, the CL36 signal assumes a high signal level for the duration of one CL3 clock pulse. In addition, the CL36 signal resets the divide-by-36 counter 396.

Thus, the timing circuit 377 provides the desired number of clock signals which are displaced slightly from each other in phase by predetermined amount. In addition, the timing circuit 377 provides framing signals CL32 and CL36 which may be utilized as gating signals for properly decoding the sync acquisition portion (SA and 32 0's) of the DATA signal message word as is susequently described in more detail.

2. Sync Pattern Comparator

The sync pattern comparator 375 of FIG. 13 is illustrated in greater detail in FIG. 15. With reference to FIG. 15, the DATA signal from the FSK/D converter 350 of FIG. 12 may be applied from the output terminal 351 thereof to the data input terminal of a four bit shift register 404 and the CL1 signal from the output terminal 391 of the timing circuit 377 of FIG. 14 may be applied to the clock input terminal of the register 404.

Assuming that the sync acquisition pattern SA is a binary 1101, the 1, 2, $\bar{4}$, and 8 output signals from the first through the fourth stages, respectively, of the shift register 404 may be applied to a 4 input terminal AND gate 406. The output signal from the AND gate 406 is provided at an output terminal 386 of the sync pattern comparator 375 as the SA signal. In addition, the 1 output signal from the binary one element of the shift register 404, i.e., the least significant digit, is provided at an output terminal 407 of the sync pattern comparator 375 as the DSH signal.

In operation and with continued reference to FIG. 15, the DATA signal from the FSK/D converter 350 of FIG. 12 is shifted into the shift register 404 by the CL1 clock signal from the timing circuit 377 of FIG. 14. When the proper sync acquisition pattern SA is recognized by the AND gate from 406, the SA signal assumes a high signal level, incrementing the up/down counter 380 of FIG. 13 as will subsequently be described in greater detail and starting the framing signal generator (the divide-by-36 counter 396 of FIG. 14) in the timing circuit 377 in synchronism with the incoming DATA signal.

3. Up/Down Counter Circuit

The up/down counter 380 of the sync decoder 352 of FIG. 13 is shown in greater detail in FIG. 16. Referring now to FIG. 16, the CL3 signal from the output terminal 393 of the timing circuit 377 of FIG. 14 may be applied via input terminal 378 to one input terminal of a five input terminal AND gate 408, a four input terminal AND gate 410, a five input terminal AND gate 412 and a five input terminal AND gate 414. The CL32 signal from the output terminal 397 of the timing circuit 377 may be applied via input terminal 382 to one input terminal of the AND gate 408 and to one input terminal of the AND gate 412. The CL36 signal from the output terminal 395 of the timing circuit 377 may be applied via input terminal 384 to one input terminal of the AND gate 410 and to one input terminal of the AND gate 414.

The ERR signal from the output terminal 390 of the error counter 388 of FIG. 13 may be applied to the AND gate 412 and through an inverter 416 to one input terminal of the AND gate 408. The SA signal from the output terminal 386 of the sync pattern comparator 375 of FIG. 13 may be applied to one input terminal of the AND gate 410 and through an invertor 418 to one input terminal of the AND gate 414.

The output signal from the AND gate 408 may be applied to one input terminal of a two input terminal of a two input terminal OR gate 420 and the output signal from the AND gate 410 may be applied to the other input terminal of the OR gate 420. The output signal from the OR gate 420 may be applied to the set input terminal S of a conventional bistable multivibrator or flip-flop 422 and to one input terminal of a two input terminal OR gate 424. The output signal from the OR gate 424 may be applied to the clock input terminal of a suitable conventional up/down counter 426. The output signal UP from the true output terminal Q of the flip-flop 422 may be applied to the up input terminal of the counter 426 and the output signal DN from the false output terminal $\overline{Q}$ of the flip-flop 422 may be applied to the down input terminal of the counter 426.

The output signal from the AND gate 412 may be applied to one input terminal of a two input terminal OR gate 428 and the output signal from the AND gate 414 applied to the other input terminal of the OR gate 428. The output signal from the OR gate 428 may be applied to the other input terminal of the OR gate 424 and to the reset input terminal R of the flip-flop 422.

The signal $\overline{1}$ from the false output terminal of the first stage of the counter 426 and the signal $\overline{2}$ from the false output terminal of the second stage of the counter 426 may be applied, respectively, to first and second input terminals of a two input terminal AND gate 430. The ZERO output signal from the AND gate 430 may be applied to one input terminal of a two input terminal OR gate 431, may be provided at an output terminal 401 of the up/down counter circuit 380, and may be inverted through an inverter 432 and provided at an output terminal 427 of the up/down counter circuit 380 as the $\overline{ZERO}$ signal. The $\overline{ZERO}$ signal from the inverter 432 may also be applied to one input terminal of the AND gate 408 and to one input terminal of each of the AND gates 412 and 414.

The 1 signal from the true output terminal of the first stage of the counter 426 and the 2 signal from the true output terminal of the second stage of the counter 426 may be applied, respectively, to a first and a second output terminal of a two input terminal AND gate 434. The THREE output signal from the AND gate 434 may be applied to the set input terminal S of a conventional binary element or flip-flop 436 and through an inverter 438 to one input terminal of each of the AND gates 408 and 410.

A KEY output signal from the true output terminal Q of the flip-flop 436 may be provided at an output terminal 358 of the up/down counter circuit 380 and a $\overline{SYNC}$ output signal from the false output terminal Q of the flip-flop 436 may be applied to one input terminal of each of the AND gates 412 and 414. The ALARM signal from the output terminal 381 of the alarm gate circuit 368 of FIG. 12 may be applied by way of an input terminal 392 to the other input terminal of the OR gate 431 and to the reset input terminal R of the up/down counter 426. The output signal from the OR gate 431 may be applied to the reset input terminal R of the flip-flop 436.

In operation and with continued reference to FIG. 16, the AND gates 410 and 414 are enabled by the CL36 signal from the timing circuit 377 of FIG. 14 each time that the sync acquisition pattern SA (e.g. 1101) should appear in the sync pattern comparator 375 of FIG. 13. If the SA signal assumes a high signal level indicating that the correct sync acquisition pattern is present in the comparator 375 when the CL36 signal is applied to the AND gates 410 and 414, and if the count in the counter 426 is not already at a count of 3 ($\overline{THREE}$ is at a high signal level) a pulse is clocked through the AND gate 410 by the CL3 clock signal setting the flip-flop 422 and clocking the counter 426 through the OR gate 424 to increment the up/down counter 426 by a count of one.

If the SA signal is at a low signal level indicating that the sync acquisition pattern is not present in the comparator 375 at that time when the CL36 signal is applied to the AND gates 410 and 414, and if the count in the up/down counter 426 is not already zero ($\overline{ZERO}$ is at a high signal level) and the flip-flop 436 is reset, the CL3 clock signal clocks a pulse through the AND gate 414 to reset the flip-flop 422 and clock the counter 426, thereby decrementing the counter 426 by a count of one.

The ERR signal from the error counter 388 of FIG. 13 assumes a high signal level when one or more binary ONE's are counted in the 32 bit 0's pattern between successive sync acquisition patterns SA and remains at a low signal level when no binary ONE's are counted during this portion of the sync acquisition signal. At the end of the 32 bits in this portion of the sync acquisition signal, the CL32 timing signal from the timing circuit 377 of FIG. 14 enables the AND gates 408 and 412. If no errors have been counted, the ERR signal will be at a low signal level when the CL32 signal assumes a high signal level and, if the count in the counter 426 is not zero and not 3 (i.e., both the $\overline{ZERO}$ and $\overline{THREE}$ signals are at a high signal level), the CL3 signal will clock a pulse through the AND gate 408 to set the flip-flop 422. The CL3 signal will also clock the counter 426 steered by the UP signal to increment the counter 380 by a count of one.

If, on the other hand, the ERR signal assumes a high signal level indicating that one or more binary ONE's appeared in the 32 0's portion of the sync acquisition signal, the flip-flop 422 is reset and the up/down counter 426 is decremented by a count of one by a pulse clocked through the AND gate 412, i.e., if the count in the counter 426 is not already zero and if the flip-flop 436 is not set (both the $\overline{ZERO}$ and $\overline{SYNC}$ signals are at a high signal level).

In summary, each time the sync acquisition pattern is successfully decoded at the proper position in the DATA signal, the up/down counter 426 is incremented by a count of one if not already at a count of 3. When the sync acquisition pattern SA does not appear at the proper location in the DATA signal message word, the up/down counter 426 is decremented by a count of one if not already at a count of zero and if the flip-flop 436 which keys the transmitter 360 of FIG. 12 is not already set.

Likewise, each time that no binary ONE's appear in the 32 0's portion of the sync acquisition pattern SA, the up/down counter 426 is incremented by a count of one if the count in the up/down counter 426 is not already 3 and if a sync acquisition pattern has been previously recognized, i.e., the count in the up/down counter 426 is not zero. Moreover, each time one or more binary ZERO's are counted by the error counter 388 of FIG. 13 during the 32 0 's portion of the sync acquisition signal SA, the up/down counter 426 is decremented by a count of one if the flip-flop 436 is reset and if the count of the counter 426 is not already zero.

In this manner the KEY signal from the up/down counter circuit 380 assumes a high signal level whenever the sync acquisition signal is received substantially error free one of the remote transmitter units 54 of FIG. 1. And, once the transmitter is keyed, subsequent errors in the sync acquisition signal will not decrement the up/down counter circuit to interrupt transmission.

VII. RECEIVER

One novel embodiment of the portable receivers 54 illustrated in the system of FIG. 1 is illustrated in FIG. 17. Referring now to FIG. 17, the novel portable receiver 54 of the present invention generally comprises an antenna 500, an FM radio receiver 502, a timing recovery circuit 504 and a sync and decode logic circuit 506.

The antenna 500 may be any suitable conventional antenna which preferably takes up little space in the receiver housing. For example, the antenna 500 may comprise a conventional ferrite antenna suitable for operation at the desired radio wavelengths.

The FM radio receiver 502 may likewise be any suitable conventional, preferably miniaturized, FMm radio receiver for receiving the radio frequency paging signal detected by the antenna 500 and for detecting the modulation of the radio frequency signal carrier.

The radio paging signal detected by the antenna 500 may be applied to a suitable conventional crystal bandpass filter 510 tuned to the center frequency at which the radio paging signals are transmitted. The output signal from the crystal filter 510 may be amplified by a suitable conventional radio frequency amplifier 512 and applied to a suitable conventional mixer 514. The output signal from a conventional local oscillator 516 may be applied to the mixer 514 and the intermediate frequency (IF) output signal from the mixer 514 may be amplified through a conventional IF amplifier 518 and applied to a suitable conventional FM detector or discriminator 520.

A SPDATA output signal from the detector 520 may then be applied to the timing and data recovery circuit 504 via an input terminal 503 and the output signals from the timing and data recovery circuit 504 may be applied to the sync and decode logic circuit 506 via a collective output terminal 505. A plurality of signals from the sync and decode logic circuit 506 may be applied to the timing and data recovery circuit 504 via a collective terminal 507 as will be subsequently explained.

The FM radio receiver 502 operates in a conventional manner to detect changes in the frequency of the detected radio signals within the desired frequency band with respect to a predetermined center frequency. Since, in the preferred embodiment of the present invention, the paging signals are transmitted as frequency shift keyed signals, the output signal from the detector 520 of the FM radio receiver 502 comprises a plurality of pulses which change in signal level each time a shift in the frequency of the input signal applied to the detector 520 is sensed. These output pulses are preferably in the form of conventional split phase signals and comprise the SPDATA signal applied to the output terminal 503.

The timing and data recovery circuit 504 converts the SPDATA signal from the detector 502 into a conventional non-return to zero (NRZ) digital format and recovers timing signal therefrom. This NRZDATA signal and the generated timing signals are then applied to the sync and decode logic circuit 506 for evaluation as will hereinafter be described in greater detail in connection with FIG. 19.

A. Timing Recovery Circuit

Figure 18:
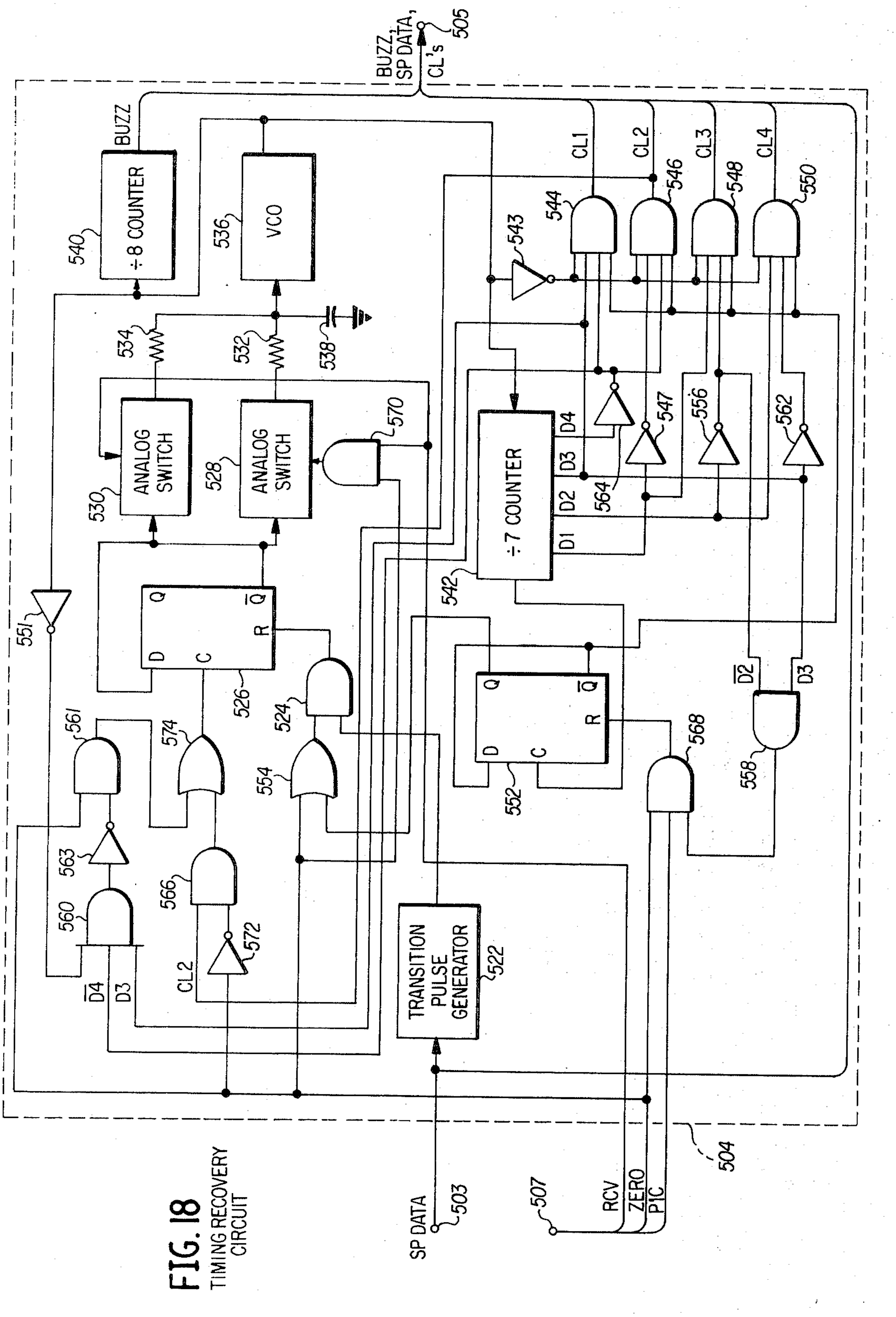
FIG. 18 is a functional block diagram of the timing recovery circuit of FIG. 17.

The timing recovery circuit 504 of FIG. 17 is illustrated in greater detail in the functional block diagram of FIG. 18. Referring to FIG. 18, the split phase data signal SPDATA from the output terminal 503 of the detector 520 of FIG. 17 may be applied to a suitable conventional transition pulse generator 522 in the timing and data recovery circuit 504. The output signal from the transition pulse generator 522 may be applied to one input terminal of a two input terminal AND gate 524 and the output signal from the AND gate 524 may be applied to the reset input terminal R of a conventional bistable multivibrator or flip-flop 526.

The false or $\overline{Q}$ output terminal of the flip-flop 526 may be connected to the set steering input terminal D of the flip-flop 526 and to the analog data input terminals of first and second analog switches 528 and 530. The output signals from the analog switches 528 and 530 may be applied, respectively, through resistors 532 and 534 to the control input terminal of a conventional voltage controlled oscillator (VCO) 536. The control input terminal of the oscillator 536 may be grounded through a capacitor 538.

The output signal from the VCO 536 may be applied to a divide by eight counter 540, to a divide by seven counter 542, through an inverter 543 to one input terminal of each of a plurality of four input terminal AND gates 544–550, and through an inverter 551 to one input terminal of a three input terminal AND gate 560.

The output signal from the counter 542 may be applied to the clock input terminal C of a conventional bistable multivibrator or flip-flop 552 and the false output terminal $\overline{Q}$ of the flip-flop 552 connected to the set steering input terminal D thereof. The output signal from the false output terminal Q of the flip-flop 552 may be applied to one input terminal of each of the AND gates 544–550 and the output signal from the true output terminal $\overline{Q}$ of the flip-flop 552 may be applied to one input terminal of a two input terminal OR gate 554. The output signal from the OR gate 554 may be applied to the other input terminal of the AND gate 524.

The D1 output signal from the first stage of the counter 542 may be applied to one input terminal of the AND gate 548 and through an inverter 547 to one input terminal of the AND gate 546. The D2 signal from the second stage of the counter 542 may be applied to one input terminal of the AND gate 550, through an inverter 556 to one input terminal of the AND gate 548, and to one input terminal of a two input terminal AND gate 558.

The D3 output signal from the counter 542 may be applied to the other input terminal of the AND gate 558, to one input terminal of the AND gate 544, to one input terminal of the three input terminal AND gate 560 and through an inverter 562 to one input terminal of the AND gate 550. The D4 output signal from the counter 542 may be applied through an inverter 564 to one input terminal of each of the AND gates 544, 546, and 560.

The CL1–CL4 clock output signals from the AND gates 544–550, respectively, may be applied to the collective output terminal 505 together with the SPDATA signal from the detector 520 of FIG. 17 and the output signal BUZZ from the divide by eight counter 540. In addition, the CL2 clock signal from the AND gate 546 may be applied to one input terminal of a two input terminal AND gate 566.

With continued reference to FIG. 18, the ZERO signal from the collective terminal 507 of the sync and decode logic circuit 506 of FIG. 17 may be applied to one input terminal of a three input terminal AND gate 568, to the other input terminal of the OR gate 554, to one input terminal of a two input terminal AND gate 570, to one input terminal of a two input terminal AND gate 561, and through an inverter 572 to the other input terminal of the AND gate 566. The output signal from the AND gate 560 may be applied through an inverter 563 to the other input terminal of the AND gate 561 and the output signal from the AND gate 561 may be applied to one input terminal of a two input terminal OR gate 574. The output signal from the AND gate 566 may be applied to the other input terminal of the OR gate 574 and the output signal from the OR gate 574 may be applied to the clock input terminal C of the flip-flop 526.

A RCV signal is applied to the collector input terminal 507 of the timing recovery circuit 504 of FIG. 18 from the sync and decode logic circuit 506 of FIG. 17 may be applied to the other input terminal of the AND gate 570 and to the gate input terminal of the analog switch 530. The output signal from the AND gate 570 may be applied to the gate input terminal of the analog switch 528.

A P1C signal is also applied to the collective input terminal 507 from the sync and decode logic circuit 506 of FIG. 17 and may be applied to an input terminal of the AND gate 568. The output signal from the AND gate 558 may be applied to another input terminal of the AND gate 568. The output signal from the AND gate 568 may be applied to the reset input terminal R of the flip-flop 552.

In operation, the split phase data signal SPDATA detected by the detector 520 of the radio receiver 502 of FIG. 17 may be applied to the transition pulse generator 522 of FIG. 18 to generate an output pulse each time the SPDATA signal changes signal level.

The pulses from the transition pulse generator 522 thus have a repetition rate approximately twice the bit rate of the data applied thereto and, since the bit rate of the split phase data is about 1,200 bits per second, the repetition rate of the signal from the transition pulse generator 522 is approximately 2,400 bits per second. It should be noted, however, that while the frequency of the signal from the transition pulse generator 522 will be approximately 2,400 pulses per second, some pulses will be missing since the SPDATA signal is in the form of non-return to zero data.

The output signal from the voltage controlled oscillator 536 must be synchronized in phase with the incoming split phase data signal to insure the generation of clock signal CL1–CL4 synchronized in phase and bit rate with the incoming SPDATA signal. To insure proper synchronization of the voltage controlled oscillator 536, a phase-lock loop may be utilized to generate a signal related to the phase difference between the incoming SPDATA signal and the clock signals for controlling the VCO 536 as in hereinafter described in greater detail.

The output signal from the transition pulse generator 522 is gated through the AND gate 524 and applied to the reset input terminal R of the flip-flop 526 to reset the flip-flop each time the SPDATA signal changes signal level. Since it is desirable to rapidly lock the voltage controlled oscillator 536 in phase with the incoming data signal during the 12 dummy bits at the beginning of each message word, all of the transition pulses are initially gated through the AND gate 524 by the high signal level ZERO signal from the word synchronizer of the sync and decode logic circuit 506 subsequently described in greater detail in connection with FIG. 19. In addition, during this initial 12 bit period and until the ZERO signal from the sync and decode logic circuit 506 assumes a low signal level, both of the analog switches 528 and 530 of FIG. 18 are enabled.

With continued reference to FIG. 18, the phase detect flip-flop 526 is clocked during this initial rapid synchronization period by the output signal from the voltage controlled oscillator 536 and is reset by the transition pulses from the pulse generator 522. The output signal from the false or $\overline{Q}$ output terminal of the flip-flop 526 is applied through the enabled analog switches 528 and 530 to the integrator comprising the resistors 532 and 534 and the capacitor 538. The voltage developed across the capacitor 538 controls the output signal from the VCO 536, synchronizing this output signal in phase with the SPDATA signal at a frequency of about 16.8 kilohertz.

Since the phase information supplied to the phase detect flip-flop 526 is at a 2.4 kilohertz rate during the period when the ZERO signal is at a high signal level and since the RC time constant of the integrator circuit is quite small resulting in an increased phase lock loop bandwidth, the voltage controlled oscillator rapidly synchronizes to the incoming SPDATA signal. However, there is still a possible phase ambiguity of plus or minus 180° which must be resolved since the output signal from the transition pulse generator 522 does not differentiate between positive going and negative going transitions.

To determine the proper phasing of the clock signals, the output signal from the VCO 536 is applied to the divide by seven counter 542 and the 2.4 kilohertz output signal therefrom may be utilized to clock the phase select flip-flop 552. When the flip-flop 552 is clocked at the 2.4 kilohertz rate, the output signal from the true output terminal Q thereof controls the gating of the transition pulses through the AND gate 524 and may be either in phase or out of phase with the incoming split phase data. As long as the sync acquisition pattern SA of the incoming message word of the SPDATA signal is successfully recognized, the phase of the output signal from the phase select flip-flop 552 is not changed. However, should the complement (i.e., 0010 of the illustrative sync acquisition pattern 1101 of FIG. 3) be recognized, the "sync pattern complement" or P1C signal assumes a high signal level and the flip-flop 552 is reset at the proper time by the $\overline{D2}$ and D3 signals from the divide by seven counter 542. The phase of the output signal from the flip-flop 552 is thus reserved.

Upon recognition of the sync acquisition pattern SA or its complement by the sync and decode logic circuit 506 as is hereinafter described in connection with FIG. 19, the ZERO signal assumes a low signal level inhibiting the AND gates 561, 568 and 570 and enabling the AND gate 566. Thereafter, the CL2 signal clocks the flip-flop 526. The flip-flop 526 is thus reset on every other transition pulse selected by the phase select flip-flop 552. In addition, the analog switch 528 is inhibited and the RC time constant of the integrator circuit is substantially increased, thereby decreasing the bandwidth of the phase-lock loop.

The divide by seven counter 542 provides four output signals D1–D4 from the true output terminals of the first through fourth stages thereof, respectively. These signals are decoded by the AND gates 544–550 to provide the four clock signals CL1–CL4. The clock signals CL1–CL4 are generated at a 1,200 kilohertz repetition rate and are shifted slightly in phase relative to each other so as to provide four clock signals synchronized in repetition rate with the bit rate of the incoming data stream and slightly delayed relative to each other. For example, the CL1 clock signal is phased relative to the incoming data stream so that a CL1 pulse occurs in the first quarter of each bit position of the incoming SPDATA signal. The CL2–CL4 signals may be all delayed by a predetermined amount such as 50 to 100 microseconds relative to the CL1 signal and relative to each other in accordance, for example, with the order of the numerical designations thereof.

As is subsequently described in greater detail, the receiver may turn on during only one of the time slots which make up a major data frame. For example, the receiver may be energized for about 1 second and deenergized for about 7 seconds during each 8 second major data frame. During the "off" time of the receiver, the RCV signal assumes a low signal level and both analog gates 528 and 530 are inhibited. However, the capacitor 538 retains (stores) the voltage developed thereacross during the "on" time of the receiver and, when the receiver is again energized, the VCO 536 is locked approximately in phase with the incoming SPDATA signal thereby facilitating the synchronization of the timing recovery circuit. Also, since the frequency of the VCO 536 is held nearly constant during the time that the receiver is off, the "off" time of the receiver can be timed with great accuracy thus permitting the receiver reenergization for receipt of the data signal in the desired time slot of the next major data frame.

B. Sync And Decode Logic Circuit

The sync and decode logic circuit 506 of FIG. 17 is illustrated in greater detail in the functional block diagram of FIG. 19. Referring to FIG. 19, the split phase data or SPDATA signal at the collective input terminal 505 of the sync and decode logic circuit may be applied to a sync pattern detector 600, and the BUZZ signal from the timing recovery circuit 504 of FIG. 18 may be applied to a page indicator 602. The CL1 clock signal from the timing recovery circuit 504 of FIG. 18 may also be applied to the sync pattern detector 600 via the collective input terminal 505 and the CL3–CL4 signals may be applied to an up/down counter circuit 604. The CL1–CL4 clock signals may be applied to a receiver on/off logic circuit 606. The CL1 and CL2 signals from the input terminal 505 may be applied to a matrix address generator 608 and, together with the CL4 clock signal, may be applied to an address evaluator 610. The CL2 signal may be applied to the timing signal generator 612 and the CL2–CL4 signals may be applied to an address accept circuit 614.

A "sync acquisition detected" or SA signal from an output terminal 600A of the sync pattern detector 600 may be applied to the matrix address generator 608 and to the up/down counter circuit 604. A delayed data or DDATA output signal from an output terminal 600B of the sync pattern detector 600 may be applied to the address evaluator 610 and the sync acquisition pattern complement or P1C output signal may be applied from an output terminal 600C of the sync pattern detector 600 to the collective output terminal 507 of the sync and decode logic circuit for application to the timing recovery circuit 504 of FIG. 18.

With continued reference to FIG. 19, a "zero count" or ZERO signal from an output terminal 604A of the up/down counter circuit 604 may be applied to the collective output terminal 507, to the sync pattern detector 600 and to the matrix address generator 608. A SYNC and a $\overline{SYNC}$ signal from a collective output terminal 604B from the up/down counter circuit 604 may be applied to the address evaluator 610 and to the address accept circuit 614. The $\overline{SYNC}$ signal from the collective output terminal 604B may also be applied to the receiver on/off logic circuit 606.

The matrix address generator 608 provides two framing signals CL32 and CL36 which may be applied via a collective output terminal 608A to the up/down counter circuit 604 and to the address evaluator 610. The CL32 signal from the matrix address generator 608 may also be applied to the address accept circuit 614 and the CL36 signal may be applied to the timing signal generator 612. Row scan signals $\overline{R1}$–$\overline{R9}$ are generated by the matrix address generator 608 and may be applied via a collective output terminal 608B to an address matrix 616. In addition, the row scan signal R9 may be applied to the address accept circuit 614. The column scan signals C1–C4 may be applied from the matrix address generator 608 to the address matrix 616 via a collective output terminal 608C.

The address matrix 616 provides one or more address signals, e.g., ADS1 and ADS2, in response to the scanning of the address matrix by the row and column scan signals $\overline{R1}$–$\overline{R9}$ and C1–C4. The ADS1 and ADS2 address signals may be applied to the address evaluator 610 via an output terminal 616A. If only one address signal, e.g., ADS1, is provided, an "address number 2 inhibit" or $\overline{A2}$ signal may be applied via the output terminal 616B to the address accept circuit 614.

The address evaluator 610 evaluates the incoming data signal DDATA with respect to the locally generated address signals ADS1 and ADS2 and generates address error signals ERR3A and ERR3B which may be applied via an output terminal 610A to the address accept circuit 614. An error signal ERR1 may be applied via an output terminal 610B to the up/down counter circuit 604 and "sync maintenance gating" or G and $\overline{G}$ signals from the address evaluator 610 may be applied via an output terminal 610C to the up/down counter 604. The G output signal from the collective output terminal 610C may also be applied to the receiver on/off logic circuit 606.

The address accept circuit 614 evaluates the address error data and determines whether or not an acceptable address has been received. An "address accept" signal AD1AC or AD2AC is generated by the address accept circuit for the accepted addresses assigned to the receiver and may be applied via an output terminal 614A of the address accept circuit 614 to the page indicator 602. An "indicator reset" or IRST output signal from the address accept circuit 614 may be applied via an output terminal 614B to the page indicator 602.

The receiver on/off logic circuit 606 controls the energization and deenergization of the receiver during the successive major data frames. The "receiver on" and "receiver off" signals RCV and $\overline{RCV}$, respectively, are provided at a collective output terminal 606A of the receiver on/off logic circuit 606. The RCV signal may be applied to the collective output terminal 507 of the sync decode and logic circuit and to the address accept circuit 614. The $\overline{RCV}$ signal from the collective output terminal 606A of the receiver on/off logic circuit 606 may be applied to the sync pattern detector 600, the matrix address generator 608, the address evaluator 610, and the page indicator 602. The "timing circuit reset" signal FF21 and the "address received" or ADREC signal may be applied via an output terminal 606B of the receiver on/off logic circuit 606 to the timing signal generator 612. The "address transfer" or TRANS signal, the FF6 signal and the FF8 signal from the collective output terminal 606C of the receiver on/-off logic circuit 606 may be applied to the address accept circuit 614.

The timing signal generator 612 may provide various timing signals S6.7 and Y1–Y5 at an output terminal 612A which may be applied to the receiver on/off logic circuit 606. Additional timing signals Z1 and Y3 may be applied from an output terminal 612B of the timing signal generator 612 to the page indicator 602.

The sync and decode logic circuit 506 of FIG. 19 may also include a battery test circuit 618 and a power on reset circuit 620. The power on reset circuit 620 may provide a "power on reset" or POR output signal when the receiver is initially energized. The POR signal may be applied to the timing signal generator 612, the receiver on/off logic circuit 606, the address accept circuit 614, the page indicator 602 and the battery test circuit 618 to reset these circuits when the power is initially turned on. The battery test circuit 618 may test the receiver battery voltage when the power is initially turned on and may provide a "battery bad" or BBAD output signal if the battery output voltage is below a predetermined level.

In operation, the split phase data signal SPDATA recovered by the discriminator circuit 520 in the receiver of FIG. 17 is clocked into the sync pattern detector 600 of FIG. 19 by the CL1 clock signal. When the initial 4 bit sync acquisition signal SA or its complement P1C is recognized by the sync pattern detector 600, the up/-down counter circuit 604 is incremented by a count of one by the SA signal. The P1C signal applied to the timing recovery circuit 504 of FIG. 18 changes the phase of the CL1 signal if the sync acquisition signal complement is recognized.

With continued reference to FIG. 19, the address evaluator 610 thereafter counts the number of binary ONE's in the subsequent 32 bits of the sync acquisition signal in response to the framing signals CL32 and CL36 provided by the matrix address generator 608. If one or more binary ONE's are counted, the up/down counter circuit 604 is decremented by a count of one. If no binary ONE's are counted, the up/down counter circuit 604 is incremented by a count of one.

If the up/down counter circuit 604 reaches a count of 3 during the sync acquisition portion of the incoming SPDATA signal indicating that the bit error rate of the incoming digital data signal SPDATA is below a predetermined value, the SYNC signal assumes a high signal level allowing the address portion of the SPDATA signal forwarded as the DDATA signal to thereafter be evaluated by the address evaluator 610.

The address portion of the DDATA signal, i.e., the 30 addresses described in FIG. 3 without the sync maintenance signal SB, is evaluated by scanning of the address matrix 616 in synchronism with each address portion of the incoming DDATA signal and by successively evaluating differences in signal level between corresponding bits of the locally generated address signals ADS1 and ADS2 and the delayed data signal DDATA from the sync pattern detector 600. If the number of differences in signal level between corresponding bits of the address signals ADS1 and ADS2 and the DDATA signal is less than a predetermined number, the address accept circuit 614 is conditioned by one of the ERR3A and ERR3B signals to provide an address accept signal when the RCV signal assumes a low signal level. When the address is accepted and the receiver signal RCV assumes a low signal level, an audible page indicating signal is provided by a page indicator 602 at the end of the time slot.

The sync maintenance portion SB of the incoming SPDATA signal is also checked against a sync maintenance signal assigned to the receiver and stored in the address matrix 616 as, for example, the last four bits of the ADS1 signal. Evaluation of this sync maintenance portion SB ensures that the bit error rate of the incoming data signal does not exceed a predetermined value throughout the remainder of the time slot. This evaluation also ensures that the receiver is receiving a transmitter in the proper paging system when two or more systems are operating in the same paging area.

Each address portion of the incoming DDATA signal contains at least six binary ONE's in the preferred embodiment described, whereas the 32 bit 0's portion of the sync acquisition signal contains less than six binary ONE's. A count of 6 in a counter responsive only to binary ONE's in the address evaluator 610 thereby may indicate that an address rather than a 0's portion is being evaluated. This count of 6 in coincidence with the CL36 framing signal causes the G signal to assume a high signal level and thereafter recognition of any sync acquisition patterns other than SB decrements the up/down counter circuit 604 and recognition of any sync maintenance patterns SB increments the up/down counter circuit 604.

If, at the end of the time slot, the SYNC signal is still at a high signal level indicating that the bit error rate of the SPDATA was acceptable throughout the time slot, the receiver circuits are deenergized until the SPDATA signal is due to arrive in that same time slot during the next major data frame. To deenergize the receiver circuits for the desired time interval, the $\overline{RCV}$ signal from the reciever on/off logic circuit 606 assumes a low signal level for approximately 6.72 seconds (when the data frame is made up of eight 1-second time slots) in response to the S6.7 signal from the timing signal generator 612. The receiver on/off logic circuit 606 thereafter energizes the receiver circuits immediately before the data signal SPDATA is due to arrive in the selected time slot during the next major data frame.

As was previously mentioned, the page indicator 602 may generate an audible alarm when an address has been successively evaluated during a selected time slot. Where two different addresses are assigned to a receiver, e.g., each address indicating that a different paging party or group of parties desires to communicate with the subscriber, two different audible tones may be provided by the page indicator 602. The BUZZ signal from the timing recovery circuit indicating that the receiver is energized may, for example, be a 2.1 kilohertz signal and may be gated to an audible indicator such as an electromagnetic transducer as a steady tone in response to the recognition of one of the address signals ADS1 assigned to the receiver and as a chopped or pulsating tone in response to the recognition of the other address signal ADS2 assigned to the receiver.

1. Sync Pattern Detector

The sync pattern detector 600 of FIG. 19 is illustrated in greater detail in the functional block diagram of FIG. 20. With reference to FIG. 20, the split phase data signal SPDATA from the collective output terminal 505 of the timing recovery circuit 504 of FIG. 18 may be applied through one or more shaping amplifiers 622 to the data input terminal of a four bit shift register 624. The CL1 clock signal from the collective input terminal 505 of the timing recovery circuit 504 of FIG. 18 may also be applied to the clock input terminal C of the shift register 624. The $\overline{RCV}$ signal from the output terminal 606A of the receiver on/off logic circuit 606 of FIG. 19 may be applied to the reset input terminal R of the shift register 624.

Assuming that the 4 bit sync acquisition pattern SA is 1101, the Q1, Q2 and Q4 output signals from the true output terminals of the first, second and fourth stages of the shift register 624 may be applied to three input terminals of a four input terminal AND gate 626 and the $\overline{Q3}$ output signal from the false output terminal of the third stage of the shift register 624 may be applied to the fourth input terminal of the AND gate 626. The "pattern recognized" or P1 output signal from the AND gate 626 may be applied to one input terminal of a two input terminal OR gate 628 and the sync acquisition pattern detected" or SA output signal from the OR gate 628 may be provided at an output terminal 600A of the sync pattern detector 600 for application to the up/down counter circuit 604 and the matrix address generator 608 of FIG. 19.

The $\overline{Q1}$, $\overline{Q2}$ and $\overline{Q4}$ signals from the false output terminals first, second and fourth stages, respectively, of the shift register 624 may be applied to three input terminals of a four input terminal AND gate 630 and the Q3 signal from the true output terminal of the third stage of the shift register 624 may be applied to the fourth input terminal of the AND gate 630. The "sync pattern complement detected" or P1C output signal from the AND gate 630 may be applied to one input terminal of a two input terminal AND gate 632 and to the output terminal 600C of the sync pattern detector 600. The ZERO signal from the output terminal 604A of the up/down counter circuit 604 of FIG. 19 may be applied to the other input terminal of the AND gate 632 and the output signal from the AND gate 632 and the output signal from the AND gate 632 may be applied to the other input terminal of the OR gate 628.

In operation and with continued reference to FIG. 20, the $\overline{RCV}$ signal resets the shift register 624 when the receiver is first turned off. The SPDATA signal is shaped by the shaping amplifiers 622 and is clocked into the shift register 624 by the CL1 clock signal.

When the four bit sync acquisition pattern SA is recognized by the AND gate 626, the SA signal assumes a high signal level for the duration of from one CL1 clock pulse. If the count in the up/down counter 604 of FIG. 19 is zero, and the complement of the four bit sync acquisition pattern SA is recognized by the AND gate 630, the SA output signal assumes a high signal level and the P1C signal assumes a high signal level changing the phase of the CL1 clock signal as was previously described. When either the sync acquisition pattern or its complement is recognized by the AND gate 626 and 630, the high level SA output signal increments the up/down counter circuits 604 as will hereinafter be described in connection with FIG. 21 and thereafter the AND gate 632 is inhibited and only the successful recognition of the sync acquisition pattern SA by the AND gate 626 will provide a high signal level SA output signal.

In addition, the output signal Q1 from the true output terminal of the first stage of the shift register 624 is provided at the output terminal 600B as the DDATA output signal. This DDATA signal is utilized by the address evaluator 610 as will hereinafter be described in greater detail in connection with FIG. 24.

2. Up/Down Counter Circuit

The up/down counter circuit 604 of the sync and decode logic circuit of FIG. 19 is illustrated in greater detail in the functional block diagram of FIG. 21. Referring now to FIG. 21, the CL 3 clock signal from the collective input terminal 505 of the sync and decode logic circuit 506 of FIG. 19 may be applied to one input terminal of a six input terminal AND gate 634, a five input terminal AND gate 636, a four input terminal AND gate 638, and three five input terminal AND gates 640–644. The CL4 clock signal from the collective input terminal 505 of the sync and decode logic circuit 506 of FIG. 19 may be applied to one input terminal of four two input terminal AND gates 646–652.

With continued reference to FIG. 21, the sync pattern decoded or SA signal from the output terminal 600A of the sync pattern detector 600 of FIG. 20 may be applied to one input terminal of the AND gate 636 and through an inverter 641 to one input terminal of the AND gate 640. The ERR1 output signal from the output terminal 610B of the address evaluator 610 of FIG. 19 may be applied to one input terminal of each of the AND gates 642 and 644 and through an inverter 654 to one input terminal of each of the AND gates 634 and 638.

Figure 24:
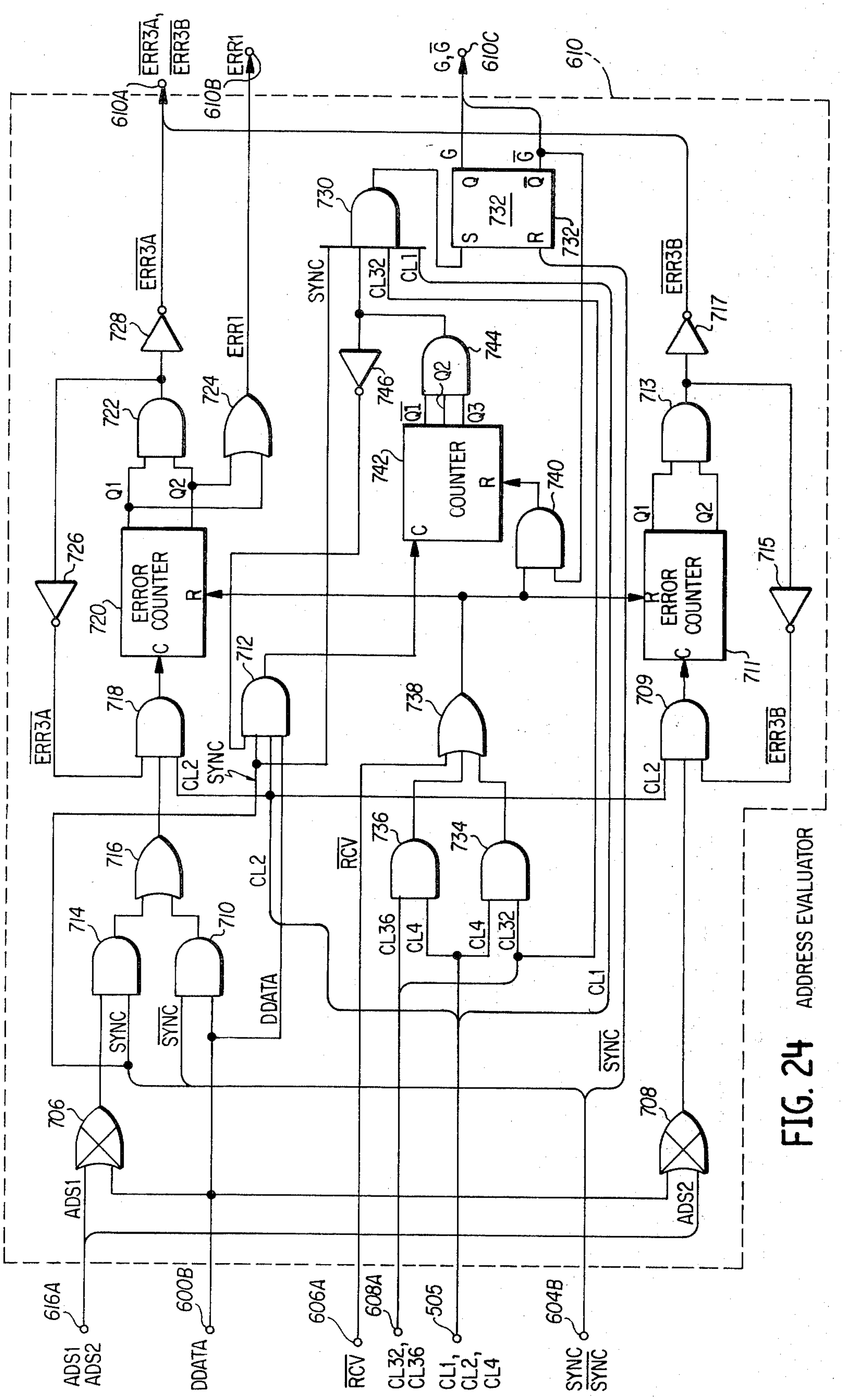
FIG. 24 is a more detailed functional block diagram of the address evaluator of FIG. 19.

The "first address signal received" or G output signal from the output terminal 610C of the address evaluator 610 of FIGS. 19 and 24 may be applied to one input terminal of the AND gate 642 and the $\overline{G}$ signal from the output terminal 610C may be applied to one input terminal of each of the AND gates 636 and 640. The CL32 framing signal from the output terminal 608A of the matrix address generator 608 of FIGS. 19 and 22 may be applied to one input terminal of each of the AND gates 648 and 634 and the output signal CL36 from the collective output terminal 608A of the matrix address generator 608 may be applied to one input terminal of each of the AND gates 646 and 636–642.

The output signal from the AND gate 634 may be applied to one input terminal of a three input terminal OR gate 656 and the output signal from the OR gate 656 may be applied to the "up" input terminal of a conventional two stage up/down counter 659. The output signal from the AND gate 636 may be applied to a second input terminal of the OR gate 656 and the output signal from the AND 638 may be applied to one input terminal of a two input terminal AND gate 658, the output signal from which may be applied to the third input terminal of the OR gate 656.

The output signal from the AND gate 640 may be applied to one input terminal of a three input terminal OR gate 660 and the output signal from the AND gate 642 may be applied to a second input terminal of the OR gate 660. The output signal from the AND gate 644 may be applied through an inverter 662 to the clock input terminal C of a conventional bistable multivibrator or flip-flop 664 and to the third input terminal of the OR gate 660. The output signal from the OR gate 660 may be applied to the "down" input terminal of the up/down counter 659.

The output signals $\overline{Q1}$ and $\overline{Q2}$ from the false output terminals of the first and second stages, respectively, of the up/down counter 659 may be applied to the input terminals of a two input terminal AND gate 666. The output signals Q1 and Q2 from the true output terminals of the first and second stages, respectively, of the up/down counter 659 may be applied to the input terminals of a two input terminal AND gate 668. The ZERO output signal from the AND gate 666 may be applied to the second input terminal of the AND gate 650, to the output terminal 604A, and through an inverter 670 to one input terminal of each of the AND gates 634, 640–644. The THREE output signal from the AND gate 668 may be applied to the other input terminal of the AND gate 652 and through an inverter 672 to one input terminal of each of the AND gates 634 and 636 and to the other input terminal of the AND gate 658.

The output signal from the AND gate 652 may be applied to the set input terminal S of a bistable multivibrator or flip-flop 674 and the output signal from the AND gate 650 may be applied to the reset input terminal R of the flip-flop 674. The SYNC output signal from the true output terminal of the flip-flop 674 may be provided at the collective output terminal 604B and may be applied to an input terminal of the AND gate 638. The $\overline{SYNC}$ signal from the false or $\overline{Q}$ output terminal of the flip-flop 674 may be applied to the collective output terminal 604B and to an input terminal of each of the AND gates 634 and 644.

The output signal from the AND gate 646 may be applied to the set input terminal S of the flip-flop 664 and the output signal from the AND gate 648 may be applied to the reset input terminal R of the flip-flop 664. The set steering terminal D of flip-flop 664 may be grounded and the "address gate" or ADGT output signal from the true or Q output terminal of the flip-flop 664 may be applied to another input terminal of the AND gate 644.

In operation and with continued reference to FIG. 21, the $\overline{RCV}$ signal resets the up/down counter 659 in the up/down counter circuit 604 to zero by clearing the up/down counter 659. The ZERO signal from the counter 659 responsive AND gate 666 assumes a high signal level inhibiting the AND gates 634 and 640–644. When the AND gate 668 is inhibited, the THREE signal assumes a low signal level enabling the AND gates 634 and 636. Since the AND gate 634 is also inhibited by the $\overline{ZERO}$ signal, only the AND gate 636 is enabled when the count in the up/down counter 659 is zero.

When the first four bit sync acquisition pattern SA or its complement is recognized by the sync pattern detector 600, the SA signal assumes a high signal level and is gated through the AND gate 636 by the CL3 clock signal and the CL36 framing signal. The output signal from the AND gate 636 assumes a high signal level and is applied to the "up" input terminal of the up/down counter 659 via the OR gate 656 to increment the up/down counter by a count of one. The ZERO signal from the AND 666 thereafter assumes a low signal level and the AND gates 640–644 and 634 are all enabled, permitting the counter 659 to be either incremented or decremented.

Prior to reaching a count of three and setting the sync flip-flop 674, the up-down counter 659 may be incremented by the successful recognition of the four bit SA portion of the sync acquisition signal, or by the recognition of the 32 bit 0's portion of the sync acquisition signal. After the sync flip-flop 674 is set in response to the successful recognition of the sync acquisition signal, the sync maintenance pattern SB can either increment or decrement the up/down counter 659. TABLE II, which follows, provides a listing of the combination of signal conditions which will effect incrementation of the up/down counter 659:

TABLE II

| Gate Designation | Signal Combinations (High Level) | Signal Function |
|---|---|---|
| AND gate 634 | $\overline{ZERO}$ | count not zero |
| | $\overline{THREE}$ | count not three |
| | CL32 | end of 32 bit 0's or address |
| | $\overline{SYNC}$ | sync flip-flop reset |
| | CL3 | clock (3rd phase) |
| | ERR1 | error count less than 1 in either 32 bit 0's portion of sync acquisition signal or SB pattern |
| AND gate 636 | $\overline{THREE}$ | count not three |
| | SA | sync acquisition pattern decoded |
| | CL36 | end of SA or SB four bit pattern |
| | $\overline{G}$ | sync acquisition signal still being evaluated |
| | CL3 | clock (3rd phase) |
| AND gate 658 | SYNC | sync flip-flop set |
| | CL36 | end of SA or SB four bit pattern |
| | $\overline{ERR1}$ | error count less than 1 |
| | CL3 | clock (3rd phase) |
| | $\overline{THREE}$ | count not three |

It can be seen from the above Table II that the $\overline{THREE}$ signal prevents the counter 659 from being incremented beyond a count of three. Moreover, the $\overline{ERR1}$ signal can indicate either that less than one binary ZERO appeared in the 32 bit 0's portion of the sync acquisition signal or that less than one error appeared during the evaluation of a sync maintenance or SB pattern. However, the framing signals CL32 and CL36 differentiate between these two possibilities, causing the AND gate 634 to respond to the recognition of the SB or sync maintenance signal.

Once the up/down counter 659 is at a count of one or more, the counter 659 may be decremented through the enabled AND gates 640–642. Table III below illustrates the various combinations of signal conditions which may decrement the up/down counter 659.

TABLE III

| Gate Designation | Signal Combinations (High Level) | Signal Function |
|---|---|---|
| AND gate 640 | $\overline{G}$ | sync acquisition signal still being evaluated |
| | $\overline{ZERO}$ | count not zero |
| | $\overline{SA}$ | sync acquisition pattern not decoded |
| | CL36 | end of SA or SB four bit pattern |
| | CL3 | clock |
| AND gate 642 | G | first address signal received |
| | $\overline{ZERO}$ | count not zero |
| | ERR1 | error count one or more |
| | CL36 | end of SA or SB four bit pattern |
| | CL3 | clock |
| AND gate 644 | $\overline{ZERO}$ | count not zero |
| | $\overline{SYNC}$ | sync flip-flop set |
| | ADGT | address gate (high for 32 bits between adjacent 4 bit sync patterns) |
| | ERR1 | error count one or more |
| | CL3 | clock |

It can be seen from the above Table III that an erroneous four bit sync acquisition pattern SA will decrement the up/down counter 659 through the AND gate 640, and that one or more binary ONE's in the 32 bit 0's portion of the sync acquisition signal will decrement the up/down counter 659 through the AND gate 644. Moreover, after the first address signal is received, the G signal assumes a high signal level and unsuccessful recognition of the four bit sync maintenance pattern SB indicated by a high signal level ERR1 signal decrements the counter 659 through the AND gate 642.

If the up/down counter 659 does not reach a count of three and set the sync flip-flop 674 during the 112 bit sync acquisition portion of the incoming SPDATA signal, the addresses received during the remainder of the time slot are not decoded. A count of three may be reached by the up/down counter during the 112 bit sync acquisition portion of the incoming SPDATA signal in the following ways:

TABLE IV

| | Sync Acquisition Signal | | | | | | |
|---|---|---|---|---|---|---|---|
| | SA | 32 O's | SA | 32 O's | SA | 32 O's | SA |
| | 1 | 2 | 3 | 3 | 3 | 3 | 3 |
| | 0 | 0 | | | | | |
| | 2 | 3 | 3 | 3 | | | |
| | 1 | 2 | 1 | 2 | 3 | 3 | 3 |
| | 1 | 0 | 1 | 2 | 3 | 3 | 3 |
| Count | 0 | 0 | 0 | 0 | 1 | 2 | 3 |
| in | 0 | 0 | 1 | 2 | 1 | 2 | 3 |
| up/dn | 1 | 0 | 0 | 0 | 1 | 2 | 3 |
| cntr. | 1 | 0 | 1 | 0 | 1 | 2 | 3 |
| 659 | 1 | 0 | 1 | 2 | 1 | 2 | 3 |
| | 1 | 2 | 1 | 0 | 1 | 2 | 3 |
| | 1 | 2 | 1 | 2 | 1 | 2 | 3 |

Of course, the sync flip-flop 674 may be subsequently reset before the end of the time slot if the bit error rate of the incoming SPDATA signal is excessive as indicated by the unsuccessful recognition of a sufficient number of successive sync signals after the flip-flop 674 is reset at the end of a time slot. In this event, the SPDATA signal is evaluated in the next successive time slots until the bit error rate of the SPDATA signal is found to be within the desired tolerances. When the bit error rate of the SPDATA signal is within a desired tolerance, the sync flip-flop 674 will still be set at the end of the time slot and the receiver will be deenergized for a predetermined time interval and then reenergized just before the SPDATA signal is due to arrive in the same time slot during the next major data frame.

3. Matrix Address Generator

The matrix address generator 606 of the sync and decode logic circuit of FIG. 19 is illustrated in greater detail in the functional block diagram of FIG. 22.

With reference to FIG. 22, the CL1 clock signal from the collective output terminal 505 of the timing recovery circuit of FIG. 18 may be applied to the clock input terminal C of a suitable conventional two stage ring counter 680 and the CL2 clock signal from the collective output terminal 505 of the timing recovery circuit of FIG. 18 may be applied to one input terminal of a three input terminal AND gate 682. The SA signal from the output terminal 600A of the sync pattern detector 600 of FIG. 20 may be applied to another input terminal of the AND gate 682 and the ZERO signal from the output terminal 604A of the up/down counter circuit 604 of FIG. 21 may be applied to the other input terminal of the AND gate 682. The output signal from the AND gate 682 may be applied to the reset input terminal R of the ring counter 680 and to a reset input terminal R of a suitable conventional five stage twisted ring counter 684.

The output signals Q1, $\overline{Q1}$, Q2 and $\overline{Q2}$ from the two stages of the ring counter 680 may be applied to a suitable gating circuit 686 to generate successive column scan signals C1–C4 which may be provided at the output terminal 608C of the matrix address generator 608. The C1 signal from the gating circuit 686 may also be applied to the clock input terminal C of the twisted ring counter 634 and the C4 signal from the gating circuit 686 may be applied to one input terminal of a pair of two input terminal AND gates 688 and 690.

The R1–R9 output signals from the 1–9 output terminals of the twisted ring counter 684 may be gated through a plurality of NAND gates generally indicated at 692 and the row scan or $\overline{R1}$–$\overline{R9}$ output signals from the NAND gates may be applied to the collective output terminal 608B of the matrix address generator 608 for application to the address matrix circuit 616 and the address accept circuit of FIG. 19.

With continued reference to FIG. 22, the R8 signal from the twisted ring counter 684 may be applied to the second input terminal of the AND gate 688 and the R9 signal from the twisted ring counter 684 may be applied to the second input terminal of the AND gate 690. The framing signals CL32 and CL36 from the output terminals of the AND gates 688 and 690 respectively may be provided at the collective output terminal 608A of the matrix address generator 608 for application to the address evaluator 610, the up/down counter circuit 604 and the timing signal generator 612 of FIG. 19.

In operation, the two stage ring counter is clocked at a 1,200 bit per second rate by the CL1 clock signal and generates the successive column scanning signals C1–C4 once during every four bits of the clock signal. The C1 signal clocks the twisted ring counter 684 and the row scan signals R1–R9 are generated once during every nine column scan signals. Since both of the ring counters 680 and 684 are started at the same time when the first sync acquisition pattern is recognized, the column and row scanning signals are synchronized with the incoming 32 bit patterns which occur intermediate the sync acquisition and sync maintenance signals.

The C4 column scanning signal and the R8 row scanning signal are coincident at exactly the end of the 32 bit pattern. These two signals thus generate the CL32 signal exactly 32 pulses after the recognition of the SA pattern. The R9 and C4 signals are coincident at exactly the 36th pulse in the DATA signal after the recognition of the SA signal. Thus, the CL36 signal generated in response to the C4 and R9 signals occurs at exactly the beginning of the 32 bit 0's pattern and the subsequently received address patterns.

4. Address Matrix Circuit

The address matrix circuit 616 of the sync and decode logic circuit 506 of FIG. 19 is illustrated in greater detail in the functional block diagram of FIG. 23.

Referring now to FIG. 23, the $\overline{R1}$–$\overline{R9}$ row scan signals from the output terminal 608B of the address matrix generator 608 of FIG. 19 are applied respectively to the R1′–R9′ input terminals of one or more suitable conventional 9 × 4 address matrix circuits such as those illustrated at 694A and 694B. Where it is desired to assign more than two addresses to a particular receiver, additional address matrices may be provided.

Each of the address matrices 694 is preferably a conventional blown fuse diode matrix in which all of the output lines C1′–C4′ are connected to each of the row input lines R1′–R9′ through diodes and a fuse link. The address assigned to the receiver may be permanently stored in the matrix by blowing selected ones of the fuses in series with the diodes so that specific ones of the rows and columns are disconnected and cannot be grounded by the input signals $\overline{R1}$–$\overline{R9}$ during the scanning of the address matrix. In this manner, when a particular column output line is read in response to the column scan signals C1–C4, those row-column connections which are open provide a binary ONE output signal when read.

The C1′–C4′ output terminals of the address matrix 694A are connected respectively to one input terminal of each of four two input terminal AND gates 696–699 and are each connected through associated resistors 700–703 to a source of positive potential.

The C1–C4 column scan signals from the output terminal 608C of the matrix address generators 608 of FIG. 19 are applied, respectively, to the other input terminal of each of the AND gates 696–699. The output signals from the AND gates 696–699 are each applied to one input terminal of a four input terminal OR gate 704 and the output signal from the OR gate 704 is provided at an output terminal 616A as the ADS1 address signal.

The circuit utilized to generate a second local address utilizing the address matrix 694B may be identical to that described in connection with the address matrix 694A and will therefore not be described in detail. The second address signal ADS2 may also be provided at the collective output terminals 616A of the address matrix circuit for application to the address evaluator 610 of FIG. 19.

In addition, the output signal $\overline{A2}$ indicating that the second address matrix 694B is not in use may be provided at an output terminal 616B of the address matrix circuit 616. This signal $\overline{A2}$ may be utilized by the address accept circuit 616 of FIG. 19 as is subsequently described in detail in connection with FIG. 25.

5. Address Evaluator

The address evaluator 610 of the sync and decode logic circuit 506 of FIG. 19 is illustrated in greater detail in the functional block diagram of FIG. 24.

With reference now to FIG. 24, the ADS1 and ADS2 address signals from the collective output terminal 616A of the address matrix circuit 616 of FIG. 23 may be applied respectively to one input terminal of a two input terminal "exclusive or" (EXOR) gate 706 and to one input terminal of a two input terminal EXOR gate 708. The DDATA signal from the output terminal 600B of the sync pattern detector 600 of FIG. 20 may be applied to the other input terminals of each of the EXOR gates 706 and 708, to one input terminal of a two input terminal AND gate 710 and to one input terminal of a four input terminal AND gate 712.

The output signals from the EXOR gates 706 and 708 may be applied, respectively, to one input terminal of a two input terminal AND gate 714 and to one input terminal of a three input terminal AND gate 709. The output signals from the AND gates 714 and 709 may be applied, respectively, to one input terminal of a two input terminal OR gate 716 and to the clock input terminal C of a conventional error counter 711 such as a two stage binary counter. The output signal from the OR gate 716 may be applied to one input terminal of a three input terminal AND gate 718 and the output signal from the AND gate 718 may be applied to the clock input terminal C of a suitable conventional error counter 720 such as a two stage binary counter.

The Q1 output signal from the true output terminal of the first stage of the error counter 720 may be applied to one input terminal of a two input terminal AND gate 722 and to one input terminal of a two input terminal OR gate 724. The Q2 output signal from the true output terminal of the second stage of the error counter 720 may be applied to the other input terminal AND gate 722 and to the other input terminal of the OR gate 724 and the output signal ERR1 from the OR gate 724 may be provided at the output terminal 610B of the address evaluator 610 for application to the up/-down counter circuit 604 of FIG. 21. The output signal from the AND gate 722 may be applied through an inverter 726 to an input terminal of the AND gate 718 and through another inverter 728 to the collective output terminal 610A as the $\overline{ERR3A}$ address error signal.

The Q1 and Q2 output signals from the true output terminals of the respective first and second stages of the error counter 711 may be applied to the respective input terminals of a two input terminal AND gate 713.

The output signal ERR3B from the AND gate 713 may be applied through an inverter 715 to an input terminal of the AND gate 709 and through an inverter 717 to the collective output terminal 610A of the address evaluator 610 as the $\overline{\text{ERR3B}}$ address error signal for application to the address accept circuit 614 of FIG. 19.

The SYNC signal from the collective output terminal 604B of the up/down counter circuit 604 of FIGS. 19 and 21 may be applied to the other input terminal of the AND gate 714, to a second input terminal of the AND gate 712 and to one input terminal of a four input terminal AND gate 730. The $\overline{\text{SYNC}}$ signal from the collective terminal 604B may be applied to the other input terminal of the AND gate 710 and to the reset input terminal R of a conventional bistable multivibrator or flip-flop 732. The output signal from the AND gate 710 may be applied to the other input terminal of the OR gate 716.

The CL32 and CL36 framing signals from the collective output terminal 608A of the matrix address generator 608 of FIGS. 19 and 22 may be applied, respectively, to one input terminal of a two input terminal AND gate 734 and to one input terminal of a two input terminal AND gate 736. The CL32 framing signal may also be applied to an input terminal of the AND gate 730 from the terminal 608A of the matrix address generator 608 of FIG. 22.

With continued reference to FIG. 24, the output signal from the AND gate 736 may be applied to one input terminal of a three input terminal OR gate 738 and the output signal from the AND gate 734 may be applied to a second input terminal of the OR gate 738. The output signal from the OR gate 738 may be applied to the reset input terminals R of the error counters 711 and 720 and to one input terminal of a two input terminal AND gate 740. The output signal from the AND gate 740 may be applied to the reset input terminal R of a conventional three stage counter 742 and the output signals from the false output terminal of the first stage and the true output terminals of the second and third stages of the counter 742 may each be applied to an input terminal of a three input terminal of an AND gate 744. The output signal from the AND gate 744 may be applied to an input terminal of the AND gate 730 and through an inverter 746 to an input terminal of the AND gate 712, the output signal from which may be applied to the clock input terminal C of the counter 742. The output signal from the AND gate 730 may be applied to the set input terminal S of the flip-flop 732 and the G and $\overline{\text{G}}$ output signals from the true and false output terminals, respectively, of the flip-flop 732 may be provided at the collective output terminal 610C of the address evaluator 610 for application to the up/down counter circuit 604 of FIG. 21 and the receiver on/off logic circuit 606 of FIG. 19. The $\overline{\text{G}}$ signal may also be applied to the second input terminal of the AND gate 740 in FIG. 24.

The CL1 clock signal from the collective input terminal 505 of the sync and decode logic circuit 506 of FIG. 19 may be applied to an input terminal of the AND gate 730 and the CL2 clock signal from the terminal 505 may be applied to one input terminal of each of the AND gates 709, 712, and 718. The CL4 clock signal from the input terminal 505 may be applied to one input terminal of each of the AND gates 734 and 736. The $\overline{\text{RCV}}$ signal from the collective output terminal 606A of the receiver on/off logic circuit 606 of FIGS. 19 and 28 may be applied to the third input terminal of the OR gate 738.

In operation and with continued reference to FIG. 24, the ADS1 and ADS2 address signals from the address matrix 616 are serially applied to the EXOR gates 706 and 708 for evaluation with respect to the delayed data signal DDATA from the sync pattern detector 600. The signal level of each bit of the DDATA signal is compared with the signal level of the corresponding bit of the locally generated address signals ADS1 and ADS2 and each time a difference in signal level exists between the bits of the DDATA signal and the locally generated address signals ADS1 and ADS2, the output signal from the EXOR gates 706 and 708 associated therewith assume a high signal level.

If the SYNC signal is at a high signal level indicating that the up/down counter circuit 604 has successfully counted to three, i.e., has acquired sync, during the sync acquisition portion of the DDATA signal, the output signal from the EXOR gate 706 is applied through the OR gate 716 to the AND gate 718. The output signal from the EXOR gate 708 is applied to the AND gate 709 irrespective of the condition of the up/down counter circuit 604.

As long as the count in the error counters 711 and 720 is less than three, the AND gates 709 and 718 are enabled and the error signals generated by the EXOR gates 706 and 708 are clocked through the AND gates 718 and 709 respectively by the CL2 clock signal and these error signals are counted by the error counters 720 and 711 respectively. If the count in the error counters 711 and 720 reaches three, the output signals from the AND gates 713 and 722 assume a high signal level inhibiting the AND gates 709 and 718 and the $\overline{\text{ERR3B}}$ and $\overline{\text{ERR3A}}$ signals assume low signal levels indicating that three or more differences exist between the received and locally generated addresses. The $\overline{\text{ERR3A}}$ and $\overline{\text{ERR3B}}$ signals are checked by the address accept circuit 614 of FIG. 19 at the end of each address portion of a message word to determine whether or not an address assigned to the particular receiver has been successively evaluated as will subsequently be described in greater detail.

The Q1 and Q2 output signals from the error counter 720 are also applied to the OR gate 724. If, during the initial sync acquisition portion of the message word, the $\overline{\text{SYNC}}$ signal is at a high signal level indicating that the up/down counter circuit 604 of FIG. 21 has not yet successively reached a count of three, the DDATA signal is applied through the AND gate 710, the OR gate 716 and the AND gate 718 to the error counter 720. The error counter 720 is reset immediately after receipt of the first sync acquisition or SA pattern and thereafter counts the number of ONE's in the 32 bit 0's portion of the sync acquisition pattern. If one or more ONE's are counted in this portion of the sync acquisition signal, the ERR1 signal from the OR gate 724 assumes a high signal level and the count in the up/down counter 604 is decremented by a count of one as was previously described.

The DDATA signal is also applied through the AND gate 712 to the three stage counter 742. The three stage counter 742 counts the number of ONE's in the portions of the DDATA signal intermediate the sync acquisition and sync maintenance patterns SA and SB and, when a count of six is reached, the output signal from the AND gate 744 assumes a high signal level indicating that the first address portion of the DDATA signal has been received. Thereafter, the sync maintenance portions SB of the incoming data signal are checked against a locally generated sync maintenance signal assigned to the particular receiver (the last four bits of the ADS1 locally generated address signal) and the ERR1 signal thereafter indicates, by a high and low signal level respectively, the successful and unsuccessful decoding of the sync maintenance portion of the incoming SPDATA signal.

As was previously described in connection with FIG. 3, the incoming signal preferably comprises a binary data stream of the following pattern:

$S_A$ 32 0's $S_A$ 32 0's $S_A$ 32 O's $S_A$ $M_1$ $S_B$ $M_2$ $S_B$ $M_3$ . . . $S_B$ $M_{30}$

Where $S_A$ = 1101 or any other suitable four bit pattern;

32 0's = 32 consecutive ZERO's;

$S_B$ = any four bit pattern; and, $M_1$, $M_2$, $M_3$ - - $M_{30}$ any 32 bit pattern except all zeros if the pattern is a 31, 16, 5 BCH code with even parity.

The significance of counting binary ONE's in the data stream after sync is achieved is this: Sync can be achieved at the end of the second, third or fourth $S_A$ pattern depending upon the data stream error rate. Counting of ONE's in the 32 bit intervals allows determination of the location of signals in the data stream. This is possible since the 32 0's pattern contains no ONE's and all M patterns ($M_1$, $M_2$, $M_3$ – $M_{32}$) contain at least eight binary ONE's. This condition is guaranteed by the use of the BCH (Bose-Chaudhuri) code with even parity.

Note that the overall data stream consists of alternating 4 bit and 32 bit words and that the 4 bit words are always used for synchronization. The first three and only the first three 32 bit words are used for synchronization. The other thirty of the 32 bit words ($M_1$, $M_2$, etc.) are used for addresses. The technique is not, however, constrained to the use of these exact patterns or sequences.

6. Address Accept Circuit

The address accept circuit 614 of the sync and decode logic circuit 506 of FIG. 19 is illustrated in greater detail in the functional block diagram of FIG. 25.

With reference now to FIG. 25, the ERR3A and ERR3B output signals from the output terminal 610A of the address evaluator 610 of FIGS. 19 and 24 may be applied, respectively, to one input terminal of a four input terminal AND gate 750 and to a four input terminal AND gate 752. The CL32 framing signal from the output terminal 608A of the matrix address generator 608 of FIGS. 19 and 22 may be applied to a second input terminal of the AND gate 750 and a second input terminal of the AND gate 752. The SYNC signal from the output terminal 604B of the up/down counter circuit 604 of FIGS. 19 and 21 may be applied to one input terminal of each of the AND gates 750 and 752 and the CL3 clock signal from the input terminal 505 of the sync and decode logic circuit 506 of FIG. 19 may be applied to a fourth input terminal of each of the AND gates 750 and 752 and to one input terminal of a two input terminal AND gate 754.

The output signal from the AND gate 750 may be applied to the set input terminal S of a suitable conventional bistable multivibrator or flip-flop 756 and the output signal from the AND gate 752 may be applied to the set input terminal S of a bistable multivibrator or flip-flop 758. The output signal from the true output terminal Q of the flip-flop 756 may be applied to one input terminal of a two input terminal AND gate 760 and the output signal from the true output terminal Q of the flip-flop 758 may be applied to one input terminal of a two input terminal AND gate 762. The "address No. 1 accept" or AD1AC output signal from the AND gate 760 and the "address No. 2 accept" or AD2AC output signal from the AND gate 762 may be applied to a collective output terminal 614A for application to the page indicator 602 of FIG. 19.

The RCV signal from the output terminal 606A of the receiver on/off logic circuit 606 of FIGS. 19 and 28 may be applied to one input terminal of a three input terminal AND gate 764 and a one input terminal of a three input terminal AND gate 766. The $\overline{SYNC}$ signal from the collective output terminal 604A of the up/-down counter circuit 604 of FIGS. 19 and 21 may be applied to another input terminal each of the AND gates 764 and 766. The FF6 signal from the collective output terminal 606C of the receiver on/off logic circuit 606 of FIG. 19 may be applied to the third input terminal of each of the AND gates 764 and 766.

With continued reference to FIG. 25, the FF8 signal may be applied via the collective output terminal 606C of the receiver on/off logic circuit 606 of FIG. 19 to the other input terminal of the AND gate 754 and to one input terminal of a three input terminal AND gate 768. The $\overline{A2}$ output signal from the address matrix circuit 616 of FIG. 23 may be applied via the input terminal 616B to one input terminal of a three input terminal AND gate 770 and the CL2 and CL4 clock signals may be applied from the timing recovery circuit of FIG. 18 via the collective input terminal 505 to the AND gates 768 and 770 respectively. The R9 signal from the output terminal 608B of the matrix address generator 608 of FIG. 22 may be applied to the third input terminal of the AND gate 770.

The output signal from the AND gate 764 may be applied to one input terminal of a three input terminal OR gate 772 and the output signal from the AND gate 754 may be applied to the second input terminal of the OR gate 772 and to an output terminal 614B of the address accept circuit 614 as the "indicator reset" or IRST output signal. The output signal from the OR gate 772 may be applied to the reset input terminal R of the flip-flop 756 and the output signal from the false output terminal $\overline{Q}$ of the flip-flop 756 may be applied to the third input terminal of the AND gate 768.

The output signals from the AND gates 766, 768 and 770 may each be applied to one input terminal of a four input terminal OR gate 774 and the output signal from the OR gate 774 may be applied to the reset input terminal R of the flip-flop 758. The POR output signal from the output terminal 620A of the power on reset circuit 620 of FIG. 19 may be applied to one input terminal of each of the OR gates 772 and 774 and the "address transfer" or TRANS signal may be applied from the receiver on/off logic circuit 606 of FIG. 19 via the terminal 606C to the other input terminal of each of the AND gates 760 and 762.

In operation and with continued reference to FIG. 25, the address error signals $\overline{ERR3A}$ and $\overline{ERR3B}$ from the address evaluator 610 of FIG. 24 are inspected by the AND gates 750 and 752 at the end of each address portion of the incoming data signal DDATA, i.e., when the framing signal CL32 assumes a high signal level and when the up/down counter circuit 604 has reached the count of three indicating an "in sync" condition. If either of the address error signals $\overline{ERR3A}$ or $\overline{ERR3B}$ is at a high signal level indicating that less than three errors existed between the locally generated and received address signal, the output signal from the corresponding one of the AND gates 750 and 752 assumes a high signal level for the duration of the CL3 clock pulse thereby setting the associated flip-flop 756 or 758.

The address transfer or TRANS signal from the receiver on/off logic circuit 606 of FIG. 19 assumes a high signal level at the end of each time slot in which the incoming data signal is evaluated. When the TRANS signal assumes a high signal level, and if one of the flip-flops 756 or 758 has been set, the corresponding one of the AD1AC or AD2AC output signals from the AND gates 760 and 762 assumes a high signal level indicating that one of the addresses assigned to the receiver was successfully decoded during the time slot. This high signal level signal is applied to the page indicator 602 of FIG. 19 to initiate an audible alarm indicating that one or the other of the addresses assigned to the receiver has been received and successfully evaluated.

The "power on reset" or POR signal from the power on reset circuit 620 of FIG. 19 initially resets the flip-flops 756 and 758 when the receiver is energized. Thereafter, if the bit error rate of the incoming data signal SPDATA becomes excessive after the first address portion of the data signal has been received, i.e., if the $\overline{SYNC}$ signal assumes a high signal level, the output signals from the AND gates 764 and 766 assume high signal levels and reset the flip-flops 756 and 758, respectively, through the OR gates 772 and 774. Thus the indication of a page by the page indicator 602 of FIG. 19 is prevented when the bit error rate of the incoming data signal exceeds a predetermined level at any time during the decoding of address signals in a particular time slot.

The FF8 and CL3 signals applied respectively from the receiver on/off logic circuit 606 of FIG. 19 and the timing recovery circuit of FIG. 18 to the AND gates 754 and 768 ordinarily reset both of the flip-flops 756 and 758 at the beginning of each new time slot or minor data frame. However, if both of the addresses assigned to a particular receiver are received and successfully evaluated during the same time slot, the output signal from the false output terminal of the flip-flop 756 inhibits the AND gate 768 preventing the flip-flop 758 from being reset until both the addresses have been accepted and have initiated separate page indications as will hereinafter be described in greater detail in connection with FIG. 26.

7. Page Indicator

The page indicator 602 of the sync and decode logic circuit 506 of FIG. 19 is illustrated in greater detail in the functional block diagram of FIG. 26. With reference now to FIG. 26, the two "address accept" or AD1AC and AD2AC signals from the output terminal 614A of the address accept circuit 614 of FIGS. 19 and 25 may be applied, respectively, to the set input terminals S of the bistable multivibrators or flip-flops 776 and 778. The output signal from the true output terminal Q of the flip-flop 776 may be applied to one input terminal of a two input terminal AND gate 780 and the output signal from the true output terminal Q of the flip-flop 778 may be applied to one input terminal of a three input terminal AND gate 782. The output signals from the AND gates 780 and 782 may be applied to two input terminals of a three input terminal OR gate 784 and the output signal from the OR gate 784 may be applied to one input terminal of a two input terminal AND gate 786. The output signal from the AND gate 786 may be applied through an inverter 788 to a suitable conventional electromagnetic transducer 790.

The $\overline{RCV}$ signal from the output terminal 606A of the receiver on/off logic circuit 606 of FIG. 19 may be applied to the second input terminal of the AND gate 780 and to an input terminal of the AND gate 782. A Y3 timing signal from the output terminal 612B of the timing signal generator 612 of FIGS. 19 and 27 may be applied to an input terminal of the AND gate 782 and the Z1 timing signal from the collective terminal 612B of the timing signal generator 612 may be applied to the reset input terminal R of a bistable multivibrator or flip-flop 792.

The "power on reset" or POR signal from the output terminal 620A of the power on reset circuit 620 of FIG. 19 may be applied to one input terminal of a three input terminal OR gate 794 and to the set input terminal S of the flip-flop 792. The "indicator reset" or IRST signal from the output terminal 614B of the address accept circuit 614 of FIG. 25 may be applied to a second input terminal of the OR gate 794 and the output signal from the OR gate 794 may be applied to the reset input terminals R of the flip-flops 776 and 778.

The output signal from the true output terminal Q of the flip-flop 792 may be applied to one input terminal of a two input terminal AND gate 796 and the output signal from the false output terminal $\overline{Q}$ of the flip-flop 792 may be applied via an output terminal 602A of the page indicator to the receiver on/off logic circuit 606 of FIG. 19 as the $\overline{FF7}$ signal. The "battery bad" or BBAD output signal from the output terminal 618A of the battery test circuit 618 of FIG. 19 may be applied through an inverter 798 to the other input terminal of the AND gate 796 and the output signal from the AND gate 796 may be applied to the third input terminal of the OR gate 784.

With continued reference to FIG. 26, a manual reset switch 800 may be connected between ground and the input terminal of a conventional inverter 802 through a resistor 804 in parallel with a capacitor 806. The input terminal of the inverter 802 may also be connected to a source of positive d.c. potential through a resistor 808. The output signal from the inverter 802 may be applied to the third input terminal of the OR gate 794.

In operation, the AD1AC and AD2AC signals are transferred to the page indicator 602 at the end of a successfully received time slot from the address accept circuit 614 in FIG. 25 and are stored by the flip-flops 776 and 778. If both addresses assigned to a receiver are received during the same time slot, the address accept signals AD1AC and AD2AC are transferred at different times as was previously described to ensure an indication to the paged subscriber of the receipt of both address signals by the portable receiver.

When the AD1AC signal sets the flip-flop 776, when the AND gate 780 is enabled, and when the receiver is turned off at the end of the time slot, i.e., the $\overline{RCV}$ signal assumes a high signal level, the output signal from the AND gate 780 assumes a high signal level enabling the AND gate 786 through the OR gate 784 and allowing the steady tone BUZZ signal from the timing recovery circuit of FIG. 18 to be applied through the inverter 788 to the electromagnetic transducer 790.

When the flip-flop 778 is set by the AD2AC signal, the AND gate 782 is enabled. When the receiver is turned off at the end of the time slot, the Y3 signal is gated through the AND gate 782 providing a series of pulses at the output terminal thereof at a repetition rate of approximately 4.16 hertz. This series of pulses at the output terminal of the AND gate 782 is applied to the AND gate 786 through the OR gate 784 and gates a chopped BUZZ signal through the AND gate 786 and the inverter 788 to the transducer 790. Thus, a steady audible tone from the transducer 790 indicates that the first address assigned to the receiver has been received, and a chopped or modulated tone indicates that the second address has been received.

In addition, when receiver power is initially turned on, the flip-flop 792 is set by the POR signal from the power on reset circuit 620 of FIG. 19 to be reset approximately 0.96 seconds later by the Z1 signal from the timing signal generator 612 of FIG. 19. During this time, the battery is checked and if good, i.e., if the BBAD signal is at a low signal level, the output signal from the AND gate 796 assumes a high signal level gating the BUZZ signal through the AND gate 786 to the transducer 790 for approximately 1 second.

When an address has been received and successfully decoded and a tone is provided by the transducer 790, the subscriber may manually reset the flip-flops 776 and 778 to deenergize the transducer 790 by depressing the manual reset switch 800 and momentarily grounding the input terminal of the inverter 802. In this manner, a positive pulse is generated at the output terminal of the inverter 802 and is applied through the OR gate 794 to the reset input terminals of both the flip-flops 776 and 778.

8. Timing Signal Generator

The timing signal generator 612 of the sync and decode logic circuit 506 of FIG. 19 is illustrated in greater detail in the functional block diagram of FIG. 27.

Referring now to FIG. 27, the CL36 framing signal from terminal 608A of the matrix address generator 608 of FIG. 22 which occurs at the beginning of each sync acquisition and sync maintenance pattern when the receiver is properly synchronized may be applied to the clock input terminal C of a suitable conventional six stage binary counter 810. The Y1–Y5 output signals from the true output terminals of the first through fifth stages, respectively, of the counter 810 may be provided at a collective output terminal 612A of the timing signal generator 612 for application to the receiver on/-off logic circuit 606 of FIG. 19. The Y3 signal from the true output terminal of the third stage of the binary counter 810 may be provided at the collective output terminal 612B for application to the page indicator 602 of FIG. 26.

The Y5 output signal from the true output terminal from the fifth stage of the binary counter 810 may be applied through an inverter 811 to the clock input terminal C of a suitable conventional divide by eight counter 812. The Z1, Z3, and Z3 output signals from the true output terminals of the first through third stages of the counter 812 may be applied to three input terminals of a four input terminal AND gate 814. The output signal S6.7 from the AND gate 814 may be applied via the collective output terminal 612A to the receiver on/off logic circuit 606 of FIG. 19 and the Z1 signal from the first stage of the counter 812 may be provided at the collective output terminal 612B for application to the page indicator 602 of FIG. 26.

The POR signal from the output terminal 620A of the power on reset circuit 620 of FIG. 19 may be applied to one input terminal of a three input terminal OR gate 816 and the FF21 and ADREC signals from the output terminal 606B of the receiver on/off logic circuit 606 of FIG. 19 may be applied to the other two input terminals of the OR gate 816. The output signal from the OR gate 816 may be applied to the reset input terminals R of each of the counters 810 and 812. The CL2 clock signal from the collective input terminal 505 of the sync and decode logic circuit 506 of FIG. 19 may be applied to the fourth input terminal of the AND gate 814.

In operation and with continued reference to FIG. 27, both the counter 810 and the counter 812 are reset initially by the "power on reset" signal POR from the power on reset circuit 620 of FIG. 19, by the "address received" signal ADREC from the receiver on/off logic circuit of FIG. 19 and by the "timing reset" signal FF21 from the receiver on/off logic circuit of FIG. 19. The counter 810 is thus reset after the sync acquisition portion of any incoming data signal has been received and is thereafter clocked by the CL36 framing signal from the timing recovery circuit of FIG. 18 at the beginning of each sync acquisition and sync maintenance signal SA and SB. The counter 810, in effect, thus counts the number of address signals received.

The Y3 signal from the counter 810 provides the chopping signal for the second address tone in the page indicator 602 of FIG. 26 and the Y1–Y5 signals are applied to the receiver on/off logic circuit 606 of FIG. 28 to provide the 29 DEC and 30 DEC signals which indicate that the 29th and 30th addresses, respectively, have been received as will hereinafter be described in greater detail with FIG. 28.

The $\overline{\text{Y5}}$ signal from the counter 810 is utilized to clock the counter 812. The output signals from the divide-by-eight counter are decoded by the AND gate 814 to provide the 6.72 second "receiver off" pulse S6.7 which is utilized to turn the receiver off after the DDATA signal in a selected time slot has been successfully decoded. The Z1 signal from the divide-by-eight counter 812 also provides the 0.96 second gate for the battery check tone circuit in the page indicator 602 as was previously described in connection with FIG. 26.

9. Receiver On/Off Logic Circuit

The receiver on/off logic circuit 606 of the sync and decode logic circuit 506 of FIG. 19 is illustrated in greater detail in FIG. 28. Referring now to FIG. 28, the G signal indicating that a first address has been received is applied from the output terminal 610C of the address evaluator 610 of FIG. 24 to the clock input terminal C of a bistable multivibrator or flip-flop 818. The set steering terminal D of the flip-flop 818 is connected to a positive d.c. potential and the CL3 signal from the input terminal 505 of the sync and decode logic circuit may be applied to the reset input terminal R of the flip-flop 818.

The "address received" or ADREC output signal from the true output terminal Q of the flip-flop 818 may be applied to the set input terminal S of a bistable multivibrator or flip-flop 820 and to the collective output terminal 606B of the receiver on/off logic circuit 606 for application to the timing signal generator 612 of FIG. 27. The FF6 output signal from the true output terminal of the flip-flop 820 indicates that the receiver is in sync and that a first address has been received. This FF6 signal may be applied to one input terminal of a three input terminal AND gate 822 and via the collective output terminal 606C of the receiver on/off logic circuit 606 to the address accept circuit 614 of FIG. 25. The "transfer" or TRANS output signal from the AND gate 822 may be applied to the set input terminal S of a bistable multivibrator or flip-flop 824 and via the collective output terminal 606C to the address accept circuit 614 of FIG. 25.

The output signal from the true output terminal Q of the flip-flop 824 may be applied to one input terminal of a three input terminal AND gate 826 and the output signal from the AND gate 826 may be applied to the set input terminal S of a bistable multivibrator or flip flop 828. The "receiver on" or RCV output signal from the false output terminal $\overline{Q}$ of the flip flop 828 may be provided at the collective output terminal 606A.

The RCV signal may also be applied to one input terminal of a two input terminal AND gate 830 and the output signal from the AND gate 830 may be applied to the clock input terminal C of a bistable multivibrator or flip-flop 832 and through an inverter 834 to both the clock input terminal C of a bistable multivibrator or flip flop 836 and to the collective output terminal 606A as the $\overline{RCV}$ or "receiver off" output signal.

The set steering input terminals D of the flip-flops 832 and 836 may be connected to a positive d.c. potential and the set input terminals S of the flip-flops 832 and 836 may be grounded. The output signals FF8 and FF21 from the true output terminals Q of the flip-flops 832 and 836, respectively, may be applied via the respective collective output terminals 606C and 606B to the address accept circuit 614 of FIG. 25 and the timing signal generator 612 of FIG. 27. The CL4 clock signal from the collective output terminal 505 of the timing recovery circuit 504 of FIG. 17 may be applied to the reset input terminals R of each of the flip-flops 832 and 836.

The Y1 timing signal from the output terminal 612A of the timing signal generator 612 of FIG. 27 may be applied to one input terminal of a five input terminal AND gate 838 and through an inverter 840 to one input terminal of a five input termnal AND gate 842. The Y2 timing signal from the collective terminal 612A of the timing signal generator 612 may be applied to a second input terminal of an AND gate 842 and through an inverter 844 to a second input terminal of the AND gate 838. The Y3–Y5 signals also from the collective terminal 612A of the timing signal generator 612 may be applied to the remaining input terminals of the AND gates 838 and 842.

The "decoded 29 addresses" or 29DEC output signal from the AND gate 838 may be applied to an input terminal of the AND gate 822 and the "decoded 30 addresses" or 30DEC output signal from the AND gate 842 may be applied to an input terminal of the AND gate 826. The CL2 clock signal from the collective output terminal 505 of the timing recovery circuit of FIG. 18 may be applied to an input terminal of each of the AND gates 822 and 826.

The CL1 clock signal also from the collective input terminal 505 may be applied to one input terminal of a two input terminal AND gate 846 and the output signal from the AND gate 846 may be applied to the reset input terminal R of the flip-flop 820. The $\overline{SYNC}$ signal from the output terminal 604B of the up/down counter circuit 604 of FIG. 21 may be applied to the other input terminal of the AND gate 846.

The POR signal from the output terminal 620A of the power on reset circuit 620 of FIG. 19 may be applied to one input terminal of a two input terminal OR gate 848 and the output signal from the OR gate 848 may be applied to the reset input terminal R of each of the flip-flops 828 and 824. The $\overline{FF7}$ signal, a 0.96 second negative going pulse during the time the battery check is being made, may be applied from the output terminal 602A of the page indicator 602 of FIG. 26 to the second input terminal of the AND gate 830.

In operation and with continued reference to FIG. 28, the G signal from the address evaluator 610 of FIG. 24 sets the flip-flop 818 when a first address signal has been received. The "address received" or ADREC signal sets the flip-flop 820 and the FF6 signal from the flip-flop 820 enables the AND gate 822 for the remainder of the time slot unless the flip-flop 820 is reset by the loss of sync as indicated by the $\overline{SYNC}$ signal.

When the AND gate 838 decodes a count of 29 indicating that all of the addresses have been received, the transfer signal TRANS assumes a high signal level and sets the flip-flop 824 which in turn enables the AND gate 826. When the AND gate 842 decodes a count of 30 indicating that any successfully decoded address signals have been transferred to the page indicator circuit 602 as was previously described, the output signal from the AND gate 826 assumes a high signal level setting the flip-flop 828 to provide a high signal level "receiver off" signal $\overline{RCV}$ through the AND gate 830 and the inverter 834.

The $\overline{RCV}$ signal remains at the high signal level until the S6.7 signal from the timing signal generator 612 of FIG. 27 resets the flip-flop 828 approximately 6.72 second later. The RCV signal is, of course, at a low signal level during this 6.72 second interval and may be utilized to inhibit the application of power to the receiver circuit 502 of FIG. 17 in any suitable conventional manner during this 6.72 second interval.

The $\overline{RCV}$ signal sets the flip-flop 836 when the receiver is turned off, i.e., when the $\overline{RCV}$ signal assumes a high signal level. Approximately 6.72 seconds later, the RCV signal assumes a high signal level. Approximately 6.72 seconds later, the RCV signal sets the flip-flop 832. Shortly after being set, the flip-flops 836 and 832 are reset by the CL4 clock signal and, thus, a short duration pulse FF21 is provided to the timing signal generator 612 of FIG. 27 as a reset signal when the receiver is first turned off. A short duration pulse (the FF8 signal) is also provided approximately 6.72 seconds later to the address accept circuit 614 of FIG. 25 to generate the "page indicator reset" signal IRST. The $\overline{FF7}$ signal delays the $\overline{RCV}$ signal until after the 0.96 second battery check period, thus delaying the energization of the receiver. This delay prevents modulation of the VCO in the timing recovery circuit 504 of FIG. 18 by either signal during the battery check.

VIII. DIGITAL/TONE SYSTEM COMPATABILITY

The compatability of the digital paging system described above with a conventional tone system is illustrated in the block diagrams of FIGS. 29 and 30. With reference now to FIG. 29, the incoming dialing signals intended for the basic digital system earlier described may be received at the central station over one or more input trunk lines directly connected by a collective input terminal 900 to a plurality of input registers 902. The input registers may be selectively scanned under control of a data processor 904 as earlier described to provide the digital message word stored in a message queue 906 associated therewith. These message words from the queue 906 are selectively fed under control of the data processor 904 to a transmitter control unit 908 of the type earlier described in connection with FIGS. 5 and 9. The output signals from the transmitter control unit 908 may be selectively provided over a plurality of voice quality telephone lines each connected to one or more of the transmitter units 910 spaced throughout the paging area.

Similarly, the subscriber designating signals intended for a conventional tone system may be received via one or more trunk lines and an input terminal 912 and applied therefrom to a second series of input registers 914 at the central station. Paging addresses from this second set of input registers 914 may be applied under the control of the same data processor 904 to a second message queue 916 for formation of the conventional message word. The message word from the second queue 916 may thereafter be applied under the control of the data processor 904 to a second transmitter control unit 918 and the output signals therefrom applied over the same voice quality telephone lines to the same plurality of transmitters 910 spaced throughout the paging area.

The operation of the two systems are readily distinguishable in that the basic digital system earlier described provides via the transmitter control unit 908 the same message word from the queue 906 sequentially on the plurality of output terminals 920 thereof in different time slots. In contrast, the simultaneous application of the message word from the tone system queue 916 to the same output terminals 920 of the transmitter control unit 918 may be in one time slot, not necessarily of the same duration as the time slots used for the digital system. In this manner, the transmitters of the transmitter units 910 may sequentially receive the same digital message word from the digital system to effect the time slot operation earlier described in connection with FIG. 4. At the termination of the transmission of the digital message word illustrated in FIG. 3 by each of the transmitter units 910, the system may revert under the control of the data processor 904 to tone system operation at which time the tone message word may be sent to the same transmitter units 920 for simultaneous broadcast in one time slot to the portable receivers of the tone system within the same paging area. At the end of the simultaneous broadcasting of the tone system message word, the system may again revert under the control of the data processor 904 to digital system operation.

It is to be understood, of course, that the allocation of time between the digital and tone systems may be made by the data processor 904 on a need basis through the scanning by the data processor 904 of the input registers 904 and 914. While various subscriber digital address codes may be utilized to distinguish between these systems, the use of different groups of input registers connected respectively to different groups of telephone trunk lines provides a ready means of differentiating between the systems on the basis of the telephone NNX Codes or subscriber telephone numbers assigned by the telephone company to the central station.

Alternative to the use of the same transmitters by both the digital and tone systems and with continued reference to FIG. 29, the output signals from the transmitter control unit 918 of the tone system may be applied as shown in phantom in FIG. 29 to a different group of transmitter units 922 spaced throughout the same paging area. These transmitter units 922 may be physically located at the same transmitter sites without interference between the systems since the temporal operation of the two systems is mutually exclusive under the control of the data processor 904.

When the same transmitter units are used for both digital and tone systems, the mutually exclusiveness of the systems may be accomplished by the utilization of different sync acquisition codes. For example and with reference to FIG. 30, the message word applied to an input terminal 920 of one of the transmitter units 910 of FIG. 29 may be applied in parallel to two different sync acquisition decoder units 924 and 926. As was described in greater detail in connection with the transmitter control units of FIGS. 11 and 12, the decoding of the sync acquisition code SA is operable through a keying circuit 928 to provide a KEY signal to the keying input terminal 925 of the transmitter 930 through an OR gate 938. The entire message word received on the input terminal 920 may be passed through the decoder 924 and stored in a buffer storage unit 932. The entire message word may subsequently be applied therefrom to the pulse modulation input terminal 934 of the transmitter 930. The application of the KEY signal is timed to effect the transmission of the entire message word.

Should the sync acquisition code SA of the message word applied to the input terminal 920 fail to properly decode in the decoder 924, the KEY signal will not be generated by the keying circuit 928 and the transmitter 930 will not broadcast the message word notwithstanding the application thereof to the pulse modulation input terminal 934 of the transmitter 930 from the buffer storage unit 932.

If the transmitters 930 are to be utilized in the tone system, the sync acquisition code SA of the message word will not be recognized by any of the decoders 924 at the transmitter units 910. However, the second sync acquisition decoder 926 at all of the transmitter sites will recognize the sync acquisition code SA as indicating tone system operation and will apply a keying signal to a timing circuit 936 where the delay equalization necessary for simultaneous transmission by the various transmitters 930 can be effected. After an appropriate delay in the timing circuit 936, a KEY signal will be generated for application to the keying input terminal 925 of the transmitter 930 through the OR gate 938.

Also under control of the timing circuit 936, the message word received on the input terminal 920 may be applied through the sync acquisition decoder 926 into a buffer storage unit 940. When read out of the buffer storage unit 940, the message word may be encoded in a conventional tone encoder 942 to provide the tone modulation signal for application to the voice modulation input terminal 944 of the transmitter 930. In tone system operation, the entire message word will thus be simultaneously transmitted from each of the transmitters 930 within the paging area.

The transmitter control units 946 and 948 respectively assocated with the digital and tone systems may of course be separately connected to a common central station as suggested in FIG. 29 and/or the transmitter units 910 and 922 located at the same or different sites in the paging area.

IX. PLURAL PAGING SERVICE/SINGLE PAGING AREA FLEXIBILITY

The flexibility of the present invention when utilized as a paging system is illustrated in FIGS. 31–33. With reference for example to FIG. 31, a geographic representation of the Los Angeles, Calif. area is illustrated with the location of seven different transmitter sites specified thereon. The propagation patterns of the seven transmitters are illustrated as circles in FIG. 31 with the circles centered on the transmitter site. While it is to be recognized that the propagation patterns of each of the transmitters is a function of the terrain, representation as a circle is adequate for illustrative purposes.

The numerals 1–8 associated with the seven transmitter sites in FIG. 31 correspond to the eight time slots of the basic system earlier described. Note that the transmitter site at Palos Verdes is operative in two time slots in the illustrative system described. This fact, as well as the time slot relationship of the seven transmitters, will be apparent from the following chart:

2 utilizes only the Kellogg Hills transmitter operative in time slot 5. Subscriber Service No. 3 utilizes the transmitters at Palos Verdes, Santiago Park and Verdugo Park respectively in time slots 6–8. As explained in connection with FIG. 32, the overlap in the propagation patterns of the adjacent Kellogg Hills and Santiago Park transmitters presents no interference problem due to the temporal spacing between the broadcasting periods. The system, as illustrated, is thus operative with overlapping propagation patterns of transmitters operating at the same frequency and responsive to two entirely different subscriber services.

It should also be noted above that the Palos Verdes transmitter is operative for Subscriber Service No. 1 in time slot 4 to broadcast one message word to paging subscribers in that area and is again operative for Subscriber Service No. 3 in time slot 6 to broadcast a different message word for reception by an entirely different group of paging receivers within the same area.

False calls within the paging area as a result of the transmission of the paging message word at the same frequency by the same transmitter by different paging services is prevented by the receiver recognition of the different sync acquisition and/or sync maintenance codes SA and SB assigned to the different services as earlier described. Once, for example, a portable receiver in the Palos Verdes area has acquired sync, the receiver will evaluate the addresses within the message word transmitted in the time slot in which sync is acquired. The receiver will thereafter disable itself for approximately seven seconds reenergizing itself to evalu-

| XMTR Site | System No. 1 | System No. 1 | System No. 1 | System No. 1 | System No. 2 | System No. 3 | System No. 3 | System No. 3 |
|---|---|---|---|---|---|---|---|---|
| Van Nuys | XXX | | | | | | | |
| Flint Peak | | XXX | | | | | | |
| Newport Beach | | | XXX | | | | | |
| Palos Verdes | | | | XXX | | *** | | |
| Kellogg Hills | | | | | 000 | | | |
| Santiago Park | | | | | | | *** | |
| Verdugo Park | | | | | | | | *** |

With reference now to FIG. 32, a radio paging system embodiment of the present invention is illustrated as a single subscriber service denominated subscriber service No. 1 with transmitters located respectively at Van Nuys, Flint Peak, Newport Beach and Palos Verdes. In such an illustrative system, the message word described in connection with FIG. 3 is transmitted sequentially from each of the four transmitters in four consecutive 1 second time slots 1–4 in a single 8 second major frame. The overlap in the propagation patterns of the Van Nuys and Flint Peak transmitters does not present interference problems due to the sequencing of the transmitters, i.e. the operation thereof is mutually exclusive.

As was explained in connection with FIG. 4, the number of transmitters in the paging area can be expanded as desired with two or more transmitters broadcasting during each of the four designated time slots. In such an expanded system, the interference problems associated with the conventional systems is avoided by spacing each of the transmitters broadcasting in a single time slot sufficiently to avoid overlap of the propagation patterns of the transmitters.

As illustrated in FIG. 33, four of the seven transmitters sites identified in FIG. 31 are utilized in two additional subscriber services. The Subscriber Service No.

ate the addresses transmitted in the message word in the same time slot in the next major frame. Each of the portable receivers of one subscriber service is thus deenergized during the period in which the Palos Verdes transmitter broadcasts to subscribers in the other subscriber service in the other time slot.

ADVANTAGES AND SCOPE OF THE INVENTION

The method and apparatus of the present invention as embodied in a paging system is readily understood from the above detailed description. In such an embodiment, the present invention avoids the problem of delay equalization associated with simultaneous transmission of the paging signal by plural transmitters in a paging area through the sequencing of the transmitters to broadcast in mutually exclusive time slots.

The compounding of the delay problems in systems employing large numbers of transmitters is also avoided through the spacing of transmitters operating in the same time slot such as to avoid any probability of propagation pattern overlap. Thus the number of transmmitters in a paging area can be readily increased to ensure omission of receiver blind spots without mutual interference between the transmitters. Frequency offset problems are also avoided since each of the transmitters may operate at the same carrier frequency without interference.

Through the utilization of modular units, the paging system described may be readily expanded as the needs thereof change. The system is moreover operable with end-to-end dialing and with NNX Codes. The need for and expense of adapters to interface the paging system with the existing commercially installed telephone equipment and with existing paging systems is also avoided and fail safe operation is a reality.

By the use of standard minicomputers, the system described is operative for control of a plurality of subscriber paging services within a single paging area, for the control of paging systems in different paging areas, and for compatability with existing tone systems.

Through digital techniques, analog squelch problems have been obviated and the physical size of the equipment has been markedly reduced with the portable receiver, for example, reduced to about the size of a pack of cigarettes. The capacity for the system over prior known systems is vastly increased with a 60,000 address capacity in a single channel at a call rate of 3.75 per second and a bit rate of 1,200 bits per second in the voice bandwidth. Single or dual addresses may be assigned to each receiver as desired.

Through the use of a highly redundant Bose-Chaudhuri code and the unique address evaluation technique, the probability of decode with an 8 bit separation distance between immediately adjacent addresses and two or less bit errors for acceptance is 0.996 against the probability of accepting another address of $3 \times 10^{-11}$ for a bit error rate of 0.01. For a bit error rate of 0.001, however, the ratio of acceptance to erroneous acceptance probability is 0.999995 to $3 \times 10^{-17}$.

The probability of obtaining sync within a full second of data, i.e., one major data frame, with a bit error rate of 0.01 is 0.942 as against a false sync probability of $10^{-26}$. At a bit error rate of 0.001, the sync/false sync probability figures are 0.9995 to $10^{-32}$.

The above figures illustrate the effectiveness and reliability of the method and system of the present invention when embodied as a subscriber paging service. The present invention, however, has numerous other applications in data transmission and control of remote apparatus. The present invention may thus be embodied in other specific forms without deparging from the spirit or essential characteristics thereof. The presently disclosed exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A paging system comprising:

a plurality of transmitters spaced at predetermined locations within a paging area;

a master station including means responsive to telephone dialing signals designating an assigned subscriber paging number for generating a digital signal including an address portion representing the designated subscriber and a synchronizing portion;

means for transmitting said generated digital signal from said master station sequentially to each of said transmitters during separate time slots, said transmitters being responsive to the synchronizing portion of said digital signal to transmit said digital signal including said subscriber designating portion and said synchronizing portion as a radio signal; and a plurality of portable receivers each including means for storing a digital address word assigned to the designated subscriber, means for receiving said transmitted digital signal, means for generating clock pulses responsively to said received digital signal, means for selecting one of said separate time slots responsively to the synchronizing portion of said received digital signal, means for evaluating the address portion of said digital signal received in said selected time slot with respect to said stored digital address word responsively to said clock pulses, and means for alerting the designated subscriber in response to the evaluating means.

2. The system of claim 1 wherein said master station includes means for verifying the validity of the subscriber paging number designated by the telephone dialing signals.

3. The system of claim 1 wherein each of said receivers includes means for deenergizing said receiving means for a predetermined period of time of at least substantially one time slot in duration after selecting said one of said time slots.

4. The system of claim 1 wherein each of said plurality of transmitters has a predetermined propagation pattern, the spacing between the transmitters being such that the combined propagation pattern of said transmitters covers said paging area.

5. The system of claim 4 wherein the propagation patterns of adjacent of said transmitters overlap.

6. The system of claim 5 wherein said digital signal is transmitted to said transmitters in accordance with a predetermined sequence, said sequence excluding the transmission of said digital signal from immediately adjacent transmitters during the same time slot.

7. The system of claim 5 wherein said digital signal is transmitted to a plurality of transmitters during each of said time slots, said digital signal being transmitted to immediately adjacent transmitters in different time slots.

8. The system of claim 1 wherein a predetermined plural number of said time slots defines a major frame, said digital signal being transmitted to each of said transmitters in only one time slot during a major frame so that adjacent of said transmitters are not simultaneously transmitting said digital signal.

9. The system of claim 8 wherein a different digital signal including said synchronizing portion and a portion representing a different designated subscriber is transmitted from said master station to said transmitters at least once during successive major frames.

10. The system of claim 9 wherein each of said receivers includes means for deenergizing said receiver for a predetermined period of time between the selected time slot in one major frame and the selected time slot in a successive major frame.

11. The system of claim 10 wherein the time slots are selected in every other major frame.

12. A paging system comprising:

means for transmitting a digital signal including a subscriber designating portion and a synchronizing portion during each of a plurality of separate time slots;

means for receiving said transmitted digital signal; and, means responsive to the synchronizing portion of said digital signal for evaluating the subscriber designating portion of said received digital signal with respect to a stored, digital subscriber designating word during a selected one of said time slots.

13. The system of claim 12 wherein the synchronization portion of said transmitted signal comprises an area code assigned to a predetermined paging area and wherein said evaluating means includes means for evaluating said area code in said received signal with respect to a predetermined area code assigned to said receiving means, and means for selecting said one of said time slots in response to a successful evaluation of said area code in said received signal by said area code evaluating means.

14. The system of claim 12 wherein said subscriber designating portion of said digital signal includes a plurality of serially arranged subscriber address signals each designating a different subscriber.

15. The system of claim 14 wherein said synchronizing portion of said digital signal includes a synchronization acquisition signal preceding said subscriber designating portion and a synchronization maintenance signal intermediate adjacent of said plurality of subscriber address signals.

16. The system of claim 15 wherein said evaluating means comprises:

means for detecting a difference in binary signal level between each binary bit of each of said subscriber address signals and the corresponding binary bit of said stored, digital subscriber designating word and for generating an error signal in response to each such detection; and, means for counting the number of error signals generated.

17. The system of claim 16 including means responsive to said counting means for indicating when the total number of error signals generated is less than a predetermined number.

18. The system of claim 12 wherein said subscriber designating portion of said digital signal includes a plurality of serially arranged subscriber address signals, and wherein a plurality not greater than four of said subscriber address signals designate the same subscriber.

19. The system of claim 18 including means for indicating which of said plurality of same subscriber address signals has been received.

20. The system of claim 12 wherein said transmitting means includes:

a central station for generating said digital signal;

a plurality of transmitters spaced at predetermined locations within a paging area; and, means for selectively applying said generated digital signal from said central station to said transmitters.

21. The system of claim 20 wherein each of said plurality of transmitters has a predetermined propagation pattern, the spacing between the transmitters being such that the combined propagation pattern of said transmitters covers said paging area.

22. The system of claim 21 wherein the propagation patterns of adjacent of said transmitters overlap.

23. The system of claim 22 wherein said digital signal is applied to at least one of said plurality of transmitters during each of said time slots, said digital signal being applied to immediately adjacent of said transmitters in different time slots.

24. The system of claim 20 wherein said generated digital signal is applied to at least one of said plurality of transmitters in a plurality of different time slots.

25. The system of claim 15 wherein the synchronization maintenance signal comprises an area code assigned to a predetermined paging area and wherein said evaluating means includes means for selecting said one of said time slots in response to said area code.

26. A paging system comprising:

a central station;

means remote from said central station for designating thereto a subscriber to be paged;

means at said central station for generating a plural binary bit, digital address signal responsively to said subscriber designating means, and representing the designated subscriber;

means for transmitting said digital address signal in each of a plurality of successive time slots; and, means for receiving said digital address signal including:

means for detecting difference in binary signal level between each bit position of said digital address signal and each corresponding bit position of a stored subscriber address signal and generating an error signal in response to each detected difference;

means for counting the number of error signals generated; and, means for alerting a subscriber in response to a count by said counting means below a predetermined number in a selected one of said time slots.

27. The system of claim 26 wherein said subscriber designating means comprises means for establishing a telephonic connection between said central station and a remote location and means for transmitting a subscriber designation number from said remote location to said master station via said telephonic connection.

28. The system of claim 27 wherein said subscriber designating means includes a plurality of tone generators; and, wherein said central station is responsive to said plurality of tone generators.

29. The system of claim 27 wherein said telephonic connection is established by the first three digits of a seven digit number, and wherein said subscriber designating number is the last four digits of said seven digit number.

30. The system of claim 27 wherein said telephonic connection is established by a seven digit number, and wherein said subscriber designation number includes at least four additional digits.

31. The system of claim 27 wherein said subscriber designating means includes a pulse generator and means for converting pulses to tones for transmission by said transmitting means from said remote location to said master station.

32. A paging system comprising:

means for generating a digital subscriber identifying signal;

means for repetitively transmitting said digital signal during successive time slots including a plurality of spaced transmitters each assigned to transmit during at least one of said time slots in accordance with a sequence which excludes the transmission by adjacent transmitters during the same time slot; and, a plurality of individual receivers for receiving said signal transmitted during at least one of said time slots, each of said receivers including means for deenergizing said receiver during at least some of the remaining time slots.

33. A data transmission system comprising:

means at a central station for successively transmitting a data signal, including a synchronizing portion and an address portion, to each of a plurality of spaced transmitter sites during separate time intervals; and, means at each of said transmitter sites for transmitting a radio signal modulated by said data signal responsively to the recognition of said synchronizing portion.

34. The system of claim 33 wherein said means for transmitting said radio signal includes:

means for generating a transmitter enabling signal in response to said synchronizing portion;

means for delaying said data signal by an amount at least equal in duration to said synchronizing portion; and, means for transmitting said radio signal modulated by said delayed data signal responsively to said enabling signal.

35. The system of claim 33 including means at said central station for receiving data signals over a plurality of identifiable telephone lines, and means for modifying the synchronizing portion of said data signal responsively to the identity of the telephone line over which the data signal is received.

36. A central station for use in a paging system comprising:

means responsive to user initiated telephone dialing signals for establishing a telephonic connection between the central station and a user;

means responsive to subsequent user initiated telephone dialing signals designating a subscriber paging number for generating a digital address signal related to said designated subscriber, said subsequent dialing signals being initiated by the user over said established telephonic connection;

means for temporarily storing a plurality of said generated digital address signals in a waiting queue;

means for generating a digital message word including a plurality of said stored, digital address signals each encoded in accordance with a redundant, plural binary bit code having at least six bit differences between any two adjacent codes; and, means for sequentially and repetitively transmitting said message word from said central station during a plurality of separate time slots.

37. The central station of claim 36 including means for comparing the designated subscriber paging number with a list of stored subscriber paging number to determine the validity thereof.

38. The central station of claim 36 including means for transmitting an audible indication to said user responsively to establishing said telephonic connections.

39. The central station of claim 36 wherein said digital message word generating means includes:

means for encoding said generated digital address signal; and, means for combining said encoded address signal with a synchronizing signal to generate said digital message word.

40. The system of claim 36 wherein said queue is a first-in, first-out queue.

41. The system of claim 36 in which said queue may have priority positions, and wherein the position of a selected digital address signal in said queue is related to the identity of the digital address signal.

42. The system of claim 36 including means for differentiating between the telephone lines through which said telephonic connection is established and, means for modifying said digital message word responsively to said differentiating means.

43. The system of claim 42 wherein said digital message word includes a synchronizing portion; and, wherein said synchronizing portion is modified responsively to said differentiating means.

44. The system of claim 42 including means for selectively modifying the portion of said digital message word representing said address signal in response to said differentiating means.

45. A method of paging a subscriber with a digital signal comprising the steps of:

a. transmitting a digital signal including a subscriber designating portion and a synchronizing portion during each of a plurality of separate time slots;

b. receiving the transmitted digital signal;

c. evaluating the synchronizing portion of the received digital signal; and, d. selecting one of the plurality of time slots for evaluation of the subscriber designating portion of the received digital signal responsively to the evaluation of the synchronizing portion to the digital signal.

46. The method of claim 45 wherein the synchronizing portion of the received digital signal is evaluated in successive time slots until favorably evaluated; and, wherein only the subscriber designating portion received immediately subsequent to the favorably evaluated synchronizing portion is evaluated.

47. The method of claim 46 including the further step of inhibiting receipt of the transmitted digital signal for a predetermined time interval following evaluation of the subscriber designation portion of the received digital signal in one time slot.

48. The method of claim 45 wherein the synchronizing portion of the digital signal comprises an area code assigned to a predetermined paging area and wherein the synchronizing portion of the received signal is evaluated by:

evaluating the area code in the received signal with respect to a predetermined area code; and, generating a distinctive signal responsively to a successful evaluation of the area code in the received signal, the one of the plurality of time slots being selected in response to said distinctive signal.

49. A method of paging a subscriber comprising the steps of:

a. providing a plurality of transmitters spaced throughout an area;

b. transmitting a plurality of subscriber designation signals from one of the plurality of transmitters during a first time slot;
c. transmitting the same plurality of subscriber designation signals from another of the plurality of transmitters in a second time slot; and,
d. receiving the transmitted subscriber designation signals at each of a plurality of portable receivers in at least one time slot.

50. The method of claim 49 wherein the plurality of subscriber designation signals is transmitted by a plurality of nonadjacent transmitters in each of the time slots.

51. The method of claim 50 including the steps of evaluating the subscriber designation signals received in one of the time slots; and,
inhibiting the evaluation of the transmitted subscriber designation signals for at least one time slot in response to the evaluation of the subscriber designation signals in one of the time slots.

52. The method of claim 49 including the steps of evaluating the subscriber designation signals received in one of the time slots; and,
inhibiting the evaluation of the transmitted subscriber designation signals for at least one time slot in response to the evaluation of the subscriber designation signals in one of the time slots.

53. The method of claim 51 wherein the subscriber designation signals are digital.

54. The method of claim 49 wherein the subscriber designation signals are digital.

55. A dual system paging method comprising the steps of:
a. storing a first group of subscriber designation numbers;
b. storing a second group of subscriber designation numbers;
c. transmitting the first group of subscriber designation numbers to a first plurality of remote transmitters for simultaneous broadcast in a first time interval; and,
d. transmitting the second group of subscriber designation numbers to a second plurality of transmitters for broadcast by a selected first one of the second plurality of transmitters in a second time interval and for broadcast by a selected second one of the second plurality of transmitters in a third time interval.

56. The method of claim 55 wherein the second group of subscriber designation numbers are broadcast as binary data from the second plurality of transmitters.

57. The method of claim 56 wherein the first group of subscriber designation numbers are broadcast as tones from the first plurality of transmitters.

58. The method of claim 57 wherein the cumulative propagation patterns of the first and second plurality of transmitters are substantially the same.

59. The method of claim 55 wherein the second group of subscriber designation numbers are broadcast as binary data from the second plurality of transmitters.

60. The method of claim 55 wherein the cumulative propagation patterns of the first and second plurality of transmitters are substantially the same.

61. A method of paging a subscriber comprising the steps of:
a. providing a plurality of transmitters spaced throughout a paging area;
b. generating a digital address signal for each of a plurality of subscribers to be paged;
c. generating a digital paging signal including a plurality of the generated address signals preceded by a synchronization acquisition signal and each separated by a synchronization maintenance signal;
d. selectively transmitting the paging signal from a first group of the plurality of transmitters in a first time interval;
e. selectively transmitting the same paging signal from a second group of the plurality of transmitters in a second time interval, at least some of the transmitters in the first group of transmitters differing from the transmitters in the second group of transmitters; and,
f. receiving at least a portion of the paging signal at each of a plurality of portable receivers.

62. The method of claim 61 wherein all of the transmitters in the first group of transmitters differ from the transmitters in the second group of transmitters.

63. A method of paging a subscriber comprising the steps of:
a. providing a plurality of transmitters spaced throughout an area;
b. receiving at a master station a plurality of subscriber designation signals from a plurality of telephonic connections;
c. selectively transmitting a first group of the plurality of subscriber designation signals from one of the plurality of transmitters during a first time interval, the propagation pattern of the one transmitter defining a first area;
d. selectively transmitting a second group of the plurality of subscriber designation signals from another of the plurality of transmitters in a second time interval, the propagation pattern of the other transmitter defining a second area; and,
e. receiving at least a portion of the transmitted subscriber designation signals at each of a plurality of portable receivers,
the group of transmitters from which a subscriber designation signal is transmitted being selected responsively to the telephonic connection from which that subscriber designation signal is received at the master station.

64. The method of claim 63 wherein the subscriber designation signals are binary in form.

65. The method of claim 63 wherein the first group of the plurality of subscriber designation signals are sequentially transmitted from a plurality of transmitters in the first time interval; and,
wherein the second group of the plurality of subscriber designation signals are sequentially transmitted from a plurality of transmitters in the second time interval.

66. A paging method comprising the steps of:
a. providing a plurality of transmitters spaced at predetermined locations with a paging area;
b. generating at a master station a digital signal including a synchronizing portion and a portion representing a plurality of designated subscribers;
c. transmitting said generated digital signal from said master station to each of the plurality of transmitters, said transmitters being responsive to the synchronizing portions of said digital signal to transmit said digital signal during separate time intervals;

d. storing a different digital address word assigned to a designated subscriber in each of a plurality of portable receivers;

e. receiving at least part of the transmitted digital signal including the synchronizing portion and a plurality of subscriber designations at each of the portable receivers;

f. selecting one of the time slots responsively to the synchronizing portion of the received part of the digital signal;

g. evaluating the subscriber designating portion of the digital signal received in the selected time slot with respect to the stored digital address word; and, h. alerting the designated subscriber in response to a favorable evaluation.

67. The method of claim 66 wherein the subscriber designating portion of the digital signal generated at the master station is generated in response to telephone dialing signals received at the master station over a plurality of voice quality telephone lines; and, wherein the synchronizing portion is variable responsively to the identification of the telephone line over which the subscriber designations are received at the master station.

68. The method of claim 66 wherein said digital signal includes synchronization maintenance portions spaced throughout the subscriber designating portion.

69. The method of claim 66 including the said step of inhibiting receipt of the digital signal by each of the portable receivers for a predetermined period of time following the evaluation of the subscriber designating portion of the digital signal.

70. A method of initiating broadcasting from a remote transmitter comprising the steps of:

a. receiving at a remote transmitter a digital signal including a synchronizing portion and a data portion;

b. energizing the transmitter in response to receipt of the digital signal;

c. storing the received digital signal;

d. applying the stored digital signal to the transmitter;

e. evaluating the synchronizing portion of the received digital signal relative to a predetermined digital signal; and, f. enabling the transmitter responsively to a favorable evaluation of the synchronizing portion of the received digital signal to broadcast the digital signal in its entirety.

71. A method of selecting a zone for broadcasting data comprising the steps of:

a. providing a plurality of transmitters spaced throughout an area;

b. transmitting to each of the plurality of transmitters a digital signal including a broadcast zone designation portion and a data portion; and, c. selectively broadcasting the entire digital signal from the plurality of transmitters responsively to the zone designating portion thereof.

72. A method of paging a subscriber comprising the steps of:

a. providing a plurality of transmitters spaced throughout an area;

b. transmitting a plurality of subscriber designation signals from one of the plurality of transmitters during a first time slot;

c. transmitting a plurality of subscriber designation signals from another of the plurality of transmitters in a second time slot;

d. receiving the transmitted subscriber designation signals at each of a plurality of portable receivers in at least one time slot; and;

e. evaluating the plurality of subscriber designation signals received in at least one of the time slots with respect to a plurality of stored subscriber designation signals at each of the plurality of receivers.

73. A paging system including:

a plurality of transmitting means at spaced locations throughout a paging area, each of said transmitting means being operable to broadcast a carrier signal modulated by a binary bit digital signal;

a central station for generating a plurality of plural binary bit digital address signals each representing a paging system subscriber, said central station including means for sequentially transmitting a group of said plurality of digital address signals to each of said plurality of transmitters for modulation of said carrier signal and broadcast of said group of digital address signals, at least some of the plurality of digital address signals of said groups of signals representing different paging system subscribers, the sequence of transmission being such that broadcast of said group of digital address signals by adjacent of said transmitters is mutually exclusive and no two adjacent transmitters are broadcasting said group of digital address signals simultaneously and, a plurality of portable receivers each including means for receiving and demodulating said broadcast carrier signal to recover said group of plural binary bit digital address signals and means for evaluating each plural binary bit digital address signal of said recovered group of signals with respect to a plural binary bit digital address signal assigned to the receiver.

74. A paging system comprising:

means for generating a digital subscriber identifying signal;

means for repetitively transmitting said digital signal during successive time slots including a plurality of spaced transmitters each assigned to transmit during at least one of said time slots in accordance with a sequence which excludes the transmission of the digital signal from adjacent of the transmitters during the same time slot;

a plurality of individual receivers for receiving the signal transmitted during at least one of said time slots, each of said receivers including means for determining an error rate of the received signal in excess of a predetermined value in at least some of said time slots; and, means responsive to said excessive error rate determining means for selectively receiving said transmitted signal in only one of said time slots, said selective receiving means including means for deenergizing said receiver during at least some of the remaining time slots.

75. The system of claim 71 wherein each of said receivers includes means for deenergizing said receiver during all but the selected time slot.

* * * * *